(12) United States Patent
Khalili et al.

(10) Patent No.: US 11,966,901 B2
(45) Date of Patent: Apr. 23, 2024

(54) AUTOMATED SHOPPING EXPERIENCE USING CASHIER-LESS SYSTEMS

(71) Applicant: LG ELECTRONICS INC., Seoul (KR)

(72) Inventors: Amir Hossein Khalili, Santa Clara, CA (US); Bhooshan Supe, Santa Clara, CA (US); Jung Ick Guack, Santa Clara, CA (US); Shantanu Patel, Santa Clara, CA (US); Gaurav Saraf, Santa Clara, CA (US); Baisub Lee, Santa Clara, CA (US); Helder Silva, Santa Clara, CA (US); Julie Huynh, Santa Clara, CA (US); Jaigak Song, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 17/463,419

(22) Filed: Aug. 31, 2021

(65) Prior Publication Data
US 2022/0067390 A1    Mar. 3, 2022

Related U.S. Application Data

(60) Provisional application No. 63/073,319, filed on Sep. 1, 2020.

(51) Int. Cl.
*G06Q 20/20* (2012.01)
*G01G 19/414* (2006.01)
(Continued)

(52) U.S. Cl.
CPC ....... *G06Q 20/208* (2013.01); *G01G 19/4144* (2013.01); *G06F 18/251* (2023.01);
(Continued)

(58) Field of Classification Search
None
See application file for complete search history.

(56) References Cited

U.S. PATENT DOCUMENTS

| 5,442,146 A | 8/1995 | Bell et al. |
| 7,225,980 B2 | 6/2007 | Ku et al. |

(Continued)

FOREIGN PATENT DOCUMENTS

| JP | 2020016485 | 1/2020 |
| KR | 1020200012366 | 2/2020 |
| WO | 2023023366 | 2/2023 |

OTHER PUBLICATIONS

Asthana, et al., "An Indoor Wireless System for Personalized Shopping Assistance", AT&T Bell Laboratories, Murray Hill, New Jersey, 6 pages.

(Continued)

*Primary Examiner* — Delomia L Gilliard
(74) *Attorney, Agent, or Firm* — LEE, HONG, DEGERMAN, KANG & WAIMEY

(57) ABSTRACT

Disclosed is a method for identifying and monitoring a shopping behavior in a user. The method includes capturing images from a depth camera mounted on a shelf unit, identifying a user from the captured image, identifying joints of the identified user by performing a deep neural network (DNN) body joint detection on the captured images; detecting and tracking actions of the identified user over a first time period; tracking an object from the bins over a second time period by associating the object with one or more joints among the identified joints that have entered the bins within the shelf unit, and determining an action of the identified user based at least in part on the associated object with the one or more joints and results from the deep learning identification on the bounding box.

20 Claims, 27 Drawing Sheets
(5 of 27 Drawing Sheet(s) Filed in Color)

(51) Int. Cl.
*G06F 18/25* (2023.01)
*G06N 3/02* (2006.01)
*G06N 20/00* (2019.01)
*G06Q 10/087* (2023.01)
*G06T 7/246* (2017.01)
*G06T 7/73* (2017.01)
*G06V 20/52* (2022.01)
*G06V 40/10* (2022.01)
*G06V 40/16* (2022.01)
*G06V 40/20* (2022.01)
*H04N 23/61* (2023.01)

(52) U.S. Cl.
CPC ............. *G06N 3/02* (2013.01); *G06N 20/00* (2019.01); *G06Q 10/087* (2013.01); *G06Q 20/203* (2013.01); *G06T 7/251* (2017.01); *G06T 7/73* (2017.01); *G06V 20/52* (2022.01); *G06V 40/107* (2022.01); *G06V 40/161* (2022.01); *G06V 40/168* (2022.01); *G06V 40/172* (2022.01); *G06V 40/28* (2022.01); *H04N 23/61* (2023.01); *G06T 2207/10028* (2013.01); *G06T 2207/20081* (2013.01); *G06T 2207/20084* (2013.01); *G06T 2207/30201* (2013.01); *G06T 2207/30232* (2013.01)

(56) References Cited

U.S. PATENT DOCUMENTS

| | | | |
|---|---|---|---|
| 7,780,081 | B1 | 8/2010 | Liang |
| 10,064,502 | B1 | 9/2018 | Gyori et al. |
| 10,133,933 | B1 | 11/2018 | Fisher et al. |
| 10,332,066 | B1 | 6/2019 | Palaniappan et al. |
| 10,445,694 | B2 | 10/2019 | Fisher et al. |
| 10,466,095 | B1 | 11/2019 | O'Neill et al. |
| 10,474,988 | B2 | 11/2019 | Fisher et al. |
| 10,474,991 | B2 | 11/2019 | Fisher et al. |
| 10,753,787 | B1 | 8/2020 | Shiee et al. |
| 10,885,336 | B1 * | 1/2021 | Davis .............. G11B 20/00289 |
| 11,087,271 | B1 | 8/2021 | Guan et al. |
| 11,087,273 | B1 | 8/2021 | Bergamo |
| 11,392,889 | B1 | 7/2022 | Degranville et al. |
| 11,657,689 | B1 | 5/2023 | McDaniel et al. |
| 11,783,606 | B2 | 10/2023 | Jackson et al. |
| 2005/0060246 | A1 | 3/2005 | Lastinger et al. |
| 2008/0103939 | A1 | 5/2008 | Gibb |
| 2015/0019391 | A1 | 1/2015 | Kumar et al. |
| 2017/0323376 | A1 | 11/2017 | Glaser et al. |
| 2019/0141021 | A1 | 5/2019 | Isaacson et al. |
| 2019/0156506 | A1 * | 5/2019 | Fisher ...................... G06T 7/70 |
| 2019/0205821 | A1 | 7/2019 | Werner et al. |
| 2019/0244500 | A1 * | 8/2019 | Fisher ..................... G06T 13/80 |
| 2019/0281030 | A1 | 9/2019 | Isaacson et al. |
| 2020/0034812 | A1 | 1/2020 | Nemati et al. |
| 2020/0074393 | A1 | 3/2020 | Fisher et al. |
| 2020/0074394 | A1 | 3/2020 | Fisher et al. |
| 2020/0074432 | A1 * | 3/2020 | Valdman .................. G07G 5/00 |
| 2020/0202683 | A1 * | 6/2020 | Gao ...................... G06Q 20/208 |
| 2020/0234463 | A1 * | 7/2020 | Fisher ...................... H04W 4/33 |
| 2020/0334834 | A1 * | 10/2020 | Fisher .................. G06V 10/764 |
| 2021/0105578 | A1 * | 4/2021 | Chen ................... G06F 18/2155 |
| 2021/0124936 | A1 | 4/2021 | Mirza et al. |
| 2021/0125341 | A1 | 4/2021 | Mirza et al. |
| 2021/0148751 | A1 | 5/2021 | Yadai et al. |
| 2021/0177163 | A1 | 6/2021 | Cohn et al. |
| 2021/0326959 | A1 | 10/2021 | Haapoja et al. |
| 2023/0021719 | A1 | 1/2023 | Hahamy |

OTHER PUBLICATIONS

PCT International Application No. PCT/KR2021/011748, International Search Report dated Mar. 24, 2014, 12 pages.
U.S. Appl. No. 17/463,450, Office Action dated Mar. 24, 2023, 26 pages.
United States Patent and Trademark Office U.S. Appl. No. 17/463,461, Office Action dated Oct. 30, 2023, 25 pages.
United States Patent and Trademark Office U.S. Appl. No. 17/463,450, Final Office Action dated Nov. 7, 2023, 18 pages.

* cited by examiner

1101

AUTOMATED SHOPPING EXPERIENCE USING CASHIER-LESS SYSTEMS

CROSS-REFERENCE TO RELATED APPLICATION(S)

Pursuant to 35 U.S.C. § 119(e), this application claims the benefit of U.S. Provisional Patent Application No. 63/073,319, filed on Sep. 1, 2020, the contents of which are hereby incorporated by reference herein in its entirety.

FIELD

The present disclosure generally relates to an automated shopping experience using retrofittable and modular devices where shoppers may shop and leave a store without having to wait in line to pay or use self-check-out stations.

BACKGROUND

Machine learning is an area of artificial intelligence that includes a field of study that gives computers the capability to learn without being explicitly programmed. Specifically, machine learning is a technology used for researching and constructing a system for learning, predicting, and improving its own performance based on empirical data and an algorithm for the same. The machine learning algorithms construct a specific model in order to obtain the prediction or the determination based on the input data, rather than performing strictly defined static program instructions.

Retail stores have long wanted to introduce checkout-free scan-and go services in an effort to provide an efficient and pleasant shopping experience to customers. To that end, retail stores have started using a combination of cameras, sensors, computer vision techniques and deep learning to provide customers with an automated shopping experience where shoppers may shop and leave a store without having to wait in line to pay or use self-checkout stations. For customers, a cashier-less store can save customer's time and enhance their shopping experience because customers do not need to wait in line to pay.

However, many of these automated shopping experiences are not accurate due to limitations with camera and sensor technology or customers trying to fool the systems. In addition, the setup and installation of these camera systems are disruptive and costly because the installation requires a substantial remodel or layout re-construction of a store, requires additional install and maintenance of cameras and sensors, and may require costly accessories such as RFID tags or sensors embedded in shopping baskets and shopping carts.

Accordingly, there is a demand for an automated shopping experience that is accurate and eco-system agnostic such that the retrofittable plug and play aspect of the system provides for a simple install with minimal store redesign, seamless integration with a shop's existing eco-system, and minimal maintenance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood by those of ordinary skill in the art, a more detailed description may be had by reference to aspects of some illustrative implementations, some of which are shown in the accompanying drawings.

Figure 1:
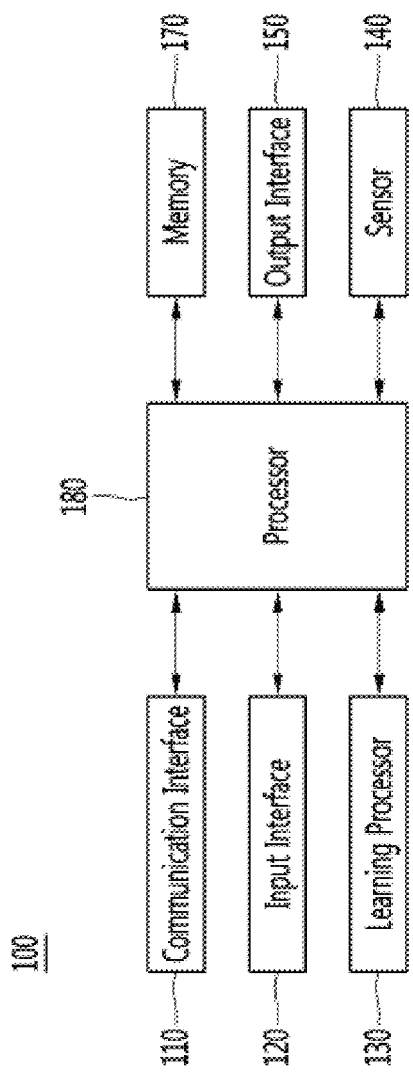
FIG. 1 illustrates an AI device in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

An object of the present disclosure is to provide a pluggable camera that is mounted on top of shelf units can be equipped with AI and embedded computer vision algorithms to identify shoppers and monitor their shopping activities. To this end, the camera provides an easy to install and scalable solution that can detect items being picked up or returned to shelves by a shopper for tracking shopper behavior analytics and inventory management systems. The pluggable camera is a highly scalable solution because the camera can be mounted onto any unit shelf for an easy installation in existing store fronts such that it would require minimal to no change in the layout of the stores and no need for external calibration of the cameras.

An implementation of the present disclosure may include: capturing images from a camera mounted on a shelf unit; identifying a user from the captured images, wherein the captured images may include a representation of a body of the user; identifying joints of the identified user by performing a deep neural network body joint detection on the captured images; detecting and tracking actions of the identified user over a first time period by: detecting an affinity of joints for performing a deep learning identification on a first bounding box to identify a particular user and for associating results from the deep neural network body joint detection with the particular user to re-identify joints of the identified user, wherein the first bounding box may include identified joints of the identified user, transforming a 2D position information of the identified joints into a 3D position information of the identified joints by mapping 2D locations of the detected joints in the captured images to a corresponding point cloud, and tracking the 3D position information of the detected joints to determine when the detected joints have entered bins within the shelf unit, wherein the detected joints may include at least a wrist; tracking an object from the bins over a second time period by associating the object with one or more joints among the identified joints that have entered the bins within the shelf unit, wherein the object is associated with the one or more joints based at least in part on a determination that the 3D position of the identified joints has entered a particular bin within the shelf unit, wherein the object was predetermined to be located in the particular bin using a virtual map of the location of the bins on shelf unit and corresponding objects located in the bins, wherein the virtual map is stored on a memory storage on the shelf unit; and determining an action inference of the identified user based at least in part on the associated object with the one or more joints and results from the deep learning identification on the bounding box.

In some implementations, the identified joints may correspond to at least seventeen joints of the identified user, wherein the at least seventeen joints may include at least one of a left shoulder, right shoulder, left arm, right arm, left wrist, right wrist, left hand, or right hand.

In some implementations, the identified joints may not correspond to facial recognition.

In some implementations, the camera may correspond to a depth camera.

In some implementations, performing the deep learning identification on the first bounding box further may include: creating a feature map of the identified user to generate a unique feature blob associated with the particular user, determining the first bounding box for the identified user, and inputting the determined first bounding box into a model for generating a unique identifier for the identified user, wherein the generated unique identifier for the identified user may be transmitted to other devices for identifying the particular user across the other devices.

In some implementations, the particular user may be uniquely identified based at least in part on a body type, clothing, a body shape, or facial features for identifying the particular user across other shelf unit.

In some implementations, the method may further include detecting the object associated with the identified user by: generating a second bounding box around a wrist of the identified user for associating the detected object with the wrist of the identified user; projecting the generated second bounding box to the captured images; masking out pixels with depths further from a depth of a hand of the identified user by a first predefined distance in the generated second bounding box, wherein the generated second bounding box is projected on a wrist of the identified user to identify which object the user is interacting with; and identifying the object in pixel blobs.

In some implementations, the camera may not be externally or internally calibrated.

In some implementations, the camera may correspond to a first monocular camera and a second monocular camera, wherein the captured images may include a first captured image corresponding to a left view and a second captured image corresponding to a right view, and the method may further include: determining joints correspondence in the first captured image corresponding to the left view and the second captured image corresponding to the right view, wherein performing deep learning identification on a user bounding box further may include performing the deep learning identification on the first bounding box for the first captured image corresponding to the left view and the second captured image corresponding to the right view in a batch, wherein detecting the object associated with the identified user may further include: generating a second bounding box around a wrist of the identified user for associating the detected object with the wrist of the identified user; projecting the generated second bounding box to the first captured image corresponding to the left view and the second captured image corresponding to the right view; masking out pixels with depths further from a depth of a hand of the identified user by a second predefined distance in the generated second bounding box, wherein the generated second bounding box is projected on a wrist of the identified user to identify which object the user is interacting with; and identifying the object in pixel blobs.

Another implementation of the present disclosure may include a system including a camera mounted onto a shelf unit, and one or more processors configured to: capture images from the camera; identify a user from the captured images, wherein the captured images includes a representation of a body of the user; identify joints of the identified user by performing a deep neural network body joint detection on the captured images; detecting and tracking actions of the identified user over a first time period by: detect an affinity of joints for performing a deep learning identification on a first bounding box to identify a particular user and for associating results from the deep neural network body joint detection with the particular user to re-identify joints of the identified user, wherein the first bounding box includes identified joints of the identified user, transform a 2D position information of the identified joints into a 3D position information of the identified joints by mapping 2D locations of the detected joints in the captured images to a corresponding point cloud, and track the 3D position information of the detected joints to determine when the detected joints have entered bins within the shelf unit, wherein the detected joints include at least a wrist; track an object from the bins over a second time period by associating the object with one or more joints among the identified joints that have entered the bins within the shelf unit, wherein the object is associated with the one or more joints based at least in part on a determination that the 3D position of the identified joints has entered a particular bin within the shelf unit, wherein the object was predetermined to be located in the particular bin using a virtual map of the location of the bins on shelf unit and corresponding objects located in the bins, wherein the virtual map is stored on a memory storage on the shelf unit; and determine an action inference of the identified user based at least in part on the associated object with the one or more joints and results from the deep learning identification on the bounding box.

Yet another implementation of the present disclosure includes an edge device including one or more processors; a non-transitory memory; and one or more programs stored in the non-transitory memory, which, when executed by the one or more processors, cause the edge device to be configured to perform: capturing images from a camera mounted on a shelf unit; identifying a user from the captured images, wherein the captured images include a representation of a body of the user; identifying joints of the identified user by performing a deep neural network body joint detection on the captured images; detecting and tracking actions of the identified user over a first time period by: detecting an affinity of joints for performing a deep learning identification on a first bounding box to identify a particular user and for associating results from the deep neural network body joint detection with the particular user to re-identify joints of the identified user, wherein the first bounding box includes identified joints of the identified user, transforming a 2D position information of the identified joints into a 3D position information of the identified joints by mapping 2D locations of the detected joints in the captured images to a corresponding point cloud, and tracking the 3D position information of the detected joints to determine when the detected joints have entered bins within the shelf unit, wherein the detected joints include at least a wrist; tracking an object from the bins over a second time period by associating the object with one or more joints among the identified joints that have entered the bins within the shelf unit, wherein the object is associated with the one or more joints based at least in part on a determination that the 3D position of the identified joints has entered a particular bin within the shelf unit, wherein the object was predetermined to be located in the particular bin using a virtual map of the location of the bins on shelf unit and corresponding objects located in the bins, wherein the virtual map is stored on a memory storage on the shelf unit; and determining an action inference of the identified user based at least in part on the associated object with the one or more joints and results from the deep learning identification on the bounding box.

The present disclosure is not limited to what has been described above, and other aspects and advantages of the present disclosure not mentioned above will be understood through the following description of implementations of the present disclosure. Further, it will be understood that the aspects and advantages of the present disclosure may be achieved by the configurations described in claims and combinations thereof.

DETAILED DESCRIPTION

Hereinafter, embodiments of the present disclosure are described in more detail with reference to accompanying drawings and regardless of the drawings, symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display (e.g., display 412 shown in FIG. 4) for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
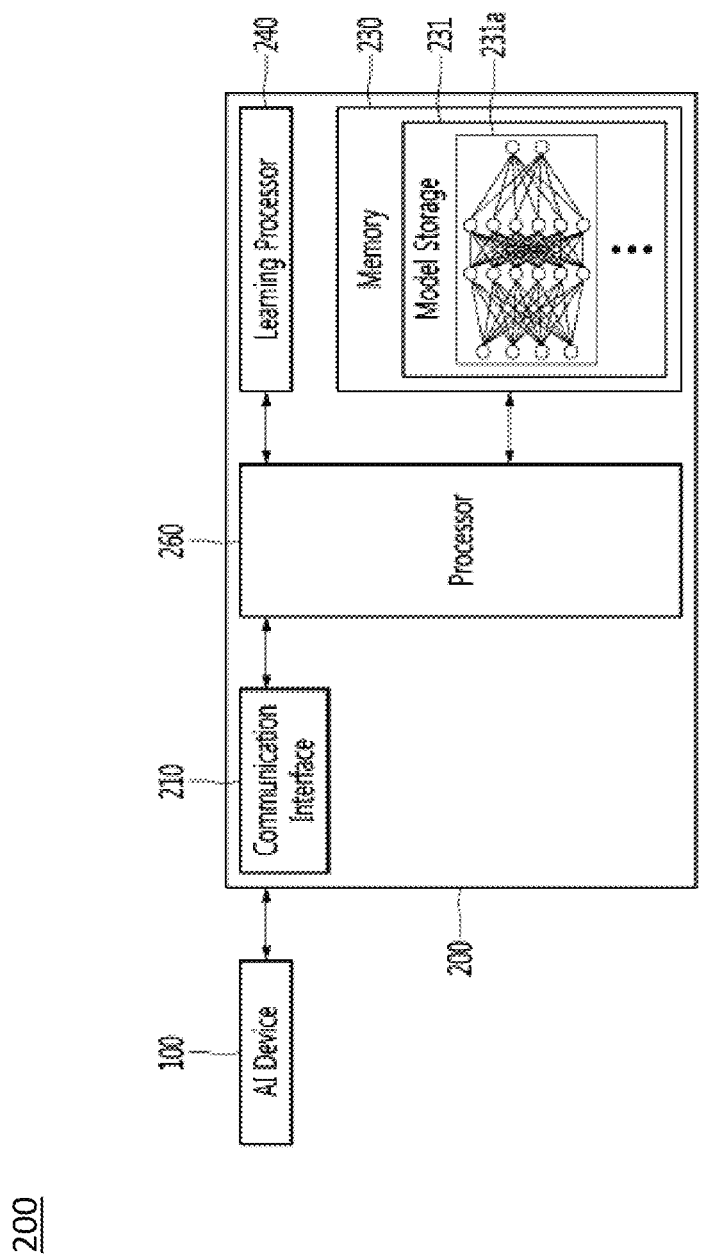
FIG. 2 illustrates an AI server in accordance with some implementations.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

FIG. 1 is a view illustrating an example of an AI system comprising an AI device, an AI server, and a network connecting the above-mentioned components. While pertinent features are shown, those of ordinary skill in the art will appreciate from the present disclosure that various other features have not been illustrated for the sake of brevity and so as not to obscure more pertinent aspects of the example implementations disclosed herein.

Referring to FIG. 1, the AI device 100 (e.g., the device 401 shown in FIG. 4) may include a training engine of the present disclosure and for example, include at least one of a device, a robot, an autonomous vehicle, a communication terminal (for example, a mobile phone, a smart phone, or a tablet PC), a device (not shown in FIG. 1), and a home appliance (for example, a robot cleaner), an image sensor, or a mobile phone.

Here, artificial intelligence refers to a field of studying artificial intelligence or a methodology to create the artificial intelligence and machine learning refers to a field of defining various problems treated in the artificial intelligence field and studying a methodology to solve the problems. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may train an artificial neural network by supervised learning.

Supervised learning may refer to a method for training an artificial neural network with training data that has been given a label. In addition, the label may refer to a target answer (or a result value) to be guessed by the artificial neural network when the training data is inputted to the artificial neural network.

As a result, an artificial intelligence based object identifying apparatus trains the artificial neural network using a machine learning algorithm or requests a trained artificial neural network from the AI server 200 to receive the trained artificial neural network from the AI server 200. Further, when the image is received, the object identifying apparatus may estimate a type of the object in the received image using the trained artificial neural network.

When the AI server 200 receives the request for the trained artificial neural network from the AI device 100, the AI server 200 may train the artificial neural network using the machine learning algorithm and provide the trained artificial neural network to the AI device 100. The AI server 200 may be composed of a plurality of servers to perform distributed processing. In this case, the AI server 200 may be included as a configuration of a portion of the AI device 100, and may thus perform at least a portion of the AI processing together.

The network may connect the AI device 100 and the AI server 200. The network may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network may also send and receive information using short distance communication and/or long distance communication. The short-range communication may include Bluetooth®, radio frequency identification (RFID), infrared data association (IrDA), ultra-wideband (UWB), ZigBee, and Wi-Fi (wireless fidelity) technologies, and the long-range communication may include code division multiple access (CDMA), frequency division multiple access (FDMA), time division multiple access (TDMA), orthogonal frequency division multiple access (OFDMA), and single carrier frequency division multiple access (S C-FDMA).

The network may include connection of network elements such as a hub, a bridge, a router, a switch, and a gateway. The network can include one or more connected networks, for example, a multi-network environment, including a public network such as an internet and a private network such as a safe corporate private network. Access to the network may be provided through one or more wire-based or wireless access networks. Furthermore, the network may support the Internet of Things (IoT) network for exchanging and processing information between distributed elements such as things, 3G, 4G, Long Term Evolution (LTE), 5G communications, or the like.

Figure 3:
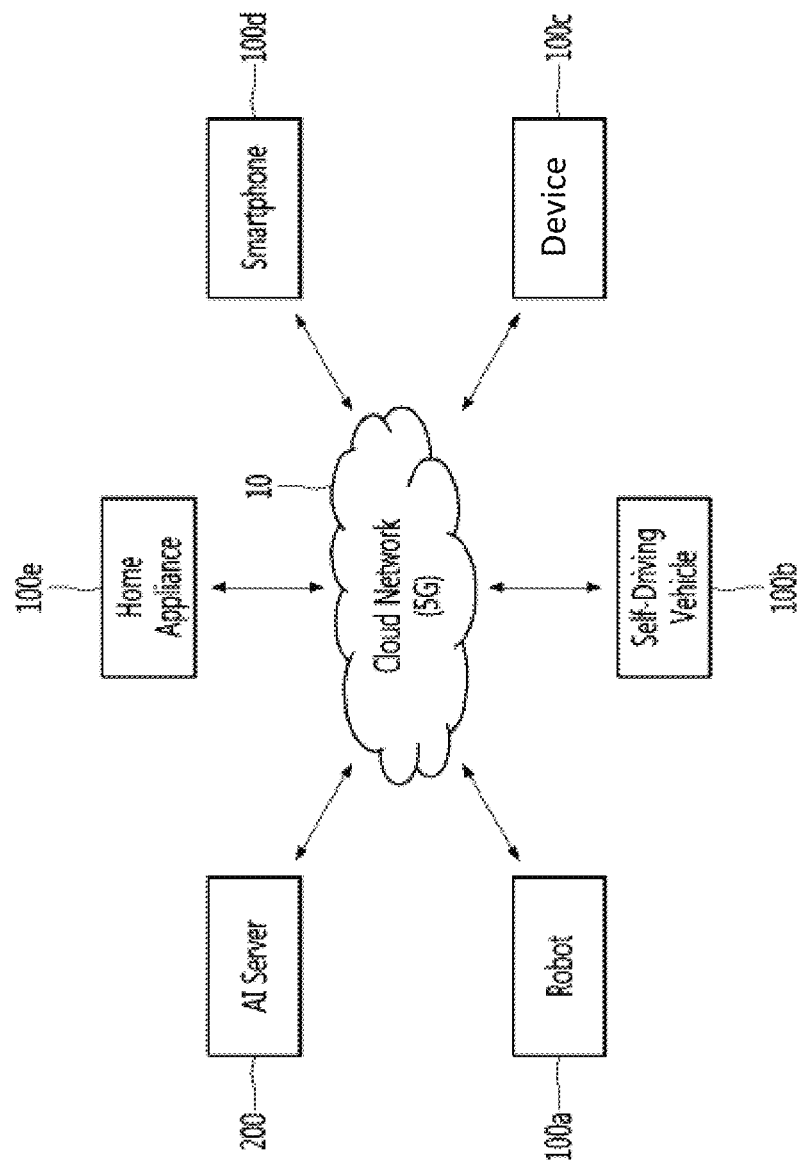
FIG. 3 is a view illustrating an example of an AI system comprising an AI device, an AI server, and a network connecting the above-mentioned components in accordance with some implementations.

FIG. 3 illustrates an AI system 1 according to an embodiment of the present invention.

Referring to FIG. 3, in the AI system 1, at least one of an AI server 200, a robot 100a, a self-driving vehicle 100b, a device 100c (e.g., the device 401 shown in FIG. 4), a smartphone 100d, or a home appliance 100e is connected to a cloud network 10. The robot 100a, the self-driving vehicle 100b, the device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driver based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driver such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driver based on the control/interaction of the user. At this time, the self-driving vehicle 100b may acquire the intention information of the interaction due to the user's operation or speech utterance, and may determine the response based on the acquired intention information, and may perform the operation.

<AI+XR>

The device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The device 100c may analyzes three-dimensional point cloud data or image data acquired from various sensors or the external devices, generate position data and attribute data for the three-dimensional points, acquire information about the surrounding space or the real object, and render to output the XR object to be output. For example, the device 100c may output an XR object including the additional information about the recognized object in correspondence to the recognized object.

The device 100c may perform the above-described operations by using the learning model composed of at least one artificial neural network. For example, the device 100c may recognize the real object from the three-dimensional point cloud data or the image data by using the learning model, and may provide information corresponding to the recognized real object. The learning model may be directly learned from the device 100c, or may be learned from the external device such as the AI server 200.

At this time, the device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the device 100c and interwork with each other.

When the robot 100a, which is subjected to control/interaction in the XR image, may acquire the sensor information from the sensors including the camera, the robot 100a or the device 100c may generate the XR image based on the sensor information, and the device 100c may output the generated XR image. The robot 100a may operate based on the control signal input through the device 100c or the user's interaction.

For example, the user can confirm the XR image corresponding to the time point of the robot 100a interworking remotely through the external device such as the device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the device 100c may generate the XR image based on the sensor information, and the device 100c may output the generated XR image. The self-driving vehicle 100b may operate based on the control signal input through the external device such as the device 100c or the user's interaction.

Figure 4:
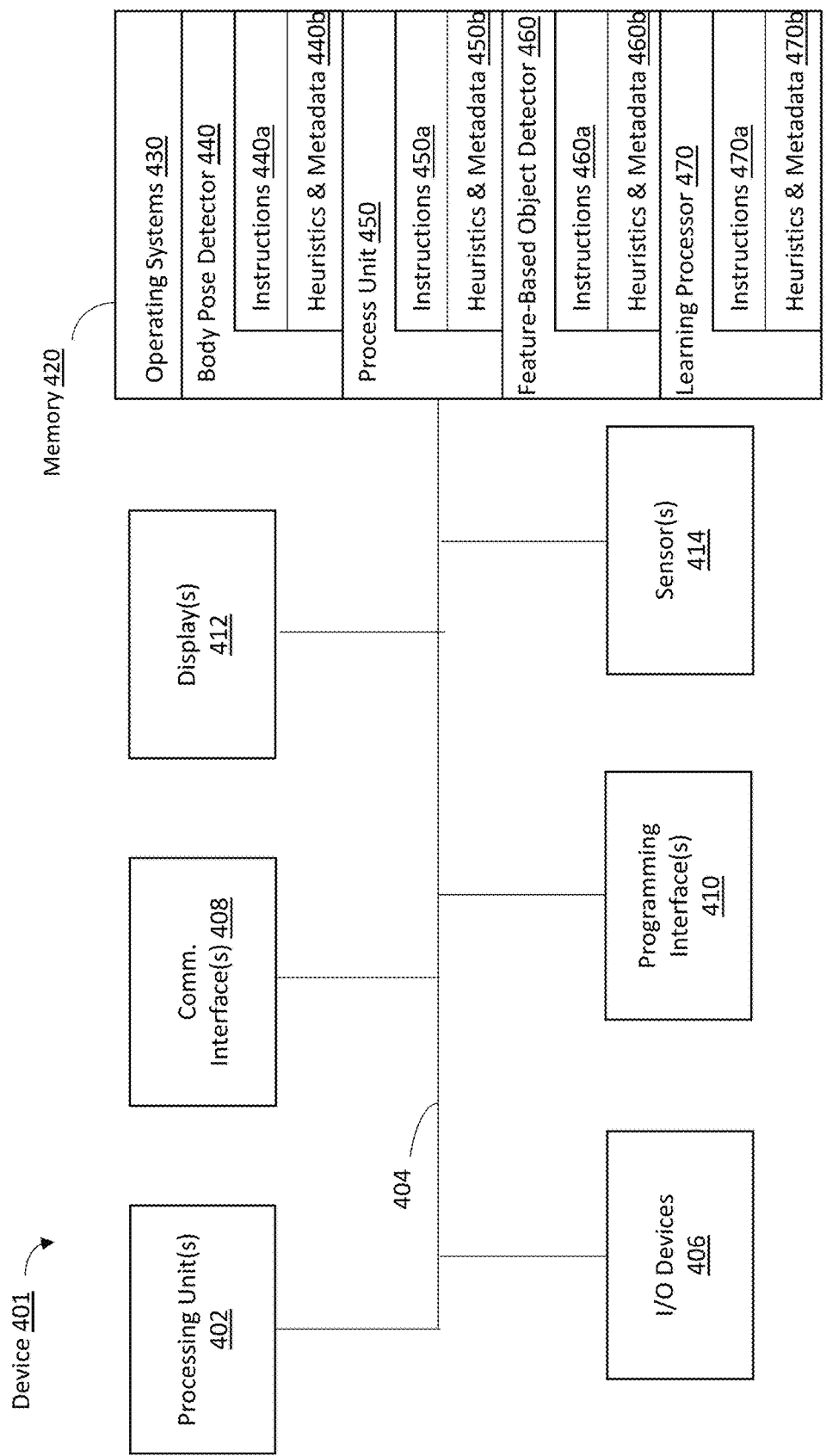
FIG. 4 is a block diagram of an edge device in accordance with some implementations.

FIG. 4 is a block diagram of an example device (e.g., the device 603 shown in FIG. 6) configured in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 401 includes one or more processing units 402 (e.g., NMP, microprocessors, ASICs, FPGAs, GPUs, CPUs, processing cores, and/or the like), one or more optional I/O devices 406, one or more communications interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interfaces), one or more programming (e.g., I/O) interfaces 410, one or more sensor(s) 414, a memory 420, display 412 (optional), and one or more communication buses 1404 for interconnecting these and various other components.

In some implementations, the one or more communication buses 404 include circuitry that interconnects and controls communications between system components.

In some implementations, the one or more sensors 411 (e.g., the camera 605 shown in FIG. 6) are configured to obtain image data frames. For example, the sensors 414 correspond to one or more RGB cameras (e.g., with a complementary metal-oxide-semiconductor (CMOS) image sensor, or a charge-coupled device (CCD) image sensor), infrared (IR) image sensors, depth cameras, monocular cameras, event-based cameras, a microphone, and/or the like.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430, a body pose detector 440, a process unit 450, a feature-based object detector 460, and a learning processor 470. In some implementations, the body pose detector 440 and the feature-object based detector 460 are implemented by one or more processors.

The optional operating system 430 includes procedures for handling various basic system services and for performing hardware dependent tasks.

In some implementations, the body pose detector 440 is configured to distinguish an anatomical structure of a body of a user. To that end in various implementations, the body pose detector 440 includes instructions 440a and/or logic therefor, and heuristics and metadata 440b therefor.

In some implementations, the process unit 450 is configured to process information obtained from an acceleration sensor. To that end in various implementations, the process unit 450 includes instructions 450a and/or logic therefor, and heuristics and metadata 450b therefor.

In some implementations, the feature-based object detector 460 is configured to perform object detection and identify objects in remaining pixel blobs. To that end in various implementations, the feature-based object detector 460 includes instructions 460a and/or logic therefor, and heuristics and metadata 460b therefor.

Figure 11:
FIG. 11 is another representation of tracking a user from a captured image in accordance with some implementations.

In some implementations, the learning processor 470 comprises an artificial neural network (the artificial neural network 1100 is shown in FIG. 11) by using learning data and is configured to perform AI processing with the AI server 200. To that end in various implementations, the learning processor 470 includes instructions 470a and/or logic therefor, and heuristics and metadata 470b therefor.

Although the body pose detector 440, the process unit 450, the feature-based object detector 460, and the learning processor 470 are shown as residing on a single device (e.g., the device 401), it should be understood that in some implementations, any combination of the body pose detector 440, the process unit 450, the feature-based object detector 460, and the learning processor 470 may be located in separate computing devices.

Moreover, FIG. 4 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Retail stores have wanted to introduce checkout-free scan-and go services in an effort to provide an efficient and pleasant shopping experience to customers. To that end, retail stores have used a combination of computer vision, sensor fusion and deep machine learning to implement these automated shopping experiences. However, many of these automated shopping experiences are not accurate due to limitations with camera and sensor technology or customers trying to fool the systems. In addition, the setup and installation of these camera systems are disruptive and costly because they require substantial remodels or re-constructions in the layout of a store, require expensive install and maintenance of cameras and sensors, and may require costly accessories such as RFID tags or sensors embedded in shopping baskets and shopping carts.

A first approach includes shelves equipped with embedded weight sensors to detect picked-up from shelves and returned items to the shelves. However, the weight sensor solution is not a comprehensive solution for associating shoppers with items that the shopper picks up or returns because it is easy to fool a system by replacing items with other items that weigh the same or are multiples of each other.

A second approach includes items that are attached to an RFID tag and use a RFID scanner to detect objects at the shelves or at a checkout gate. However, the RFID tags can be expensive relative to low cost items and the RFID scanner may miss reading RFID tags due to the tags being stacked, blocked, or a customer simply not scanning the RFID tag. Furthermore, generating the tags and attaching the tags to items increase the labor effort of store employees.

A third approach includes a camera visually scanning items or reading barcodes at the checkout point. In this approach, a shopper needs to manually scan the items one by one or spread them out on a scanning trial. This may be extremely burdensome to a customer with a large number of items and can result in long queues when many customers are checking out at the same time. There is also a chance that the customer forgets to scan an item. In addition, self-checkout stations can take up a considerable area of a store.

A fourth approach includes a shopping cart with weight sensors and an array of cameras aimed in the interior of a shopping cart for visually detecting items or using the weight of items to track the items that a customer is interested in. However, the chance of miss-detection increases as the items are stacked up in small spaces of the cart. In addition, customers are forced to always use a shopping cart even if the customers are only interested in a few items. In addition, a shopping cart's battery will need to be constantly checked and properly charged.

A fifth approach includes a massive network of cameras installed on ceilings for tracking and monitoring a customer's shopping behavior for customers to purchase products without being checked out by a cashier or using a self-checkout station. However, such a system can fail to distinguish between items that look similar, smaller items, or items that are occluded by other objects or by a customer's hands. These systems also take up a lot of computing resources due to the massive amounts of cameras and may require a customer to have dedicated shopping applications and user accounts to enable the automated shopping experience. In addition, installing these cameras systems in stores requires a costly installation and maintenance because a technician is needed to install the camera system, adjust the camera views, and externally calibrate the cameras. Furthermore, installing a network of cameras on a ceiling requires significant changes to a store layout, eco-system, and costly hardware such that is it not practical to install the system of networked cameras onto existing store fronts without a long and complex installation and maintenance cycles.

A sixth approach requires facial recognition or other biometrics and self-checkout kiosks. These approaches require a face scan or other biometrics such as a fingerprint or hand scan to connect a customer to a particular company's payment application. However, this approach still requires a customer to scan items via a self-checkout system such that a customer cannot simply walk out of the store with their items. This also involves a potential privacy issue since customers must use log their biometrics with the stores' technology.

To address these problems, a novel, scalable solution includes a pluggable camera that is mounted on top of shelf units to identify and monitor a shopper's activity and track inventory of items in real-time. In contrast to the earlier approaches, the pluggable cameras are a scalable solution and can be easily retro-fitted into any existing store layout.

Figure 5:
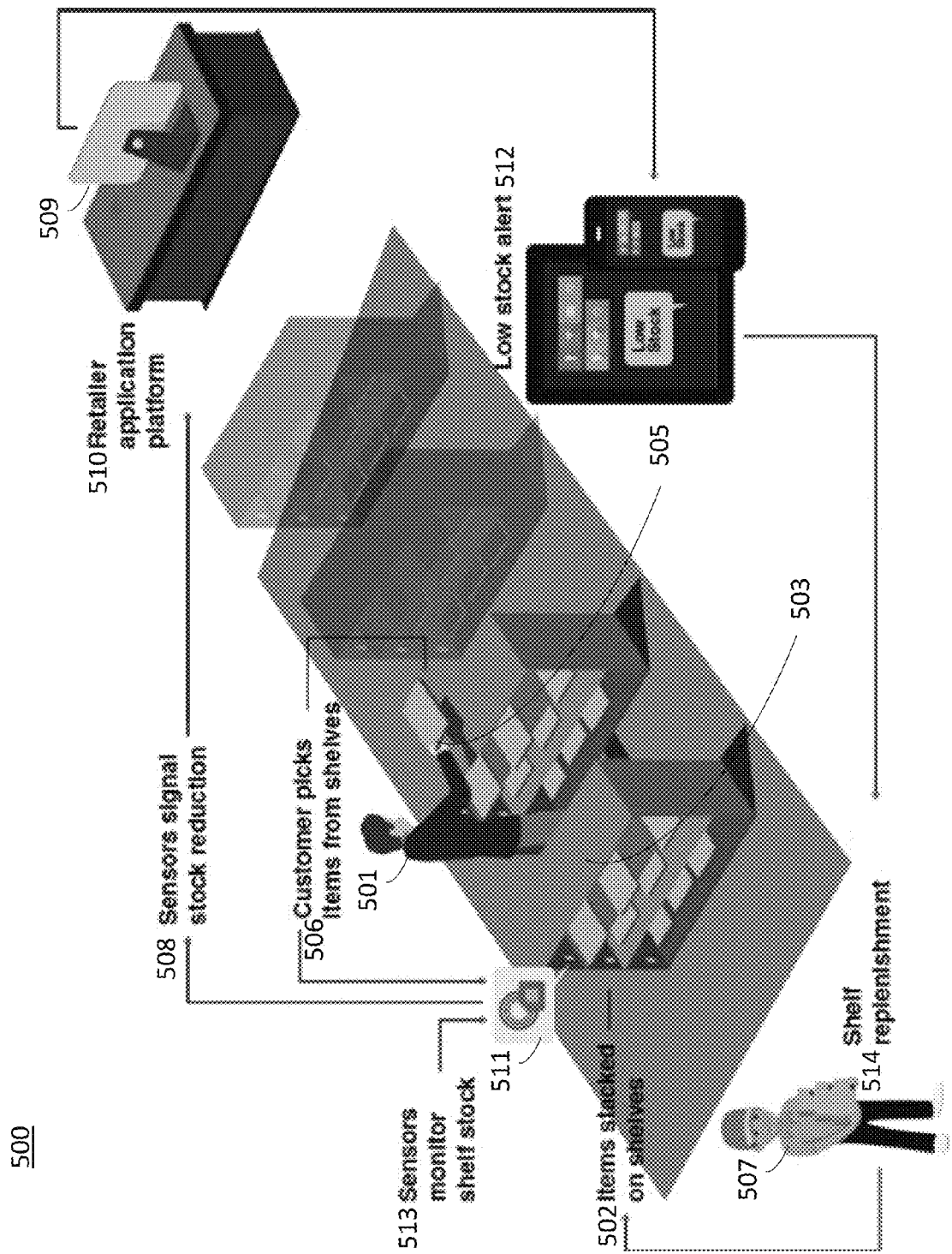
FIG. 5 is a block diagram of an example operating environment for automated shopping in accordance with some implementations.

FIG. 5 is a block diagram of an example operating environment for providing an automated shopping experience in accordance with some implementations. In various implementations, the operating environment 500 or portions thereof are included in a device or system such as a controller, a server, a computer, a laptop computer, a tablet device, a mobile phone, a smartphone, or a wearable computing device (e.g., a head-mounted display (HMD)). While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the operating environment 500 includes at least a shopper 501 (e.g., a first user), a shelf unit 503, an item 505, a retail store employee 507 (e.g., a second user), a retailer application platform 509, and at least one camera 511 (e.g., image sensor).

In some implementations, the operating environment 500 may correspond to a physical retail store. However, the operating environment should not be limited to only physical retail store, but can also correspond to any hospitality environments such as convenience stores, food and grocery stores, clothing stores, etc. In the hospitality environment, the operating environment 500 may also correspond to in-room smart shelves. In non-commercial environments, the operating environment 500 may be a smart pantry or library.

In some implementations, the operating environment 500 is configured to provide shoppers 501 (or users) with an automated shopping experience where shoppers can purchase items without having to go through a self-check-out line, interact with retail store employees 507, or interact with a cashier. As a non-limiting example, a high level explanation of how the shelf units 503 work with the sensors 511 to provide a cashier-less shopping experience and real-time inventory management will be provided. As indicated by 502 in FIG. 5, the operating environment 500 consists of items 505 stacked onto the shelf units 503. As indicated by 504 in FIG. 5, at a high level, sensors 511 monitor shelf stock of the items 505 placed on the shelf units 503. As indicated by 506 in FIG. 5, a sensor 504 captures a user 501 picking up an item 505 from the shelf unit 503. As represented by step 508, sensors 504 signal a stock reduction to the retail store due to the shopper picking up the item 505. As indicated by 510 in FIG. 5, a retailer application platform 509 is able to track real-time inventory management. As indicated by 512 in FIG. 5, the retailer application platform 509 may signal to a retail store employee 507 that there is a low stock alert for a particular item. As indicated by 514 in FIG. 5, the retail store employee 507 can replenish the shelf unit 503 with more items 505.

In some implementations, the operating environment 500 is also configured to provide an automated shopping using shelf units 503 and a device (not shown in FIG. 1) including sensors 511. The sensors or cameras 511 are pluggable and retrofitted in the shelf units 503. In some implementations, the camera 511 is mounted on top of the shelf unit 503 to identify and monitor activities of the shoppers 501 and track items 505 in the environment 500. The cameras 511 and shelf unit 503 are equipped with AI algorithms for identifying shoppers 501 and monitoring their activities. The embedded computer vision algorithm detects items 505 that are being picked up from the shelf unit 503 or returned back to the shelf unit 503 to add or remove items from a virtual shopping basket for anti-fraud purposes, real-time inventory management, and shopper behavior analytics.

In some implementations, the cameras 511 can easily be placed on top of any existing shelf unit 503 and put the items 505 on the shelf unit 503. The shelf units 503 work with the cameras 511 to quantify the items 505 which are picked up, measuring weights of the items 505, or detecting a shopper's 501 interaction with the items 505 (e.g., picking up the item or returning the item). The cameras 511 provide a solution that is easy to install and retrofittable onto any existing retail stores. In addition, the shelf units 503 are also highly modular and scalable.

Moreover, FIG. 5 is intended more as a functional description of the various features that could be present in a particular implementation as opposed to a structural schematic of the implementations described herein. As recognized by those of ordinary skill in the art, items shown separately could be combined and some items could be separated in various other embodiments. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 6:
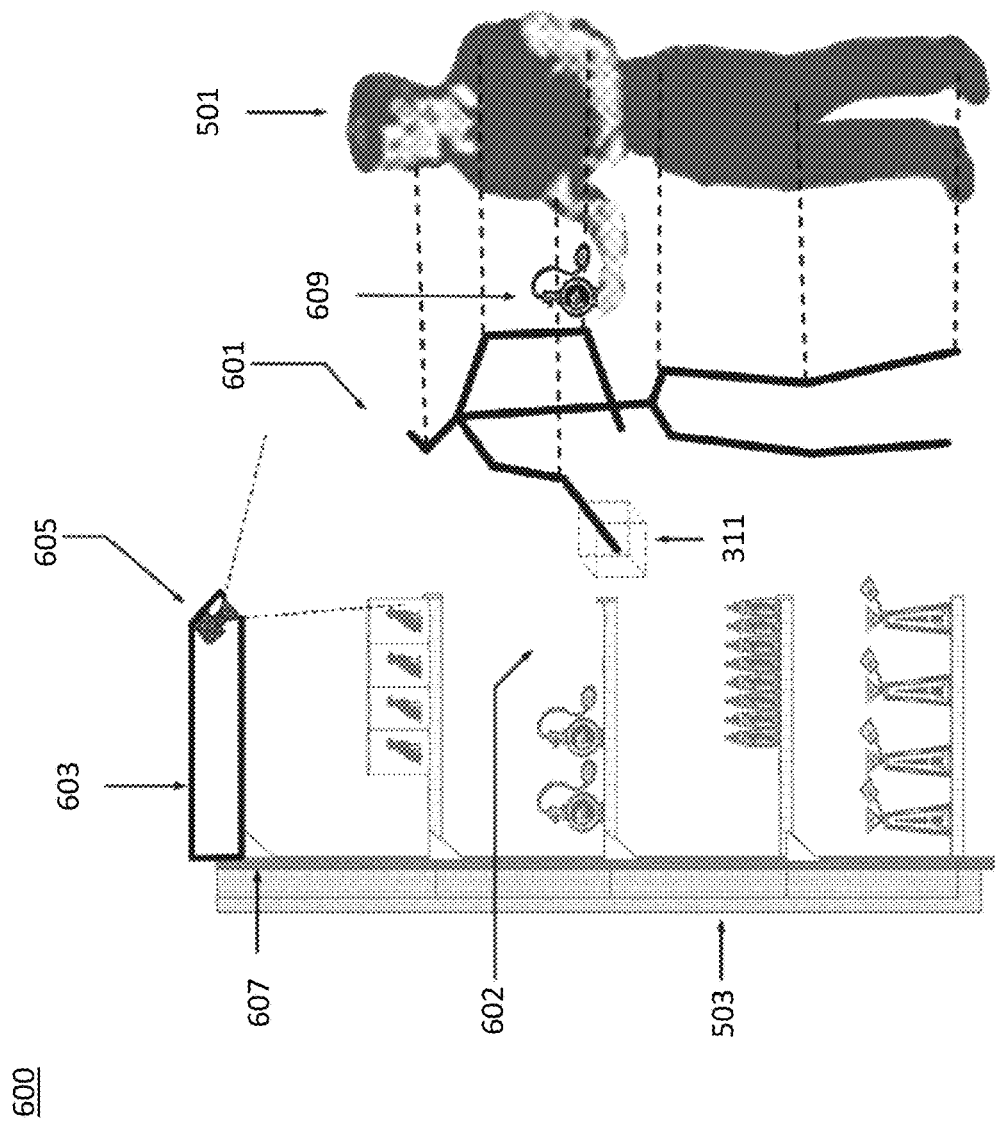
FIG. 6 is a diagram of an example operating environment for identifying shoppers and detecting activities of a shopper across shelf units using a depth camera in accordance with some implementations.

FIG. 6 is a diagram of an example operating environment for identifying shoppers and detecting activities of a shopper across shelf units using a depth camera in accordance with some implementations. In various implementations, the process environment 600 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 600 includes at least a device 603 including a depth camera 605, a shelf unit 603, a user 501, and a virtual 3D box 311.

In some implementations, the process environment 600 is configured to identify the shoppers (or users) and detect the shoppers' activities using a device 603 including a depth camera 605 mounted onto a shelf unit 503. The device 603 is easy to set up in any setting because it can be setup onto the top of any store shelf without any need to add a massive network of cameras or installing additional sensors onto the shelf units 503.

In some implementations, the device 603 comprises a depth camera 605, a process unit equipped with an accelerometer (or acceleration sensor), and a communication module (wireless or ethernet). The device 603 is designed to be easily plugged on the top of a typical store shelf unit 503. In some implementations, the depth camera 605 is tilted downward to capture all the edges of the individual shelves of the shelf unit 503 and whole bodies of at least one user 501. In some implementations, the device 603 uses AI and machine learning to detect users and their joints for monitoring a users' shopping activity.

Figure 7:
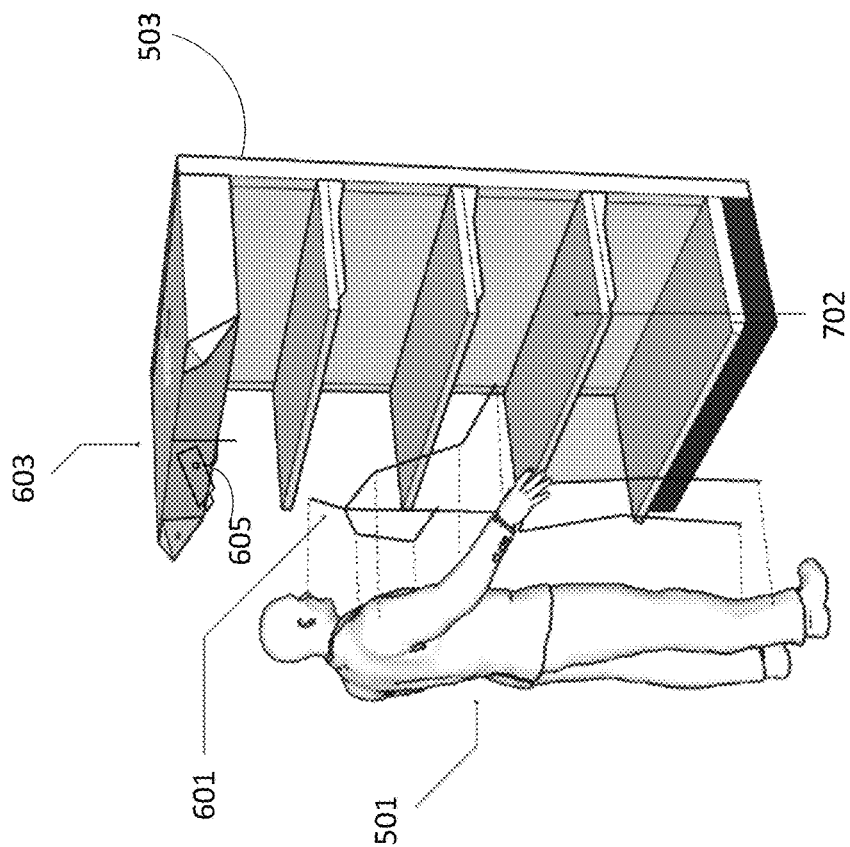
FIG. 7 is another view of a diagram of an example operating environment for identifying shoppers and detecting activities of a shopper across shelf units using a camera in accordance with some implementations.

In some implementations, the device includes a key-point based body pose detector configured to distinguish an anatomical structure of a body 601 of a user 501 with respect to an image captured by the depth camera 605. The detected skeleton in a 2D image defines the region of the body of the user 501. A deep neural network (described in more detail in FIG. 14) describes the image crop surrounding the body as a feature vector. The vector implicitly describes the body shape, clothing, facial features, or the like of the user 501 for identification over time and across different shelf units 503. As shown in FIG. 7 below, the device generates a detected skeleton (e.g., the skeletal structure 1100 in FIG. 10) in 2D that defines at least 17 regions or joints of a body of the user 501 captured by the camera.

In some implementations, by mapping the 2D location of the joints of a user 501 in the 2D image captured by the depth camera 605 to the corresponding point-cloud, the 3D positions of the joints are estimated and tracked over time using an estimation-based multi-object tracker such as Extended-Kalman Filter. The Extended-Kalman Filter can handle partial occlusion or complete occlusions for a certain time period (described in more detail in FIG. 12).

In some implementations, as the device 603 and the camera 605 are plugged 607 into a shelf unit 503, it is easy to define positions of the shelf and virtual bins of items respective to the camera coordinate system without any external calibration since the location that the camera 605 is placed is a known location.

In some implementations, the device 603 can infer that the user 501 has picked up an object 609 from a particular bin 602 in the shelf unit 503 because the device 603 generates an object bounding box 311 on the wrists of the anatomical structure 601 of a body 601 of a user 501. In some implementations, the device 603 contains a storage with a virtual map that provides the predetermined location of the object 609 in a particular bin 602 of the shelf unit 503. This allows the device 603 to create a virtual shopping cart and update the shopping cart with the item once the device 603 detects the object 609 and the particular user 501 who is holding the object 609.

Moreover, FIG. 6 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 7 is another view of a diagram of an example operating environment for identifying shoppers and detecting activities of a shopper across shelf units using a depth camera in accordance with some implementations. In various implementations, the process environment 700 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 700 includes at least a device 603 including a depth camera 605, the device 603 connected to a shelf unit 503, and a user 501.

FIG. 7 is similar to FIG. 6 except that FIG. 7 shows a different angle of the example operating environment.

In some implementations, the process environment 700 is configured to identify the shoppers (or user 501) and detect the shoppers' activities using a device 603 including a depth camera mounted onto a shelf unit 503. In some implementations, the device 603 comprises a depth camera 605, a process unit (not pictured) equipped with an accelerometer, and a wireless communication module (not pictured). The device 603 is designed to be easily plugged on the top of a typical store shelf unit 503 such that the device is plugged at known locations of the shelf unit 503 to define the position of the individual shelves and virtual bins of items 702 respective to the device 603.

In some implementations, the depth camera is tilted downward to capture the edges of the individual shelves of the shelf unit 503 and whole bodies of users 501 to track the 3d positions of the joints 301 relative to the device 303. The depth camera is pointed down because depth cameras are able to present information about where a certain object is such as whether a user's wrist is inside or outside of a bin. Accordingly, the depth cameras work in tandem with a virtual map of all the bins to determine which bin the shopper is interacting with. Once a shopper has picked up an item, the device determines what item is in the shopper's hands using the depth camera and detect what item the object corresponds to (e.g., coke can, box of cereal. etc.). The depth cameras are also advantageous over other embodiments because depth cameras (as opposed to other image sensors) require less computation and put less computation strain on computing systems. This allows real-time image processing at the local edge devices, which is very quick compared to processing images on a cloud.

Moreover, FIG. 7 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 8:
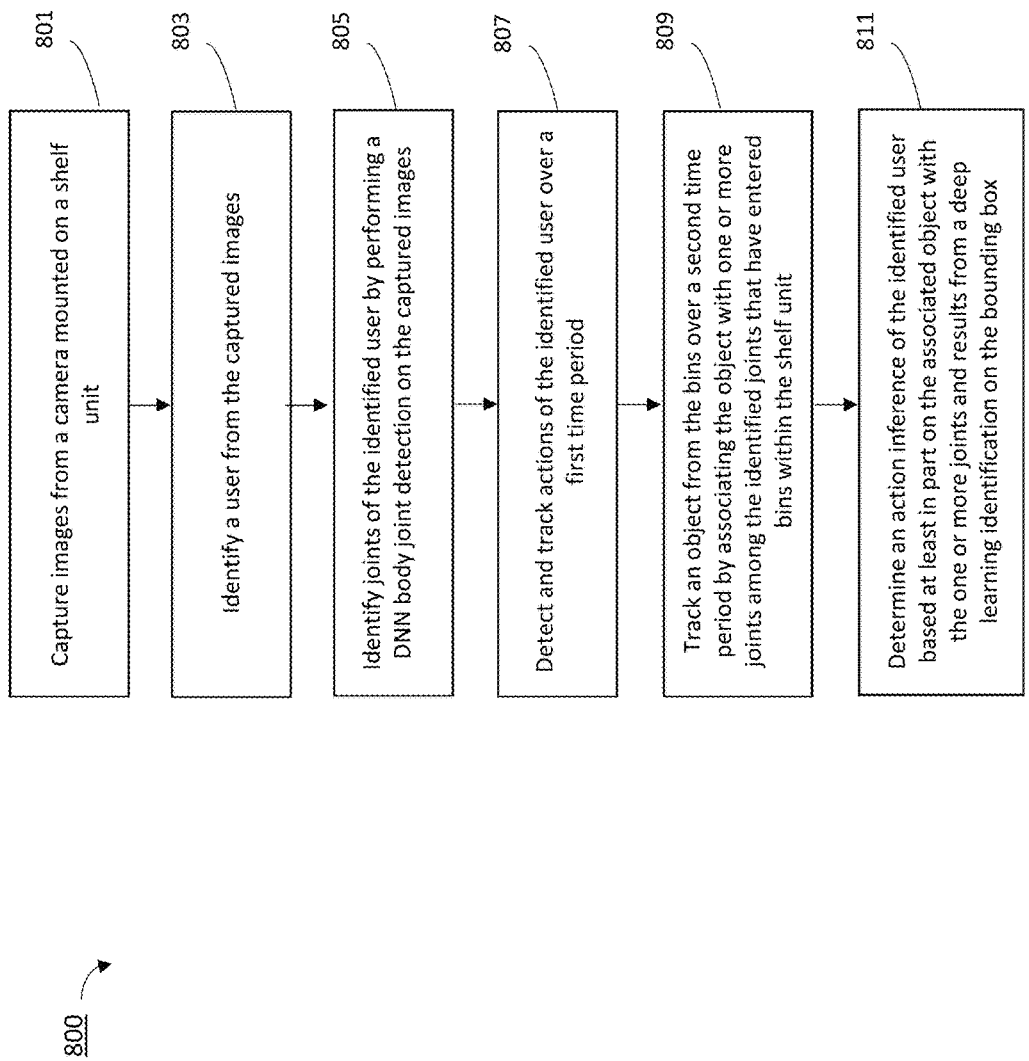
FIG. 8 is a flowchart representation of identifying users and monitoring a behavior in a user in accordance with some implementations.

FIG. 8 is a flowchart representation of a method 800 for identifying users and monitoring a behavior of the users in accordance with some implementations. In various implementations, the tracking method 800 is performed by a device (e.g., the AI device 100 shown in FIG. 1) with one or more processors and non-transitory memory that trains the machine learning training system. In some implementations, the tracking method 800 is performed by processing logic, including hardware, firmware, software, or a combination thereof. In some implementations, the tracking method 800 is performed by a processor executing code stored in a non-transitory computer-readable medium (e.g., a memory). At a high level, the tracking method 800 uses AI algorithms and machine to identify, monitor, and track shoppers and an embedded computer vision algorithm to detect items that are being picked up or returned back from the shelves for anti-fraud purposes, inventory management, and performing shopper behavior analytics. Specifically, the tracking method 800 includes: capturing images from a depth camera mounted on a shelf unit, identifying a user from the captured image, identifying joints of the identified user by performing a deep neural network (DNN) body joint detection on the captured images; detecting and tracking actions of the identified user over a first time period; tracking an object from the bins over a second time period by associating the object with one or more joints among the identified joints that have entered the bins within the shelf unit, and determining an action of the identified user based at least in part on the associated object with the one or more joints and results from the deep learning identification on the bounding box.

For example, in the 2D image, the device knows which group of pixels correspond to a particular user's wrists because the depth camera provides depth information with respect to every pixel. The device then matches the wrist pixel with the depth data to tell us where a user #1's wrist is or where user 2's wrist is. This allows the device to know that if user #1 is moving his hand into bin #7 and user #2 is moving his hand into bin #9, then we know that user 1 has picked up an item mapped to bin #7 and that user 2 has picked up an item mapped to bin #9 because the device is equipped with the location of each item in the unit.

As represented by block 801, the tracking method 800 includes capturing images from a camera mounted on a shelf unit. In some implementations, the camera does not require any external calibration. In some implementations, the camera corresponds to a depth camera. In some implementations, the camera corresponds to multiple monocular cameras. As will be explained in FIG. 14 below, the tracking method 800 is slightly different when a device (e.g., device 401 shown in FIG. 4, device 603 shown in FIGS. 6, 7, and 14) is equipped with monocular cameras rather than a single depth camera. In some implementations, the captured images are post processed using computer vision to process the colored data.

As represented by block 803, the tracking method 800 include identifying a user from the captured images. In some implementations, the 2D captured images are used to generates 3D mappings to determine whether a user's limbs are inside a bin of the shelf unit or not (see FIG. 6).

As represented by block 805, the tracking method includes identifying joints of the identified user by performing a DNN body joint detection on the captured images. In some implementations, the captured image comprises a representation of a body of a user in order to determine at least 17 joints of the identified user (see FIGS. 10 and 11). In some implementations, the at least 17 joints comprise at least one of a left shoulder, right shoulder, left arm, right arm, left wrist, right wrist, left hand, or right hand. In some implementations, the detected skeleton in 2D defines the region of the body. In some implementations, the deep neural network describes the image crop surrounding the body as a feature vector. The vector implicitly describes the body shape, clothing, and facial features of the user for identification over time and across different shelf units. In some implementations, the identified joints do not correspond to facial recognition.

In other words, the deep learning models are used for determining who a user is. In some implementations, given an image frame, a key-point based body pose detector discriminates anatomical structure of bodies 601 in the view of the camera. In some implementations, the depth camera provides a map of an image with depth information (e.g., point cloud) mapped for every pixel. This allows the tracking method 800 to match a wrist pixel with depth data in order to determine who the wrist belongs to since the device has mapped which group of pixels from the 2D image is associated with a particular user's wrist. In particular, the tracking method 800 analyzes a user's wrist to determine whether the user is sticking his hand into a bin on the shelf unit to pick up or return an object into the bin.

As represented by block 807, the tracking method 800 includes detecting and tracking actions of the identified user over a first time period by: detecting an affinity of joints for performing a deep learning identification on a first bounding box to identify a particular user and for associating the results from the deep neural network body joint detection with the particular user to re-identify joints of the identified user, wherein the first bounding box comprises identified joints of the identified user, transforming a 2D position information of the identified joints into a 3D position information of the identified joints by mapping 2D locations of the detected joints in the captured images to a corresponding point cloud, and tracking the 3D position information of the detected joints to determine when the detected joint has entered bins within the shelf unit, wherein the detected joints comprise at least a wrist.

At a high level, detecting an affinity of joints determines whether a set of joints belongs to user #1 or user #2. Specifically, detecting affinity of joints further comprises creating a feature map of a the identified user to generate a unique feature blob associated with the user, determining the bounding box for the identified user, and inputting the determined bounding box into a model for generating a unique identifier for the identified user, wherein the generated unique identifier for the identified user is transmitted to other devices for identifying the particular user across the other devices.

Figure 10:
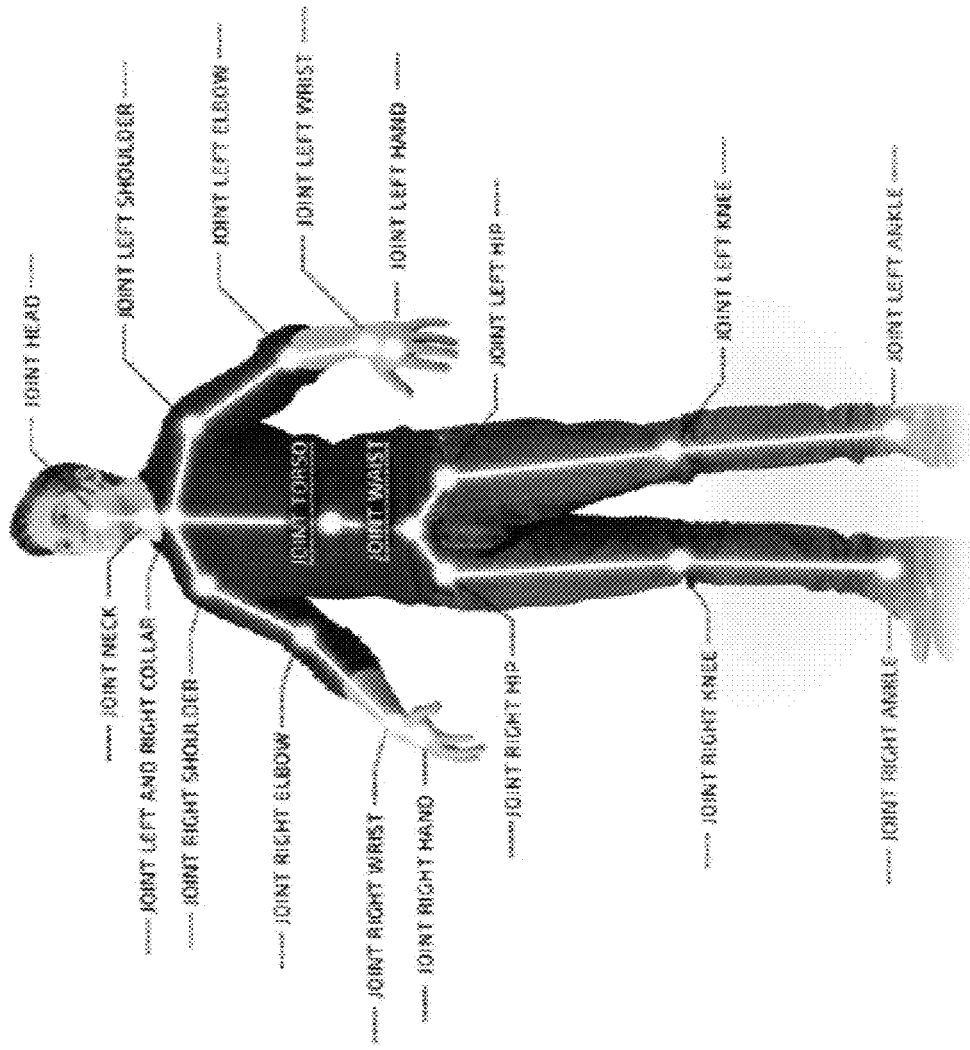
FIG. 10 is a representation of tracking a user from a captured image in accordance with some implementations.

In some implementations, the method includes transforming a 2D position information of joints of the identified user into a 3D position information. In some implementations, given an image frame, a key-point based body pose detector discriminates anatomical structure of a body of the user in the view. In some implementations, the detected skeleton in 2D defines the region of the body, which is shown in FIGS. 10-11 below. An example of transforming a 2D position information of joints of the identified user into a 3D position information is described in further detail in FIGS. 10-11 below. In some implementations, the 3D position information of the joints are estimated and tracked over time using an estimation-based multi-object tracker such as Extended-Kalman Filter by mapping the 2D location of the joints in the image to a corresponding point cloud. In some implementations, the tracker can handle partial occlusion or complete occlusions for certain time periods, as described in further detail below in FIG. 12.

In some implementations, performing the deep learning identification on the first bounding box further comprises: creating a feature map of a particular user to generate a unique feature blob associated with the particular user, determining the first bounding box for the particular user, and inputting the determined first bounding box into a model for uniquely identifying the particular user. In some implementations, the unique identification is only created once because the feature map of the particular user is created using the unique feature blob. In some implementations, the fingerprinted user is transmitted to other devices for identifying the particular user across the other devices. In some implementations, the particular user is uniquely identified based at least in part on a body type, clothing, a body shape, or facial features for identifying the particular user across other shelf units. In some implementations, the first bounding box contains at least 17 joints of a unique human. In some implementations, the first bounding box is the smallest rectangle where the unique human is present.

In some implementations, a deep neural network describes the image crop surrounding the body as a feature vector. As another example, the one or more processors knows that there are at least 17 joints for a user. The device then generates a rectangular-shaped bounding box containing the at least 17 joints because the device understands that the generated rectangular-shaped bounding box contains a complete unique human. The feature vector implicitly describes the body shape, clothing, and facial feature of the user for identification over time and across other shelf units. These features will be compared against features of other humans for identification purposes. In some implementations, a unique feature blob is created which corresponds to a single human. In some implementations, the unique feature blob is matched with different people to identify users. In some implementations, the feature vector corresponds to 512 feature sets. In some implementations, the feature vector contains more than 512 feature sets.

In some implementations, the tracking method 800 includes tracking 3D position of joints of the identified user over a first time period based at least in part on a position of a shoulder, arm, or hand of the user. This also helps create an association of a user's wrists with an object for tracking a user over time so the tracking method 800 knows whether that user has his wrists in unit 1 or unit 2. The device and camera are plugged at known locations of the shelf unit so it is easy to define position of shelf and virtual bins of items respective to the camera coordinate system without external calibration. In addition, all of the objects are in known locations of bins within the shelf units so the device can determine what item was picked up when a user puts his wrists into a bin. In some implementations, hand activities of the user such as picking up an item or returning an object back to the bin in the shelf unit can be monitored and tracked by knowing a position of a shoulder, arm, and hand of the user.

As represented by block 809, the tracking method 800 includes tracking an object from the bins over a second time period by associating the object with a joint among the identified joints. In some implementations, the object is associated with the joint based at least in part on a determination that the 3D position of the detected joint has entered a particular bin within the shelf unit. In some implementations, the object was predetermined to be located in the particular bin. In some implementations, a virtual map of the location of the bins on the shelf units and corresponding objects located in the bins are stored on a memory storage on the shelf unit. In some implementations, the virtual map is stored on the memory storage on all the shelf units.

In some implementations, detecting the object associated with the identified user further comprises: generating a second bounding box around a wrist of the identified user for associating the detected object with the wrist of the identified user; projecting the generated second bounding box to the captured image; masking out pixels with a depth distance further than a second predefined distance from a depth of the hand of the identified user in the generated second bounding box, wherein the generated second bounding box is projected on a wrist of a user to identify which object the user is interacting with; and identifying the object in remaining pixel blobs. A feature-based object detector identifies objects in remaining pixel blobs. This process is explained in further detail in FIG. 12. By monitoring detected objects over time, the tracking method 800 may detect whenever an item is picked up or returned back over time.

As represented by block 811, the tracking method 800 includes determining an action inference of the identified user based at least in part on the associated object with the joint and results from the deep learning identification on the bounding box. In some implementations, the shelf unit is equipped with other sensors (such as weight, proximity, or RFID sensor) for corresponding sensor events with actions of a shopper. In some implementations, the action inference corresponds adding the object in a virtual shopping basket when it is determined that the user picks up the object from the respective bin or removing the object in the virtual shopping basket when it is determined that the user returns the object to the respective bin. In some implementations, the action inference corresponds to the virtual shopping basket updating by counting the number of objects that user picks up from the bin when it is determined that the user picks up the objects from the respective bins or counting the number of objects that the user returns to the bin when it is determined that the user returns the objects to the respective bins.

Figure 9:
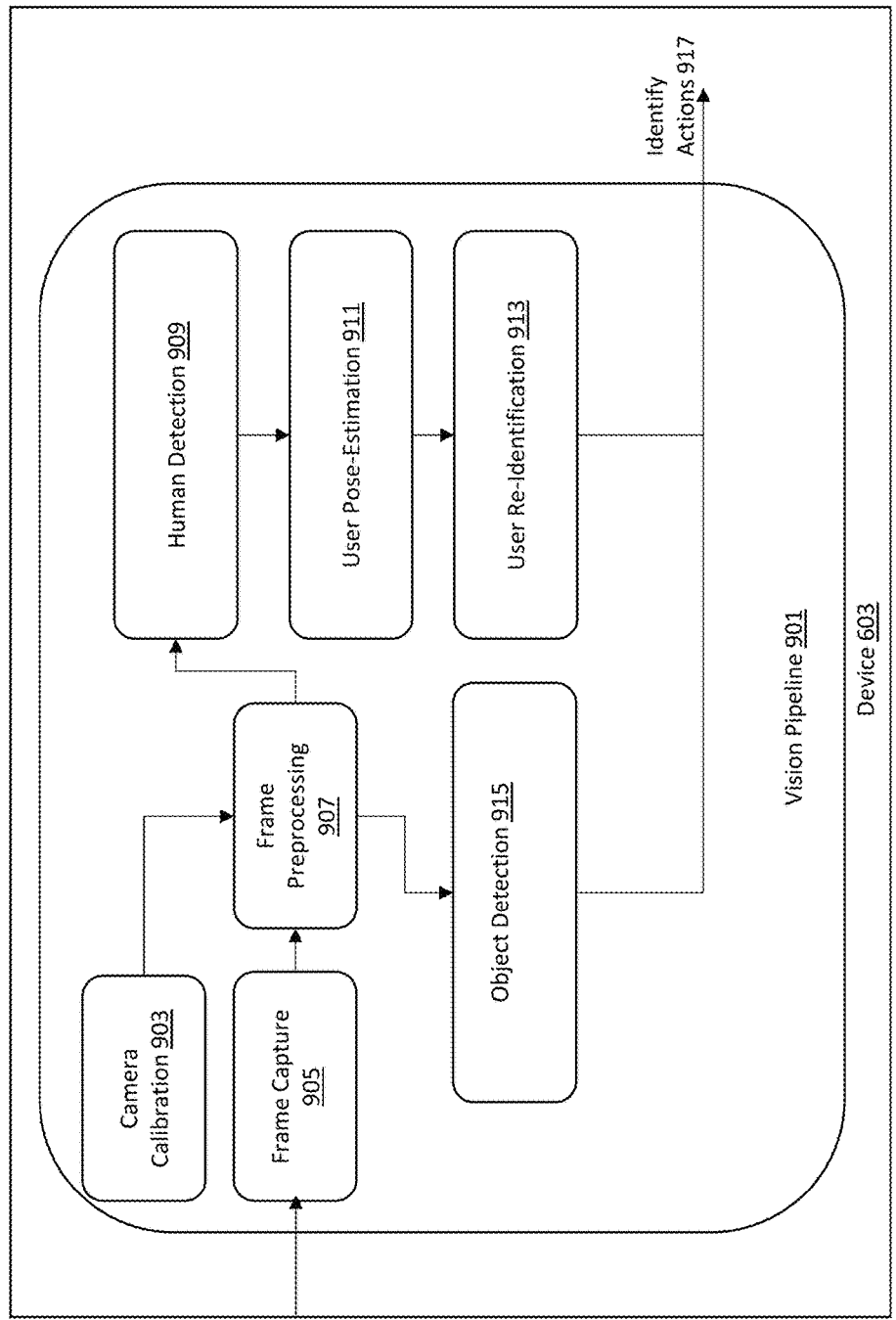
FIG. 9 is a block diagram of a vision pipeline for automated shopping in accordance with some implementations.

FIG. 9 is a block diagram of a vision pipeline for automated shopping in accordance with some implementations. In various implementations, the process environment 900 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 900 includes at least a device with a camera 605, and a vision pipeline that processed the captured image with camera calibration, frame capture, frame preprocessing, object detection, human detection, user pose-estimation, and user re-identification.

At a high level, the process environment 900 includes the camera 605 capturing an image of a body of a user for processing in the vision pipeline 901 in order to identify actions 917 of the user. As mentioned above, the vision pipeline 901 can be implemented in any single device and data generated from the vision pipeline 901 can be shared with other devices within the store. In addition, the vision pipeline 901 can also be implemented by one or more processors.

In some implementations, the vision pipeline 901 is a high level representation of the tracking method (tracking method 800 shown in FIG. 8). As an initial matter, the camera 605 does not need any external calibration (step 903). Instead, the camera may be intrinsically and extrinsically calibrated directly by the device. As mentioned above, since the device and camera are plugged in at known locations on the shelf unit, it is easy to define positions of the shelf and virtual bins of items respective to the camera coordinate system without any external calibration.

Next, the captured image of the body of the user enters the vision pipeline 901 via frame capture (step 905). The frame is preprocessed (step 907) using computer vision to process the colored data. In some implementations, the device is equipped with multiple cameras (e.g., a pair of monocular cameras shown in FIG. 13). In this case, the preprocessing includes fetching synced color frames from the monocular cameras in intervals of less than 200 for batching the frames together.

The pre-processed frame is then processed for object detection (step 915) and human detection (step 909). The object detection detects what object a user is holding by generating a second bounding box (e.g., bounding box 311 in FIG. 6) around a hand or wrist position of a user and projected to the 2D image. The object detection process is described in further detail in FIG. 12. In some implementations, the object detection is performed using a feature-based object detector. In some implementations, the object detection is used for validation that the correct item is in the bin of the shelf unit.

The processed frame is also processed for human detection to identify the body of the user as different users (step 909) using at least 17 joints in a user's body and an AI model to create a skeletal structure (see skeletal structure 1000 in FIG. 10 and the skeletal structure 1100 in FIG. 11). In some implementations, biodynamic algorithms are also used to separate different humans.

The skeletal structure is processed for body pose-estimation (step 911) to estimate and track the 3D position of the joints over time using deep learning models to create a first bounding box of the identified user. The first bounding box is used to create a feature blob that is also unique to each user.

The 3D positions of the joints of an identified user are then processed by a user re-identification module (step 913) when the identified user moves to another shelf unit or the device is equipped with multiple cameras (e.g., a pair of monocular cameras). Here, the bounding box is processed for re-identification such that the device compares re-identified features with another device to see if the user is the same between different cameras (e.g., monocular cameras) or cameras on different devices to track the identified user across different shelf units.

Finally, an action can be inferred from the identified user based at least in part on results from the object detection (step 915) and the user re-identification (step 913). In some implementations, the action will be picking up a particular item from the bin on the shelf unit or returning the particular item to the bin on the shelf unit. In some implementations, the action can also be picking up a particular quantity of items from the bin on the shelf unit or returning a particular quantity of items to the bin on the shelf unit. In some implementations, the action may be picking up an incorrect item from the bin on the shelf or returning an incorrect item to the bin on the shelf.

Moreover, FIG. 9 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 10 a representation of tracking a user from a captured image in accordance with some implementations. In some implementations, a color frame is a 2D image that is obtained by the camera. The 2D image goes into a vision pipeline (as described above in FIG. 9) and is processed by an AI model called a pose estimation. Here, the AI model identifies users as different humans and at least 17 joints in the body of a user. This creates a 1000 skeletal structure (e.g., how many limbs, eyes, chin, etc.). As a non-limiting example, FIG. 10 shows that the at least 17 joints of a user may include (but is not limited to): a head, a neck, a left and right collar, a left shoulder, a right shoulder, a left elbow, a right elbow, a torso, a waist, a left wrist, a right wrist, a left hand, a right hand, a left hip, a right hip, a left knee, a right knee, a left ankle, or a right ankle. The 1000 skeletal structure does not include any facial recognition to maintain a user's privacy. In some implementations, the device then uses the 1000 skeletal structure to separate and distinguish between two different humans using a biodynamic algorithm.

FIG. 11 is another representation of tracking a user from a captured image in accordance with some implementations. The operating environment 1100 illustrates a real-world implementation of creating a skeletal structure (e.g., 1000 skeletal structure shown in FIG. 10).

Figure 12:
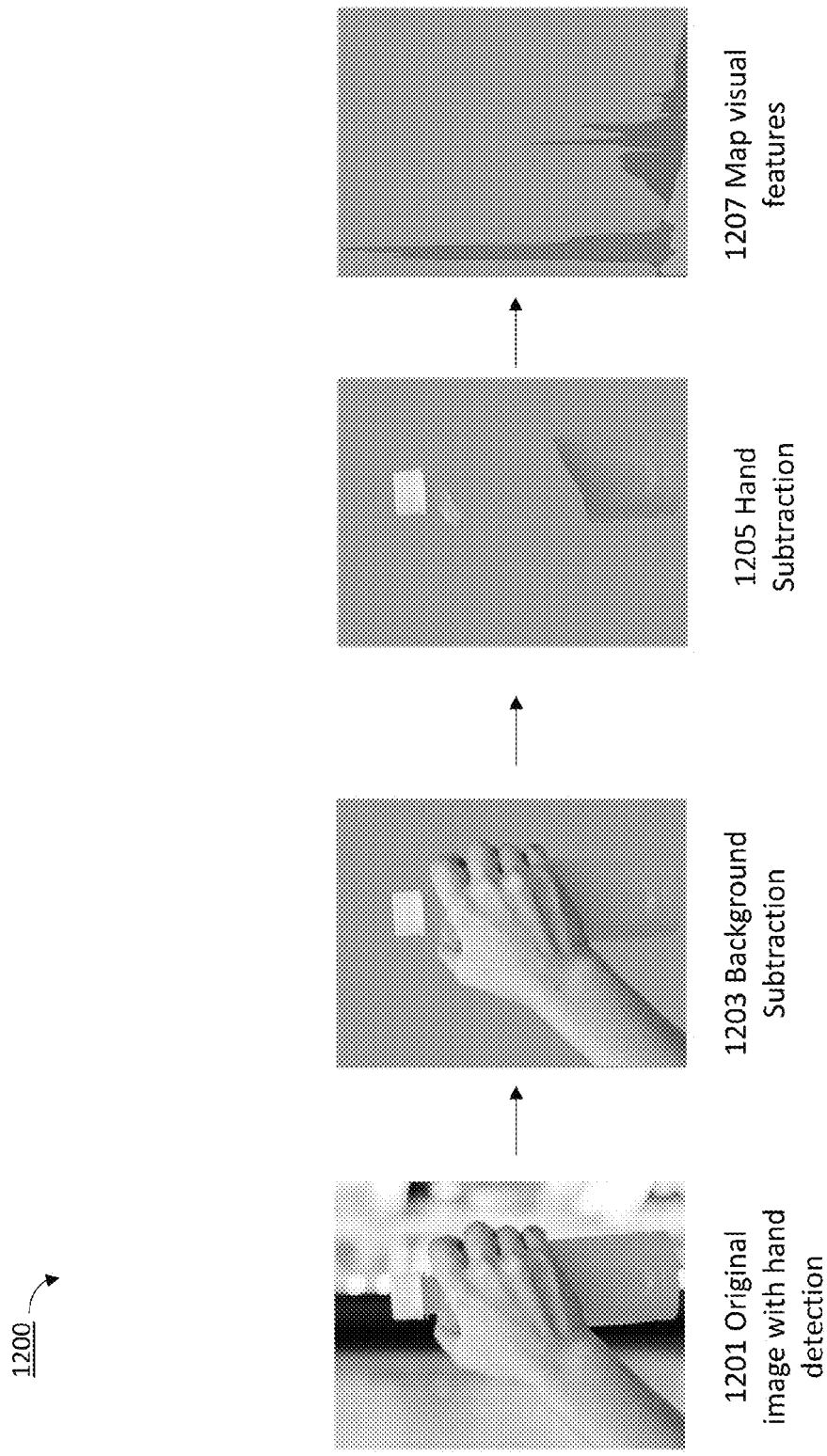
FIG. 12 is an example of object detection in accordance with some implementations.

FIG. 12 illustrates a process for object detection in accordance with some implementations. While certain specific features are illustrated, those skilled in the art will appreciate from the present disclosure that various other features have not been illustrated for the sake of brevity, and so as not to obscure more pertinent aspects of the implementations disclosed herein. At a high level, the detection process 1200 uses AI algorithms and machine learning to detect objects picked up by a user, matching the detected object features with features of objects in the inventory, tracking the detected object over time and detecting if the object has been misplaced.

As a non-limiting example and for the sake of brevity, FIG. 12 shows a process for analyzing a few pixels rather than analyzing each pixel in the plurality of image data frames. While some specific pixels and features are illustrated, those of ordinary skill in the art will appreciate from the present disclosure that various pixels and features have not been illustrated for the sake of brevity and so as not to obscure the more pertinent aspects of FIG. 12. However, those of ordinary skill in the art will appreciate from the present disclosure that this process (e.g., method 1200) can occur on each pixel in the plurality of image data frames.

In some implementations, the process 1200 illustrates the process of object detection by obtaining an image with hand detection (1201). In some implementations, a second bounding box (not shown in FIG. 12, but shown as second bounding box 311 in FIG. 6) around a hand position of the user 501 is projected to the 2d image to detect objects 609 in the hand of a user 501.

In some implementations, the process 1200 illustrates a background subtraction process. In some implementations, pixels with depths further from the depth of the hand by a pre-defined value are masked out in the bounding box of the projected box. In some implementations, pixels with depths further from the depth of the hand may be measured by a visual determination.

In some implementations, the process 1200 illustrates a hand subtraction process. In some implementations, a feature based object detector identifies objects in the remaining pixel blobs. By monitoring the detected items over time, pick-up or returns of the item can be detected and tracked for real-time inventory management.

In some implementations, the process 1200 illustrates mapping visual features of the item.

Figure 13:
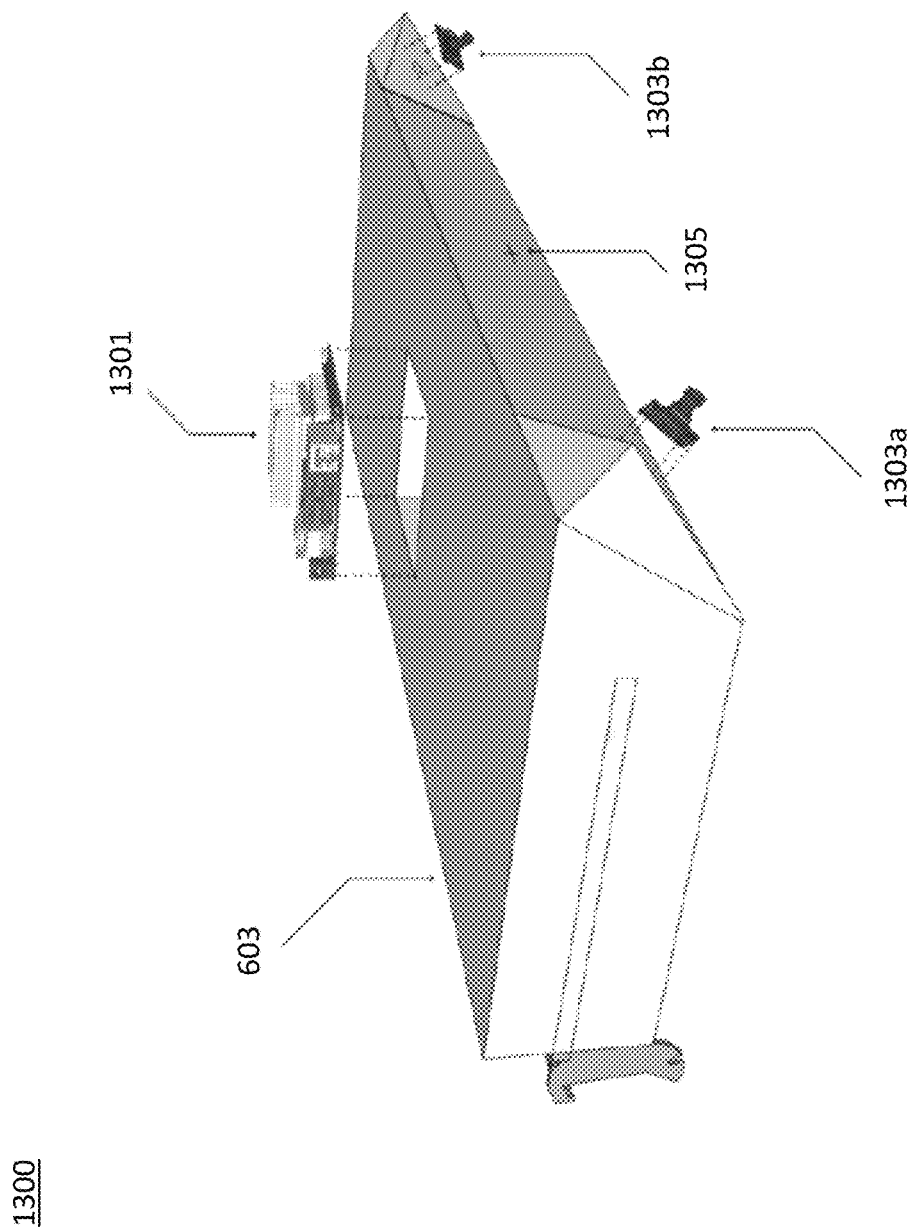
FIG. 13 is a block diagram of an example operating environment for identifying shoppers and detecting activities of a shopper across shelf units using at least two monocular cameras in accordance with some implementations.

FIG. 13 is a block diagram of an example operating environment for identifying shoppers and detecting activities of a shopper across shelf units using at least two monocular camera in accordance with some implementations. In various implementations, the operating environment 1300 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 1300 includes at least a device 603 comprising a process unit 1301 equipped with an accelerometer (not pictured), a communication module (not pictured), and a first monocular camera 1303a and a second monocular camera 1303b that is connected 607 to a shelf unit (not pictured).

FIG. 13 differs from FIGS. 6 and 7 because FIG. 13 illustrates the process environment 1300 with a device 603 equipped with two monocular cameras 1303a, 1303b rather than a single depth sensor camera (depth camera 605 shown in FIG. 6) in the device 603. The advantage to replacing the device 603 with two monocular cameras 1303a, 1303b is that the two monocular cameras 1303a, 1303b provide a larger field of view for monitoring events in different angles as compared to the depth camera 605. As a result, the monocular cameras 1303a, 1303b manage partial and complete occlusions of users and shelves better than a single depth camera. In addition, the monocular cameras 1303a, 1303b have a much lower cost perspective as compared to a depth sensor camera. As an example, the monocular cameras 1303a, 1303b work similar to how a human has two eyes for depth perception.

In some implementations, the process environment 1300 is configured to identify the shoppers and detect the shoppers' activities using a device 603 including a depth camera mounted onto a shelf unit 503. The device 603 is also designed to be easily plugged on the top of a typical store shelf unit 503 such that the device is plugged at known locations of the shelf unit 503 to define the position of the individual shelves and virtual bins of items 702 respective to the device 603.

In some implementations, the first monocular camera 1303a is placed at a first top corner of the shelf unit and the second monocular camera 1303b is placed at a second top corner of the shelf unit such that the monocular cameras 1303a, 1303b are tilted downward toward the center of the shelf units. In some implementations, the first monocular camera 1303a and the second monocular camera 1303b are tilted to capture the edges of the shelves and whole bodies of people in front of the shelves. In some implementations, the monocular cameras 1303a, 1303b are calibrated at the time of manufacture to estimate the intrinsic and extrinsic parameters of the monocular cameras 1303*a*, 1303*b* relative to the front center of the device 603, also called the device origin 1305.

In some implementations, the process unit 1301 fetches synced color frames from the monocular cameras 1303*a*, 1303*b* in intervals of less than 200 for batching the frames together. Given a batch of two image frames, a key-point based body pose detector (e.g., the person pose-estimation 911 described in FIG. 9) discriminates anatomical structures of bodies in the left and right view. The detected skeleton in 2D defines the region of the body. A deep neural network describes the image crop surrounding the body as a feature vector. The vector implicitly describes the body shape, clothing, and facial features of the user for identification over time and across shelf units.

By using epipolar geometry between the monocular cameras 1303*a*, 1303*b* from calibration parameters and physical appearance features of the user, the correct correspondence between a left view and right view is computed for each given joint. Epipolar geometry is the geometry that relates the camera, points in 3D, and the corresponding observation. The 3D positions of the joints of a user relative to the device origin 1305 is estimated using direct linear transformation (DLT) or iterative energy minimization triangulation algorithm. The 3D joints are tracked over time using an estimated-based multi-object tracker such as Multi Target Extended-Kalman filter to handle partial occlusion or complete occlusions for certain time periods (see above in FIG. 12).

As the device is connected 607 at the known location on the shelf unit, it is easy to define the position of shelf and virtual bins of items respective to the device origin without additional external calibration at the store. By knowing the positions of the shoulders, arms, and hands of users, the device 603 can detect hand actions such as the picking up of an item or returning of an item back to the shelves. In the event that the shelf unit is equipped with other sensors (such as weight, proximity, RFID sensor, or the like), the device 603 can associate sensor events with a user's actions.

The process unit 1301 with the accelerometer is used if the environment includes hanging racks on the shelf unit. The hanging racks work in a similar way as placed bins on the shelf unit. For example, a virtual map may describe the predetermined location of objects that are hanging on racks. The accelerometer is then used to determine when an item is pulled off of the rack or put back onto the rack.

Similar to the system diagram described in FIG. 6, a wrist bounding box (e.g., 311 shown in FIG. 6) around a user's hand position is projected to the left and right images. A feature-based object detector identifies objects in the second bounding boxes of the left and right images. By monitoring detected objects over a time period, the device 603 can detect that a user has picked up an item or returned an item.

The main differences between a device equipped with a depth camera and a device equipped with monocular cameras is that the device equipped monocular cameras cannot provide depth information and that the two monocular cameras have a left camera view and a right camera view. This means that the device 603 will need to process the image twice for the same amount of data. The first monocular camera 1303*a* and the second monocular camera 1303*b* also forces a correction due to the placement of the two cameras. In addition, there is an effort to map the first monocular camera 1303*a* to left view and the second monocular camera 1303*b* to a right view. Accordingly, the tracking method (e.g., the tracking method 800 shown in FIG. 8) will require a few additional steps as compared to a device with a single depth camera because the monocular cameras 1303*a*, 1303*b* may capture multiple humans within the image frame and will need to implement epipolar geometry or stereographic estimation.

The process of implementing a tracking method (e.g., the tracking method 800 shown in FIG. 8) when two users are in view of the monocular cameras will be described below. Although the process below is described when the device 603 is equipped with two monocular cameras 1303*a*, 1303*b* the process can be implemented using any number of monocular cameras. The main difference between a device with a single depth camera and a device with monocular cameras 1303*a*, 1303*b* is with the processes of performing deep learning identification on a user bounding box (e.g., block 805 shown in FIG. 8) and the detection method (e.g., block 807 shown in FIG. 8).

As a non-limiting example, the first monocular camera 1303*a* captures an image of two users and the second monocular camera 1303*b* captures another corresponding image of the two users. In some implementations, both the frames from the first monocular camera 1303*a* and the second monocular camera 1303*b* will be processed individually to identify joints and groups of joints of the two users. This means that the first monocular camera 1303*a* will capture an image that contains two users and the second monocular camera 1303*b* will capture an image that also contains the two users. The problem here is determining which joints belong to which user.

In some implementations, the processes of performing DNN-based body joint detection (e.g., block 805 shown in FIG. 8) in each view, detecting affinity of joints in each view, and performing deep learning user identification on the user bounding box will be performed once for the left view and right view in each batch.

The device 603 contains RGB information and a color frame for identifying the joints of a particular user. The device 603 then determines a bounding box of the user using the identified joints. The device 603 performs user identification on the first group of joints associated with the images captured by the first monocular camera 1303*a* and performs user identification on the second group of joints associated with the images captured by the second monocular cameras 1303*b*. When the monocular cameras 1303*a*, 1303*b* only captures a single user, the user identification is performed two times for each camera. However, in the case where the monocular cameras 1303*a*, 1303*b* captures two users, the user identification is performed four times since there are four groups of joints.

Specifically, the bounding box is processed for re-identification. The device 603 then compares the re-identified features with one another to determine if the user is the same in the first monocular camera 1303*a* and the second monocular camera 1303*b*. In some implementations, the first monocular camera 1303*a* predicts a left wrist position of the user and the second monocular camera 1303*b* predicts a right wrist position of the user. The device then uses stereographic positions to estimate whether the wrist of a user is in the bin or not.

After image processing using the identification process, the device can determine which group of joints is captured by the first monocular camera 1303*a* and which groups of joints is captured by the second monocular camera 1303*b* by determining joint correspondence in the left view and right view. For example, this results in two readings of a first user's left wrist and the device 603 can determine how far away the first user's left wrist is using epipolar geometry.

In addition, with the monocular cameras, each monocular camera identifies the at least 17 joints of a user, creates a user bounding box, and creates a unique feature blob. Once the device 603 generates a unique feature blob, the device 603 is able to compare the different feature blobs to create multiple sets depending on how many users are captured by the monocular cameras 1303a, 1303b. If there is more than one user, then a set is created for each user. If there are two sets (e.g., two users captured by the monocular cameras), then the device 603 identifies where the wrist positions are with respect to the shelf unit or bin using epipolar geometry. Once the wrist is identified with respect to the shelf unit or bin and the device 603 identifies (or associates) the user who the wrist belongs to, the remaining process is similar to using a single depth camera.

Moreover, FIG. 13 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 13 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 14:
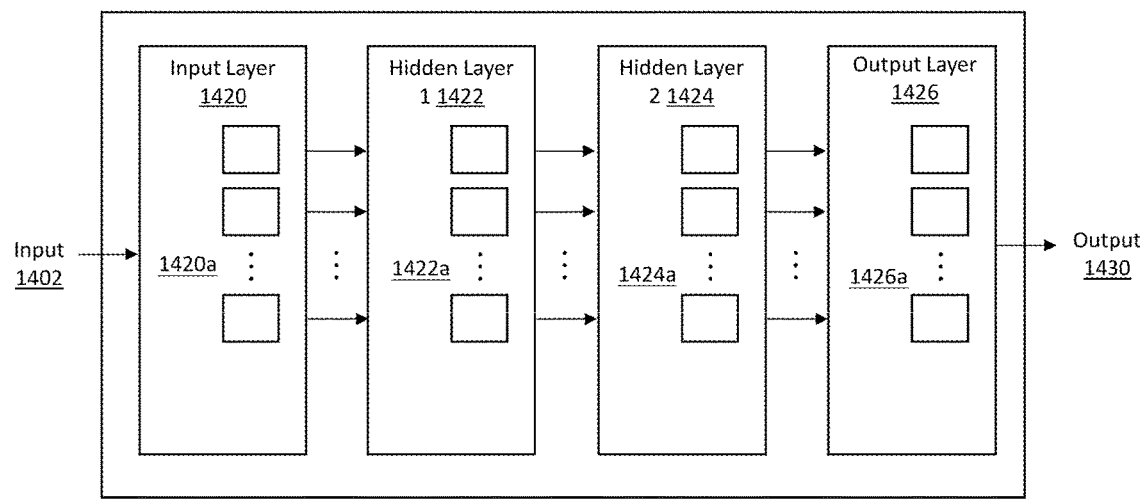
FIG. 14 is a block diagram of an example neural network 1000 according to some implementations.

FIG. 14 is a block diagram of an example neural network 1000 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 1400 includes an input layer 1420, a first hidden layer 1422, a second hidden layer 1424, and an output layer 1426. While the neural network 1400 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 1420 is coupled (e.g., configured) to receive various inputs 1402 (e.g., image data). For example, the input layer 1420 receives pixel data from one or more image sensors (e.g., the depth camera 605 shown in FIG. 6 or the monocular cameras 1303a, 1023b shown in FIG. 13). In various implementations, the input layer 1420 includes a number of long short-term memory (LSTM) logic units 1420a, which are also referred to as model(s) of neurons by those of ordinary skill in the art. In some such implementations, an input matrix from the features to the LSTM logic units 1420a include rectangular matrices. For example, the size of this matrix is a function of the number of features included in the feature stream.

In some implementations, the first hidden layer 1422 includes a number of LSTM logic units 1422a. In some implementations, the number of LSTM logic units 1422a ranges between approximately 10-500. Those of ordinary skill in the art will appreciate that, in such implementations, the number of LSTM logic units per layer is orders of magnitude smaller than previously known approaches (being of the order of $O(10^1)$ to $O(10^2)$), which allows such implementations to be embedded in highly resource-constrained devices. As illustrated in the example of FIG. 14, the first hidden layer 1422 receives its inputs from the input layer 1420. For example, the first hidden layer 1422 performs one or more of following: a convolutional operation, a nonlinearity operation, a normalization operation, a pooling operation, and/or the like.

In some implementations, the second hidden layer 1424 includes a number of LSTM logic units 1424a. In some implementations, the number of LSTM logic units 1424a is the same as or similar to the number of LSTM logic units 1420a in the input layer 1420 or the number of LSTM logic units 1422a in the first hidden layer 1422. As illustrated in the example of FIG. 14, the second hidden layer 1424 receives its inputs from the first hidden layer 1422. Additionally and/or alternatively, in some implementations, the second hidden layer 1424 receives its inputs from the input layer 1420. For example, the second hidden layer 1424 performs one or more of following: a convolutional operation, a nonlinearity operation, a normalization operation, a pooling operation, and/or the like.

In some implementations, the output layer 1426 includes a number of LSTM logic units 1426a. In some implementations, the number of LSTM logic units 1426a is the same as or similar to the number of LSTM logic units 1420a in the input layer 1420, the number of LSTM logic units 1422a in the first hidden layer 1422, or the number of LSTM logic units 1424a in the second hidden layer 1424. In some implementations, the output layer 1426 is a task-dependent layer that performs a computer vision related task such as feature extraction, object recognition, object detection, pose estimation, or the like. In some implementations, the output layer 1426 includes an implementation of a multinomial logistic function (e.g., a soft-max function) that produces a number of outputs 1430.

Neural networks, such as CNNs are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Figure 15:
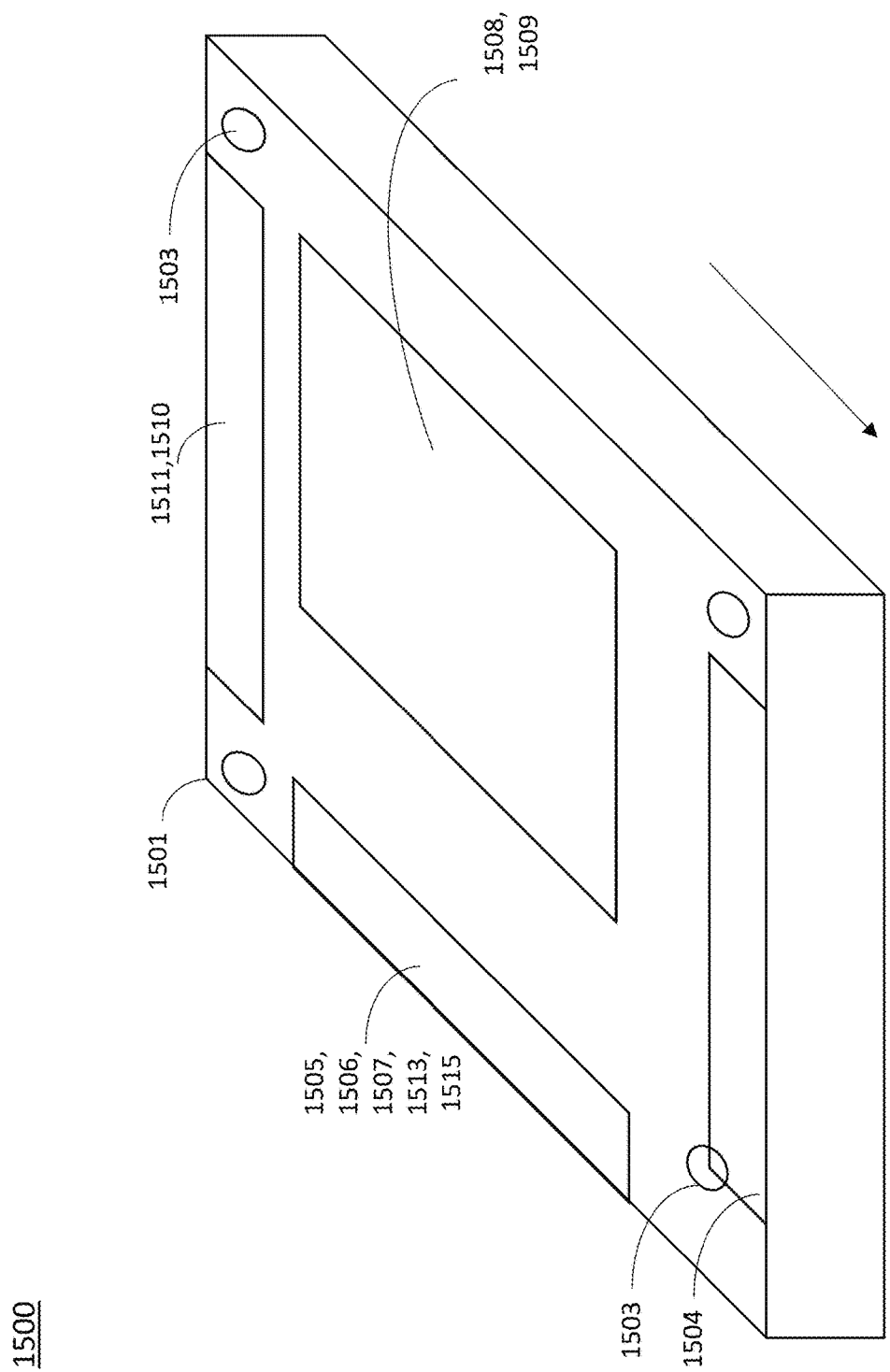
FIG. 15 is a block diagram of an example operating environment for thin plates having embedded sensors and wireless connectivity to keep track of inventory in accordance with some implementations.

FIG. 15 is a block diagram of an example operating environment for thin plates having embedded sensors and wireless connectivity to keep track of inventory in accordance with some implementations. In various implementations, the operating environment 1500 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 1500 includes at least a device 1501 comprising weight sensors 1503, RFID readers 1504, environment sensors 1505, motion sensor 1506, wireless charging antenna 1511, battery 1510, I/O ports, a micro-controller 1508 (or processor) and wireless communication modules 1509.

At a high level, the device 1501 corresponds to a flat thin platform that is capable of being wirelessly charged and battery-powered. The device 1501 has a wireless communication module 1509 configured to send sensor streams wirelessly to other compute units and devices. The device 1501 may include sensors such as load-cells to detect pick-up and return of items, RFID reader 1504 to detect a SKU on an item using the RFID chip, environment sensors such as temperature 1508, humidity 1513, and gas sensors 1507, and motion detectors 1506 based on proximity sensors to detect an item and a quantities of the item, IR lights to detect movement of a hand within the bin. The prior embodiments of similar devices are difficult to install, not retrofittable and require wired connections. In addition, the prior embodiments require complex installations and assembly which take a high cost to install and maintain. In previous embodiments, if one component on the device or a single device from a system goes down, the whole system may be inoperable because it will take great effort to replace one sensor.

A benefit of the device 1501 is the ability to be wirelessly charged and connect to near-by nodes wirelessly to communicate and transmit the various sensor data. Another benefit of the device 1501 is that the device 1501 is scalable, modular and plug-and-play and does not require any out-of-the box assembly or professionals to install and maintain the device 1501.

Another innovation is that the device 1501 promotes easy installation and setup such that the device 1501 can easily be placed on top of existing shelving units in stores. In addition, any items can be easily placed on top of the device 1501. Among other things, the device 1501 is configured to quantify the items which are placed on the device 1501, measure the weight of items, and detect interaction with items such as the pickup and drop-down of items. A key component of the device 1501 is the ability to identify the item and quantify the number of items using the weight of the item. In addition, if the item has a RFID tag, the device 1501 can also uniquely identify each SKU and item based on the RFID tags.

In some implementations, the process environment 1500 is configured to keep track of inventory using the device 1501. In some implementations, the device 1501 is designed to be placed on the shelves of the shelving units such that items can be placed on the device 1501. In some implementations, the sensors 1503, 1504, 1505, 1506, 1507, 1513 are completely part of the shelf system such that the user does not see separate sensor units.

In some implementations, one or more weight sensors 1503 are placed and situated on the device 1501 for determining the weight of items placed on the device 1501. In some implementations, a number of weight sensors 1503 may increase depending on the size of the device 1501. In some implementations with more than one weight sensors 1503, the device 1501 may triangulate the location of an item that has been lifted or putback onto the device 1501. In some implementations, the one or more weight sensors 1503 work with a processor or microcontroller 1508 to identify an item and identify a number of items that are picked up or dropped down. In some implementations, the computer vision algorithms may cross validate the identification of the item and number of items identified by the device 1501.

In some implementations, the device 1501 includes a RFID antenna for detection of RFID tags placed on items. As shown in FIG. 15, the device 1501 is positioned and placed on the shelving unit such that the arrow shows an orientation of the device 1501 and RFID reader 1504 faces the outside of the shelves. In some implementations, the arrow indicates that the device 1501 directly faces a user interacting with the shelf unit. Accordingly, the orientation of the device 1501 helps determine which items are lifted and put back on the shelving unit because the shopper interacts with items having RFID tags from that side of the shelving unit.

In some implementations, the device 1501 also has environment sensors 1505 and motion detectors 1506. In some implementations, the environment sensors 1505 can include temperature sensors 1515 to determine temperature and humidity sensors 1513 to determine humidity. In some implementations, the temperature sensors 1515 have a feedback loop since the temperature sensor 1515 can be placed inside a cooler. In these situations, the cooler has a different temperature than room temperature so there should be temperature adjustments to adjust for the different temperature in the cooler.

In some implementations, the environment sensors 1505 may include gas sensors 1507 to detect spoiled meat or food products. Data obtained from the environment sensors 1505 and gas sensors 1507 can be used with the micro controller 1508 to detect and report any anomalies with the items placed on the device 1501. In some implementations, the motion detectors 1506 detect motion nearby or around the device 1501 such that the device 1501 may enter a sleep or low power mode to interrupt power to other sensors that are not required at the time for saving power.

In some implementations, the communication module 1509 may be low-power such that the communication module 1509 may enter an idle or low power state to save power.

In some implementations, the microcontroller 1508 (or processor) and wireless-communication module 1509 are configured to collect, analyze, and send data to the edge-node/gateway. In some implementations, the microcontroller 1508 controls the peripheral sensors and their connections for timely collection of data to make decisions and transmit data to other device for further application level usage. In some implementations, the microcontroller 1508 is configured to obtain images from the image sensors and readings from the sensors. In some implementations, all of the readings are taken on the device 1501 such that the image sensors may motivate the sensors and the sensors can motivate the image sensors.

In some implementations, the microcontroller 1508 obtains a constant stream of data from the weight sensors 1503. By analyzing the sensor data, the microcontroller 1508 can detect if any users is touching or interacting with the shelving unit. The microcontroller 1508 is also able to detect how much new weight is added to the device 1501 or how much weight is lifted off the device 1501. In this case, the microcontroller 1508 converts the data-stream into an event-based stream to be sent to the edge-node.

In some implementations, the battery 1510 is connected to the device 1501 so that the device 1501 can power itself for some time in the absence of power. In some implementations, the device 1501 also contains a wireless charging antenna 1511 at a rear of the device 1501 so that the device 1501 can be charged using near-field wireless charging technology.

In some implementations, the device 1501 is primarily dust and water resistant except for the environment and gas sensors. In some implementations, the device 1501 contains other I/O ports for other peripherals like IR light curtain and proximity sensors. In some implementations, the device 1501 I/O ports have the ability to debug, transfer data, and allow daisy-chain connections to similar devices.

Moreover, FIG. 15 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 15 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 16:
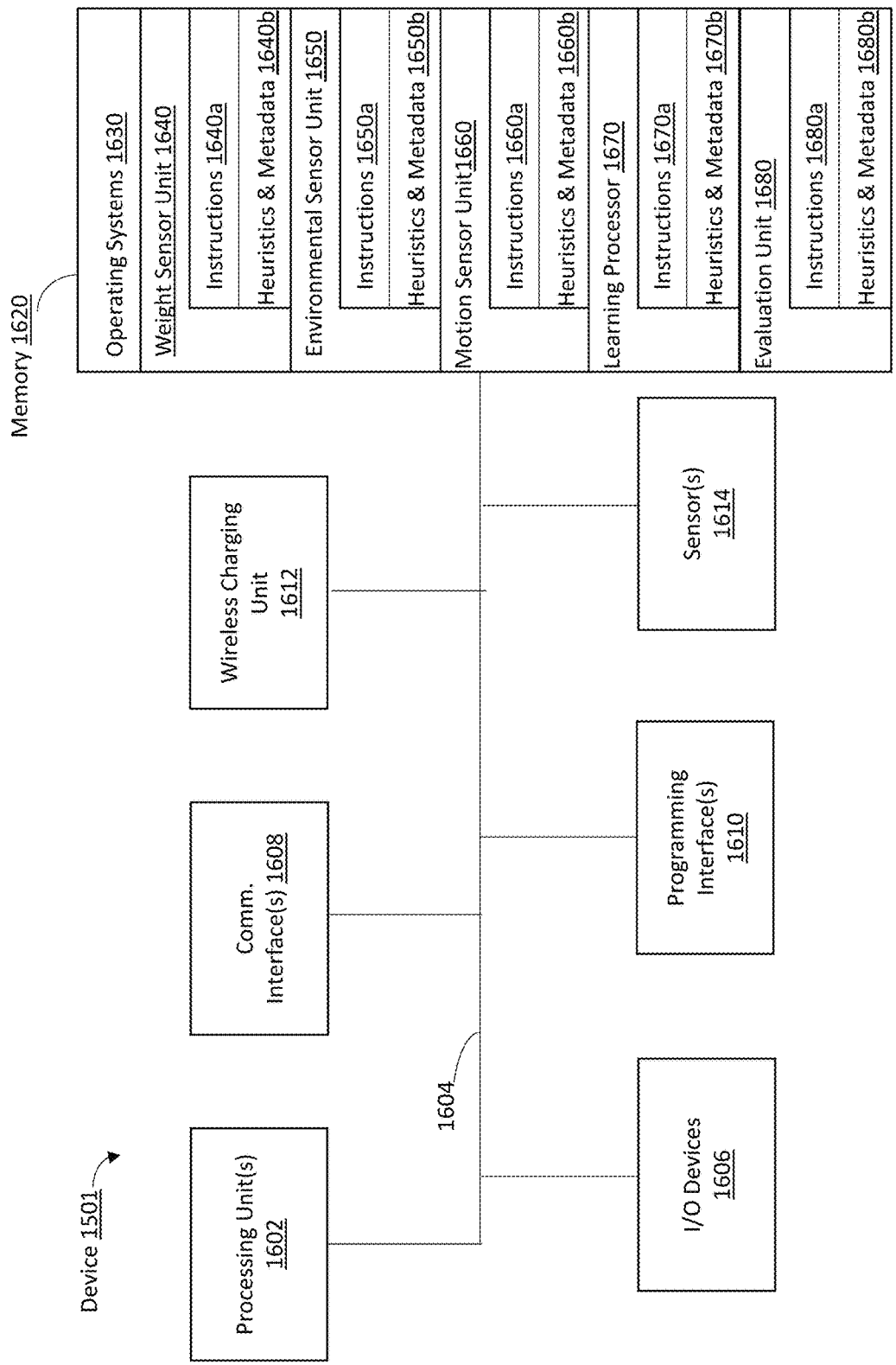
FIG. 16 is a block diagram of an example of a device 1501 in accordance with some implementations.

FIG. 16 is a block diagram of an example of a device 1501 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the AI device (e.g., the AI device 110 shown in FIG. 1) or the device 1501 includes one or more processing units 1602 (e.g., microprocessors, ASICs, FPGAs, GPUs, CPUs, processing cores, and/or the like), one or more sensors 1614, one or more wireless communications interfaces 1608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interfaces), one or more programming (e.g., I/O) interfaces or ports 1606, one or more wireless charging units 1612, one or more sensors 1614, a memory 1620, a battery (not pictured) and one or more communication buses 1604 for interconnecting these and various other components.

In some implementations, the one or more programming (e.g., I/O) interfaces 1606 are configured to debug, transfer data, and make connections to other devices in a "daisy-chain" fashion.

In some implementations, the one or more wireless communication interfaces 1608 and the one or more processing units 1602 are configured to collect, analyze, and send data to edge-node gateways. In some implementations, the one or more wireless communication interfaces 1608 are low-powered.

In some implementations, the one or more processors 1602 are configured to control the sensors 1614 and their connections for timely collection of data to make decisions and transmit data to other devices for further application level usage. In some implementations, the one or more processors 1602 are configured to obtain a constant stream of data from the sensors 1614. In some implementations, the one or more processors 1602 are configured to detect if a user is touching or interacting with an item from the shelving unit, including determining how much weight was added or removed from the device 1501. In some implementations, the one or more processors 1602 are configured to convert the data-stream into a event-based stream to be sent to the edge-nodes.

In some implementations, the one or more communication buses 1604 include circuitry that interconnects and controls communications between system components.

In some implementations, the one or more wireless charging units 1612 are configured to wireless charge the device. In some implementations, the one or more wireless charging units 1612 correspond to a magnetic charging unit. In some implementations, the one or more wireless charging units 1612 are configured to charge the device 1501 using near-field wireless charging technology.

In some implementations, the one or more sensors 1614 are configured to obtain sensor data. In some implementations, the one or more sensors 1614 correspond to at least load-cells, RFID readers, temperature sensors, humidity sensors, gas sensors, motion detectors, proximity sensors, IR lights, vibration sensors, or the like.

The memory 1620 includes high-speed random-access memory, such as DRAM, SRAM, DDR RAM, or other random-access solid-state memory devices. In some implementations, the memory 1620 includes non-volatile memory, such as one or more magnetic disk storage devices, optical disk storage devices, flash memory devices, or other non-volatile solid-state storage devices. The memory 1620 optionally includes one or more storage devices remotely located from the one or more processing units 1602. The memory 1620 comprises a non-transitory computer readable storage medium. In some implementations, the memory 1620 or the non-transitory computer readable storage medium of the memory 1620 stores the following programs, modules and data structures, or a subset thereof including an optional operating system 1630, a weight sensor unit 1640, an environmental sensor unit 1650, a motion sensor unit 1660, a learning processor 1670, and an evaluation unit 1680. In some implementations, the weight sensor unit 1640, the environmental sensor unit 1650, the motion sensor unit 1660, the learning processor 1670, and the evaluation unit 1680 are implemented by one or more processors.

The optional operating system 1630 includes procedures for handling various basic system services and for performing hardware dependent tasks.

In some implementations, the weight sensor unit 1640 is configured to determine (or measure) the weight of items put on the device 1501. In some implementations, the weight sensor unit 1640 is configured triangulate a location of an item that is placed or lifted on the device. In some implementations, the weight sensor unit 1640 may correspond to one or more processors. In some implementations, the weight sensor unit 1640 may correspond to software components configured to be executed by one or more processors. To that end, in various implementations, the weight sensor unit 1640 includes instructions 1640*a* and/or logic therefor, and heuristics and metadata 1640*b* therefor.

In some implementations, the environmental sensor unit 1650 is configured to determine the temperature and humidity. In some implementations the environmental sensor unit 1650 is configured to detect spoiled meat or food products. In some implementations, the environmental sensor unit 1650 is configured to detect and report any kind of anomalies from data obtained by the various sensors. In some implementations, the environmental sensor unit 1650 may correspond to one or more processors. In some implementations, the environmental sensor unit 1650 may correspond to software components configured to be executed by one or more processors. To that end, in various implementations, the environmental sensor unit 1650 it includes instructions 1650*a* and/or logic therefor, and heuristics and metadata 1650*b* therefor.

In some implementations, the motion sensor unit 1660 is configured to detect motion nearby or around the device such that the device can enter a low power or sleep mode. In some implementations, the motion sensor unit 1660 may correspond to one or more processors. In some implementations, the motion sensor unit 1660 may correspond to software components configured to be executed by one or more processors. To that end, in various implementations, the motion sensor unit 1660 includes instructions 1660a and/or logic therefor, and heuristics and metadata 1660b therefor.

In some implementations, the learning processor 1670 is configured to perform clustering on the readings (or measurements) from the sensors to identify objects based on machine learning and to store a pre-trained model. For example, the learning processor may be configured to perform cluster on the weight of items placed on and picked up from the weight sensor to identify objects based on weight. In some implementations, the learning processor 1670 may correspond to one or more processors. In some implementations, the learning processor 1670 may correspond to software components configured to be executed by one or more processors. To that end, in various implementations, the learning processor 1670 includes instructions 1670a and/or logic therefor, and heuristics and metadata 1670b therefor.

In some implementations, the evaluation unit 1680 is configured to retrieve a data stream such an output of the data stream from the sensors. In some implementations, the evaluation unit 1680 may correspond to one or more processors. In some implementations, the evaluation unit 1680 may correspond to software components configured to be executed by one or more processors. To that end, in various implementations, the evaluation unit 1680 includes instructions 1680a and/or logic therefor, and heuristics and metadata 1680b therefor.

Although the weight sensor unit 1640, the environmental sensor unit 1650, the motion sensor unit 1660, the learning processor 1670, and the evaluation unit 1680 are shown as residing on a single device (e.g., the device 1501 shown in FIG. 15), it should be understood that in some implementations, any combination of the weight sensor unit 1640, the environmental sensor unit 1650, the motion sensor unit 1660, the learning processor 1670, and the evaluation unit 1680 may be located in separate computing devices.

Moreover, FIG. 16 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 16 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 17A:
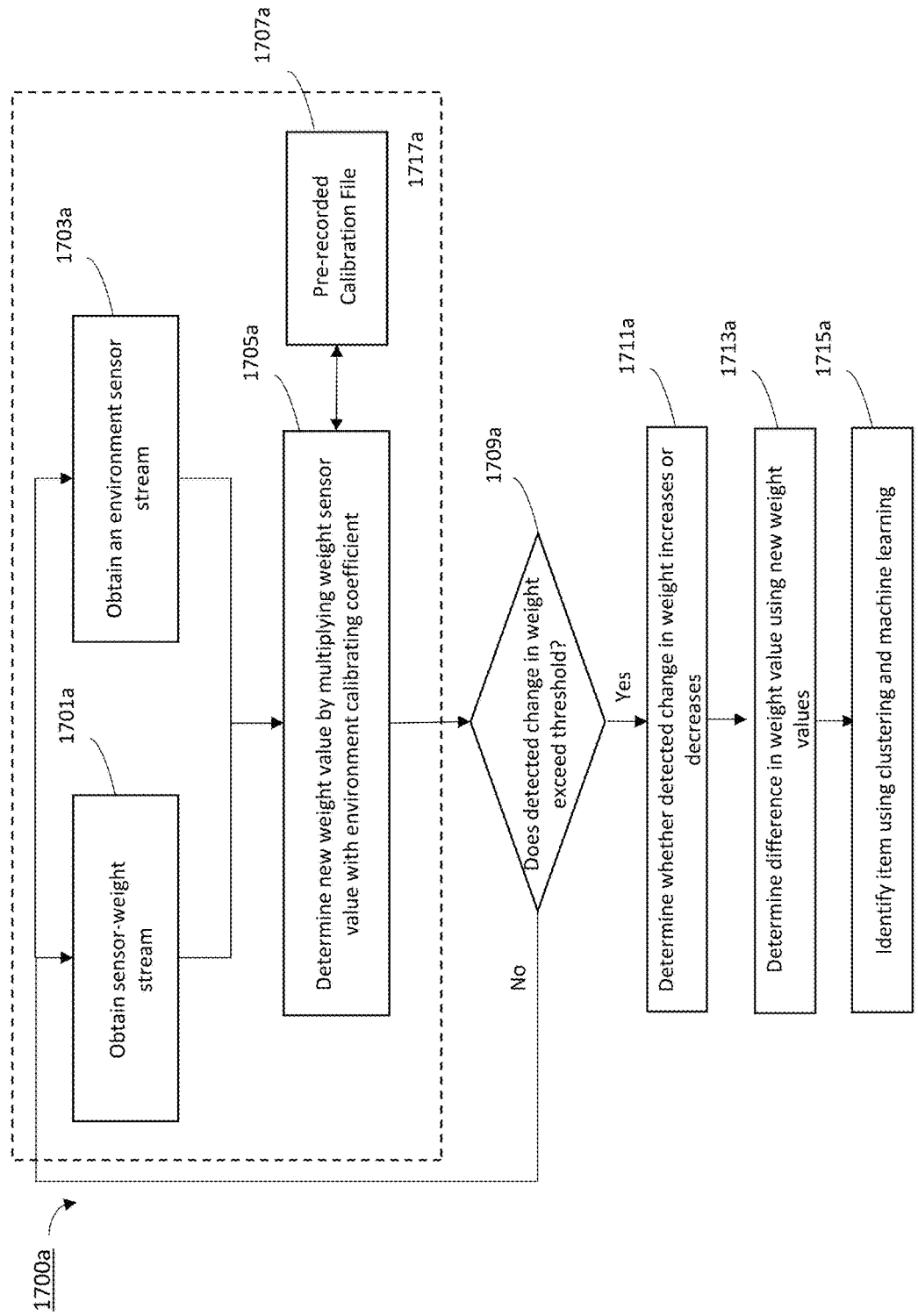
FIG. 17A is a flowchart representation of using weight sensors with temperature feedback according to some implementations.

FIG. 17a is a flowchart representation of using weight sensors with temperature feedback according to some implementations. In various implementations, the temperature feedback method 1700a is performed by a device 1501 (e.g., the device 1501 shown in FIGS. 15-16) with one or more processors and non-transitory memory that trains the machine learning training system. In some implementations, the temperature feedback method 1700a is performed by processing logic, including hardware, firmware, software, or a combination thereof. In some implementations, the temperature feedback method 1700a is performed by a processor executing code stored in a non-transitory computer-readable medium (e.g., a memory).

An external factor that has a dramatic impact on the accuracy and stability of weight sensors is temperature. Temperature control is crucial in avoiding a drift phenomenon when measuring items using weight sensors. At a high level, the temperature feedback method 1700a includes a temperature feedback method 1717a that uses a temperature sensor 1515 to calibrate the one or more weight sensors 1503 to operate properly in environments with different temperatures. For example, the device 1501 may be in a refrigeration unit or cooler to keep items placed on the device 1501 at a cold temperature, which provides an environment that is cooler than room temperature. Most load cells already include some hardware compensation for temperature using thermistors which correct part of the measurement errors caused by variations in temperature. Unfortunately, the hardware compensation does not truly cancel the effect of temperature change. Therefore, there is a need for correction in view of temperature drift.

Although, the temperature feedback method 1700a talks about calibrating the hardware in the one or more weight sensors 1503, the temperature feedback method 1700a may also be applied to correct humidity feedback and calibrating the hardware in weight sensors and accounting for drift in view of humidity using an environmental sensor such as a hygrometer. Specifically, the temperature feedback method 1700a includes: obtaining a sensor-weight stream and a temperature sensor stream, determine a new weight value by multiplying weight sensor value with temperature-calibration coefficient using a pre-recorded calibration file, detect a change in weight, determine whether the weight increases or decreases, determine difference in value, and identify the item.

As represented by block 1701a, the temperature feedback method 1700a includes obtaining a sensor-weight data stream from the one or more weight sensors 1503. As mentioned above, the temperature feedback method 1700a is described here using the one or more weight sensors 1503, but the temperature feedback method 1700a may apply to any other hardware on sensors on the device 1501 that may be affected by temperature.

As represented by block 1703a, the temperature feedback method 1700a includes obtaining a temperature sensor stream from the temperature sensor 1515. As mentioned above, the temperature feedback method 1700a may also include obtaining a humidity sensor stream from a hygrometer.

As represented by block 1705a, the temperature feedback method 1700a includes determining a new weight value by multiplying the weight sensor value with temperature calibrating coefficient using a pre-recorded calibration file 1707a. In some implementations, the pre-recorded calibration file 1707a may contain a table listing different sensor ADC weight values, temperatures, and a corresponding temperature calibrating coefficient. In some implementations, the device 1501 may update the pre-recorded calibration files 1707a in real-time with new temperatures, new weight values, and corresponding temperature calibrating coefficients.

As represented by block 1709a, the temperature feedback method 1700a includes determining whether a detected change in weight from the one or more weight sensors 1503 exceeds a predetermined threshold. For example, the device 1501 may detect a change in weight when a user picks up an item from the one or more weight sensors 1503. As another example, the device 1501 may detect a change in weight when a user puts down an item on the one or more weight sensors 1503. As another example, the device 1501 may detect a change in weight when a user touches an item. If the detected change in weight from the device does not exceed a predetermined value, then the process goes back to S1701*a* and 1703*a*. However, if the detected change in weight from the exceeds the predetermined value, then the process continues to block 1711*a*.

As represented by block 1711*a*, the temperature feedback method 1700*a* includes determining whether the detected change in weight increases or decreases. If the weight increase, then the user has most likely added an item in a bin on the device 1501. If the weight decreases, then the user has most likely picked up an item the bin on the device 1501. If the weight increase or decrease is less than a predefined value, then the specific item from the bin probably did not get disturbed by the user.

As represented by block 1713*a*, the temperature feedback method 1700*a* includes determining a difference in measurement value using new weight values. Here, the temperature feedback method uses the new weight values to correct any drift in weight measurement due to a temperature change.

As represented by block 1715*a*, the temperature feedback method 1700*a* includes identifying an item that is placed on or picked up from the device 1501 based on the determined difference in value. For example, the device 1501 may use clustering and machine learning to identify the item based on the unit weight of the item. Accordingly, the device 1501 may also use clustering and the machine learned weight of a particular item to determine a quantity of items placed on or picked up from the device 1501 based on the clustering and machine learned weight of the particular item. In some implementations, if the difference in weight has no match with clustering, then the item cannot be identified using machine learning and the temperature feedback method 1700*a* returns an unknown item and unknown weight.

Figure 17B:
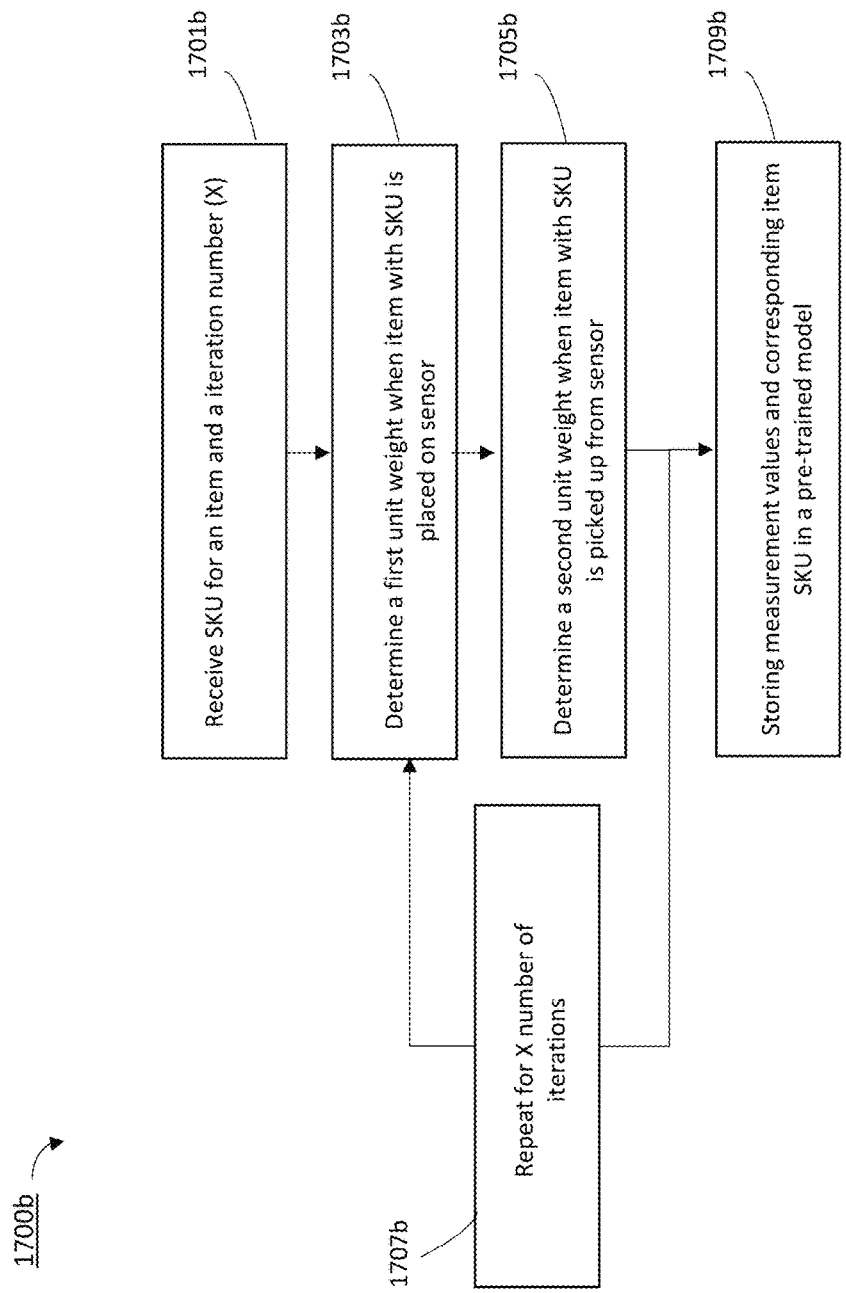
FIG. 17B is a flowchart representation of associating items with initial measurements and SKU numbers according to some implementations.

FIG. 17*b* is a flowchart representation of associating items with initial measurements and SKU numbers according to some implementations. In various implementations, the association method 1700*b* is performed on the device 1501 (e.g., the AI device 1501 shown in FIG. 16) with one or more processors and non-transitory memory that trains the machine learning training system. In some implementations, the association method 1700*b* is performed by processing logic, including hardware, firmware, software, or a combination thereof. In some implementations, the association method 1700*b* is performed by a processor executing code stored in a non-transitory computer-readable medium (e.g., a memory).

At a high level, the association method 1700*b* is performed as an initial step when a clerk is stocking a bin on a shelving unit with items. The association method 1700*b* provides an initial set of clustering by providing the machine learning model with specific unit weights associated with specific items identified by SKU numbers. Specifically, the association method 1700*b* includes: inputting a SKU number and iteration number for an item, determining a first unit weight for the item by placing the item with the SKU on the sensor, determining a second unit weight for the item by picking up item with SKU from sensor, repeating the placing and picking up item process for a number of iterations, and storing measurement values and corresponding item SKU in a pre-trained model.

As represented by block 1701*b*, the association method 1700*b* includes inputting a SKU number for an item and number of iterations into the device 1501. For example, the method in block 1701*b* may be performed by a store clerk when he is initially stocking a shelving unit with items. In some implementations, the store clerk has a mapping of items, a mapping of the items and their SKU numbers, and a corresponding bin on a shelving unit that the item should be placed in. In some implementations, each particular item has an individual SKU number for inventory management.

As represented by block 1703*b*, the association method 1700*b* includes determining a first unit measurement of the item when a single item corresponding to the inputted SKU number is placed on the one or more weight sensors 1503 for recording the measurement from the one or more weight sensors 1503 on the device 1501. Although the association method 1700*b* is explained using the one or more weight sensors 1503 on the device 1501, the association method 1700*b* may be performed on any sensors on the device 1501. For example, the association method 1700*b* may be performed on the proximity sensor and measure a unit distance of items on the shelving unit rather than unit weight of the items on the shelving unit.

As represented by block 1705*b*, the association method 1700*b* includes determining a second unit measurement of the item when the single item corresponding to the inputted SKU number is picked up from the one or more weight sensors 1503. In some implementations, the variance in the weight when the single item is picked up is recorded on the device 1501. In some implementations, the first and second unit measurements are used to create initial clusters.

As represented by block 1707*b*, the association method 1700*b* includes repeating blocks 1703*b* and blocks 1705*b* for a certain number of iterations. In some implementations, the number of iterations corresponds to two or three iterations. The multiple iterations allow for variance in the measurement of unit items since subsequent unit measurements for the unit should correct for any variance between the items. For example, each individual can of a particular soda may have a slightly different variance in unit weight. As another example, individual bags of potato chips may have a slightly higher variance between each unit weight as compared to a can of soda.

As represented by block 1709*b*, the association method 1700*b* further includes storing the measurement values and corresponding SKU number in a pre-trained model. In some implementations, the association method 1700*b* includes storing, in a pre-trained model on the device, a metadata indicating at least one of the first unit measurement, the second unit measurement, any subsequent unit measurements, a name of the particular item, a corresponding inputted SKU number for the particular item, and a location of the bin that the particular item belongs to.

Figure 17C:
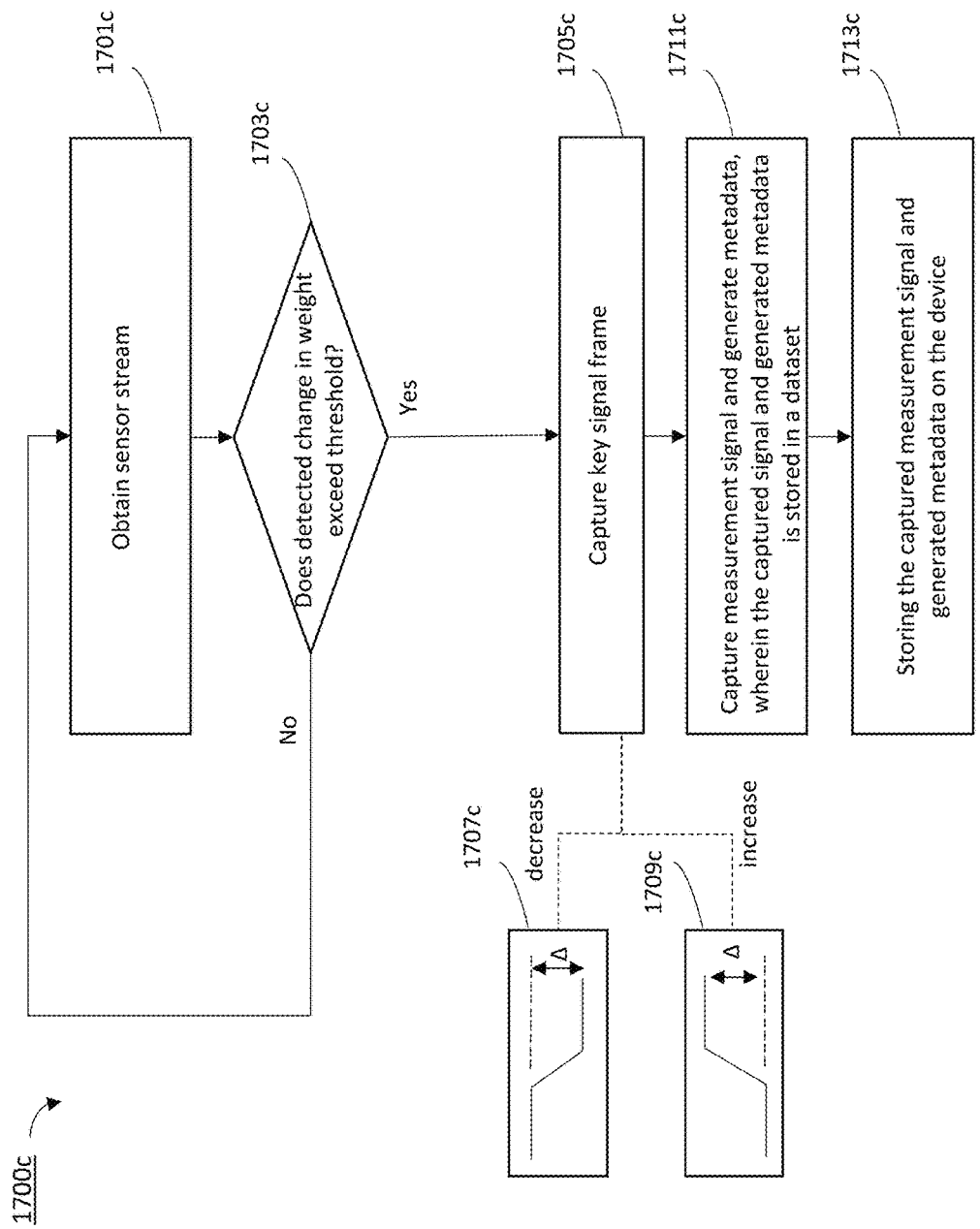
FIG. 17C is a flowchart representation of training (or configuring) the device using machine learning according to some implementations.

FIG. 17*c* is a flowchart representation of training (or configuring) the device using machine learning according to some implementations. In various implementations, the training method 1700*c* is performed on the device 1501 (e.g., the AI device 1501 shown in FIG. 16) with one or more processors and non-transitory memory that trains the machine learning training system. In some implementations, training method 1700*c* is performed by processing logic, including hardware, firmware, software, or a combination thereof. In some implementations, training method 1700*c* is performed by a processor executing code stored in a non-transitory computer-readable medium (e.g., a memory).

At a high level, the training method 1700c includes obtaining a sensor stream from a device, detecting change on the device, capturing key signal frame, capturing signal and metadata to dataset, and finishing configuration. In some implementations, the training method 1700c is performed by a store clerk when he is initially stocking a shelf unit (e.g., shelf unit 503 shown in FIGS. 5-7) with items in their corresponding bins on the shelving unit. In some implementations, the training method 1700c is performed by a store clerk when the store clerk is moving an item from one bin on the shelving unit to another bin on the shelving unit.

As represented by block 1701c, the training method 1700c includes obtaining a sensor stream from a sensor on the device 1501. Here, the training method 1700c will be explained using the one or more weight sensors 1503 for measuring weight, but the training method 1700c may be implemented on any sensor measuring any measurements on the device 1501.

As represented by block 1703c, the training method 1700c includes determining whether a detecting a change on the device 1501 exceeds a threshold. For example, the device 1501 may detect a change on the device 1501 based on a user placing or picking up an item from the device using the one or more weight sensors 1503. In some implementations, if the detected change does not exceed the threshold, then the process goes back to 1701c. In some implementations, if the detected change exceeds the threshold, then the process continues to block 1705c.

As represented by block 1705c, the training method 1700c includes capturing a key signal frame. In some implementations, the training method 1700c includes capturing a key signal frame within a pre-determined training interval. In some implementations, the metadata contains information including information such as how many times the user will pick up or place the item and what SKU number is associated with that change in measurements due to the picking up or placing of the item. In some implementations, the training method 1700c associates the key signal frames to that metadata.

As shown in block 1707c, there is a signal measurement showing a measurement signal depicting a steady line of measurement, a sudden decrease (or delta) in the measurement, and then a second steady line of measurement. Here, the training method 1700c takes a snippet of the signal and make a prediction of which item caused the change in measurement using the pre-trained model because the pre-trained model has already been trained on the snippet (e.g., identifying an item by how fast the signal decreases, the slope of the decrease, how much the signal decreases, etc.).

As shown in block 1709c, there is a signal measurement showing a measurement signal depicting a steady line of measurement, a sudden increase (or delta) in the measurement, and then a second steady line of measurement. Again, the training method 1700c takes a snippet of the signal and make a prediction of which item caused the change in measurement using the pre-trained model because the pre-trained model has already been trained on the snippet (e.g., identifying an item by how fast the signal increases, the slope of the increase, how much the signal increases, etc.).

As represented by block 1711c, the training method 1700c includes capturing a measurement signal and generating the metadata. In some implementations, the captured measurement signal and generated metadata is stored in a dataset.

As represented by block 1713c, the training method 1700c includes storing the captured measurement signal and generated metadata on a pre-trained model on the device.

Figure 17D:
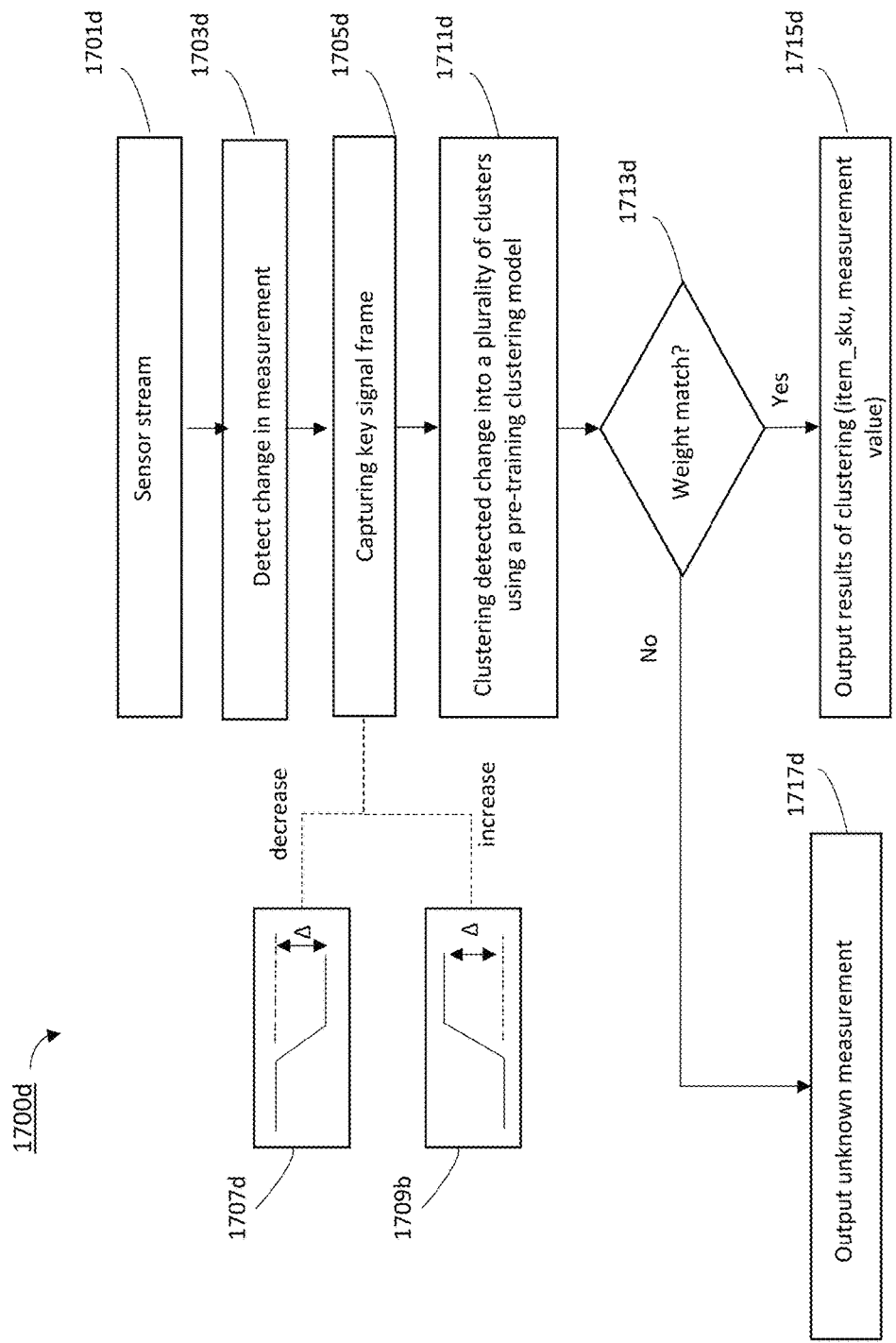
FIG. 17D is a flowchart representation of a run-time mode of the device to identify items using the weight sensors and machine learning according to some implementations.

FIG. 17d is a flowchart representation of a run-time mode of the device to identify items using the weight sensors and machine learning according to some implementations. In various implementations, the run-time method 1700d is performed on the device 1501 (e.g., the AI device 1501 shown in FIG. 16) with one or more processors and non-transitory memory that trains the machine learning training system. In some implementations, the run-time method 1700d is performed by processing logic, including hardware, firmware, software, or a combination thereof. In some implementations, the run-time method 1700d is performed by a processor executing code stored in a non-transitory computer-readable medium (e.g., a memory).

At a high level, the run-time method 1700d is executed on the device 1501 after the device 1501 has been trained (e.g., see the training method 1700c in FIG. 17c) and the model has been pre-trained to use clustering and machine learning algorithms to identify items based on measurements. Here, the run-time method 1700d will be explained using the one or more weight sensors 1503, but the run-time method 1700d may be used with any sensor on the device 1501.

Specifically, the run-time method 1700d includes: obtaining a data stream from a sensor, detecting a change in measurement, capturing key signal frames, clustering measurement variance into a plurality of clusters using a pre-trained clustering model, determining whether the weight matches any plurality of clusters, and output results of clustering based on a determination that the weight matches the plurality of clusters.

As represented by block 1701d, the run-time method 1700d includes obtaining a data stream from a sensor on the device 1501.

As represented by block 1703d, the run-time method 1700d includes detecting a change in measurement on the device 1501. In some implementations, the change in measurement is represented by a signal measurement within a pre-defined time interval. In some implementations, detecting the change in measurement corresponds to detecting a variance that is greater or less than a value (e.g., the delta shown in blocks 1707b, and 1709b) during the pre-defined time interval. For example, a change may be detected on the device 1501 when a user touches an item, picks up an item, or places an item on the device 1501 because these "touch events" will affect the measurement signal outputted by the device 1501. In some implementations, a change in the measurement signal will trigger an event if the measurement signal exceeds a pre-defined threshold (e.g., the delta shown in blocks 1707b, and 1709b).

As represented by block 1705d, the run-time method 1700d includes capturing a key signal frame containing the detected change. In some implementations, the key signal frame contains a signal measurement containing the measurement variance captured for the pre-defined time interval. In some implementations, the run-time method 1700d includes determining whether there is a decrease or increase in the measurement change.

As shown in block 1707d, there is a signal measurement showing a signal depicting a steady line of measurement, shows a sudden decrease (or delta) in the measurement, and then a second steady line of measurement. Here, the run-time method 1700d takes a snippet of the signal and make a prediction of which item caused the change in measurement using the pre-trained model because the pre-trained model has already been trained on the snippet (e.g., identifying an item by how fast the signal decreases, the slope of the decrease, how much the signal decreases, etc.).

As shown in block 1709*d*, there is a signal measurement showing a signal depicting a steady line of measurement, shows a sudden increase (or delta) in the measurement, and then a second steady line of measurement. Again, the run-time method 1700*d* takes a snippet of the signal and make a prediction of which item caused the change in measurement using the pre-trained model because the pre-trained model has already been trained on the snippet (e.g., identifying an item by how fast the signal increases, the slope of the increase, how much the signal increases, etc.).

As represented by block 1711*d*, the run-time method 1700*d* includes clustering the detected change into a plurality of clusters from a pre-trained clustering model. As mentioned in block 1707*d* and 17079*d*, the pre-defined clustering model has already been trained on a snipped with a pre-defined interval. The clustering will determine an identity of an item (e.g., the item_SKU) using a change in measurement and the pre-trained model by determining whether the measurement variance belongs to the plurality of clusters from the pre-trained model.

As represented by block 1713*d*, the run-time method 1700*d* includes determining whether the detected change matches a cluster in the pre-trained model. If the change in measurement does not match any clusters in the pre-trained model, then, as represented by block 1717*d*, the run-time method 1700*d* includes returning an unknown item measurement based on the detected change in measurement not matching any of the clusters. In some implementations, the run-time method 1700*d* cannot make a prediction because the measurement does not match any of the clusters so the run-time method 1700*d* returns a message indicating unknown measurement.

However, if the change in measurement matches a cluster in the pre-trained model, then, as represented by block 1715*d*, the run-time method 1700*d* includes outputting results of the clustering based on the detected change in measurement matching a cluster. In some implementations, the outputted results comprise at least one of item_SKU number and the measurement value. Based on the outputted result, the run-time method 1700*d* can use the outputted result to detect whether the user already has the item in their virtual cart. Accordingly, the outputted result may be used to make further decisions in difference processes further down the pipeline.

In some implementations, the association method 1700*b* from FIG. 17*b*, the training method 1700*c* from FIG. 17*c*, and the run-time method 1700*d* from FIG. 17*d* can be applied to the proximity sensor or any other sensor. In these situations, the measurements are distance based rather than weight based. In addition, the proximity sensors do not have to have any temperature or humidity control because there are no drift issues associated with the hardware of the proximity sensors.

Figure 18:
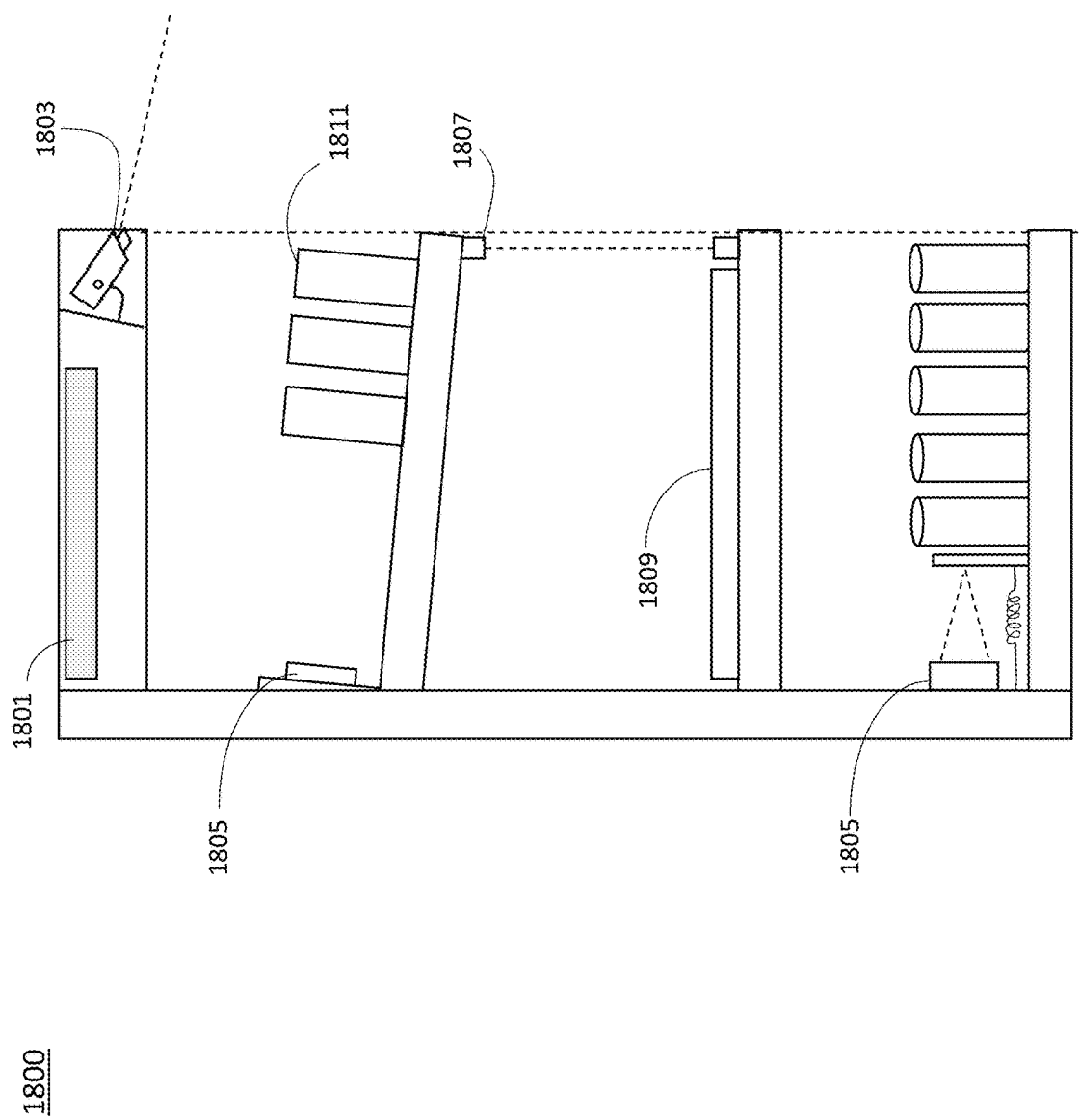
FIG. 18 is a block diagram of an example operating environment for an edge device having embedded sensors to monitor a user and identify shopping activity in accordance with some implementations.

FIG. 18 is a block diagram of an example operating environment for an edge device having embedded sensors to monitor a user and identify shopping activity in accordance with some implementations. In various implementations, the operating environment 1800 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the operating environment 1800 includes at least an edge device 1801 having a compute node (not pictured), a vision node 1803, proximity sensors 1805, an IR curtain 1807, shelves with weight sensors 1809, and items 1811 on shelving units.

At a high level, the purpose of the sensor fusion at an edge device 1801 is to provide analytics and predictions using different types of sensors in environments such as a retail shopping environment. This system involves different types of cameras 1802 (as explained in further detail in FIGS. 6-9, and 13), weight sensors 1903 (as explained in further detail in FIG. 15), proximity sensors 1907, IR light curtains 1905, motion detectors, RFID, and environment sensors. The system uses data from the various sensors to monitor and identify activities of a user inside the environment 1800. In addition, the system proposes a balance between cost, computation, and accuracy. Similar to the device 1501 shown in FIG. 15, the system is also wireless, hassle-free and a retrofittable solution.

Prior embodiments that have a shelf unit with sensors only use a few sensors such as a camera. For example, there are systems with cameras which are based on vision only. However, systems that use cameras only require lots of cameras to be set up over the ceiling and/or inside the shelves. Having so many cameras will increase computation cost, power consumption, and data transmission. As another example, there are systems that involve only RFID sensors and/or weight sensors but these systems cannot make accurate readings which lead to poor predictions of a user's activity. In addition, prior embodiments similar to the system in FIG. 18 are difficult to install, not retrofittable, and require wired connections.

Accordingly, systems that do not use a full spectrum of various sensors leads to higher computation costs and lower accuracy of predictions. However, by using various kinds of sensors, the system collects more accurate data which leads to higher accuracy and less computation.

In some implementations, the edge system 1801 (or edge node) comprises a compute node, vision node 1803, shelves with weight sensors 1809, proximity sensor 1805, and an IR curtain 1807. In some implementations, the edge system 1801 obtains a stream from all the various sensor nodes. These data streams can consist of raw data or pre-processed and filtered stream of events. In some implementations, the edge node 1801 obtains these streams and processes them with algorithms to make decisions by taking into account all of the data from the camera 1803, weight sensor 1809, and IR shadow detector 1807. After fusing the data with fusion algorithms, the edge system 1801 predicts events using machine learning which be used for decision making.

In some implementations, the vision node 1803 comprises a camera where streams of frames obtained from the camera can be used with computer-vision algorithms to estimate a user's location in a 3D space, identification of the user, re-identification of the user, and recognizing actions of the users and objects.

In some implementations, the shelves with weight sensors 1809, as explained in more detail above in FIGS. 15-16, are configured to identify objects and interaction with objects such as the pickup and return of items 1811 into the bin. In some implementations, the weight sensors 1809 allow for accurate detection of stock and detects item pick-up and return. In some implementations, the weight sensors 1809 are configured to also quantify the number of items after the item is identified. The streams from these weight sensors 1809 on the shelves can be fed to the edge system 1801 for further processing. The method of using weight sensors 1809 to identify items and predict events using machine learning is explained above in FIG. 17*d*.

In some implementations, the proximity sensors 1805 or vision nodes 1803 are configured to detect the start and end of events in the shelving unit by triggering the cameras to detect movements to turn the edge system 1801 into a low-power or sleep mode to save power. In addition, the proximity sensors 1805 can be used count items 1811 depending on a distance from the back of the shelf similar to how a vending machine works. The method of using proximity sensors 1805 to identify items and predict events using machine learning is explained above in FIG. 17*d*.

In some implementations, IR light curtains 1807 are placed around the boundaries of shelves facing towards each other to detect events inside the shelf bins. In some implementations, the IR light curtain 1807 contain a pair of IR light and IR detector diode organized in a serial configuration facing one another. As an example, the edge system 1801 can recognize a location of a hand inserted into the shelve because the user's hand cuts the path of the IR light and creates a shadow over the IR detector. In some implementations, the IR light curtain 1807 works by recognizing whether there is a break between the IR light and the IR receiver. If there is a break between the IR light and the IR receiver then the edge system 1801 knows that a user has entered his hand within the bin of the shelf (as depicted by the dotted line).

In some implementations, the shelving unit may also include a RFID reader (not pictured). The RFID reader is configured to detect an item status and track inventory count of items.

In some implementations, the edge system 1801 is completely modular. The edge system 1801 may operate with minimum hardware. In addition, the edge system 1801 has various sensors to boost accuracy and help with computation. The benefit of the edge system 1801 being modular is that sensors can be added or removed such that the edge system 1801 is capable of detecting those actions. The modularity of the edge systems 1801 allows for easy installation.

Moreover, FIG. 18 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 18 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 19:
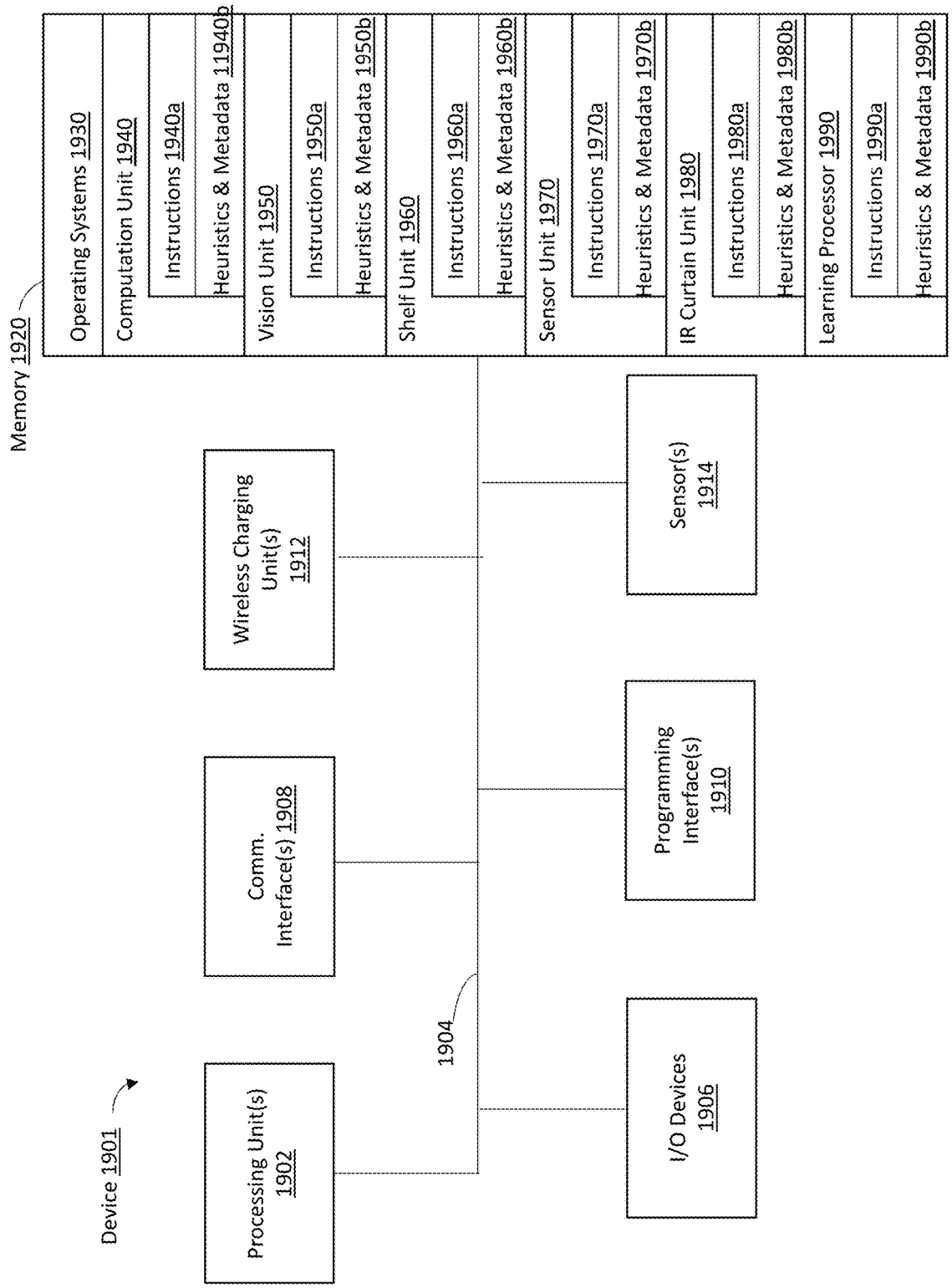
FIG. 19 is a block diagram of an example of a device 1901 in accordance with some implementations.

FIG. 19 is a block diagram of an example of a device 1901 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the AI device (e.g., the device 1501 shown in FIG. 15 or the device 1801 shown in FIG. 18) or the device 1901 includes one or more processing units 1902 (e.g., microprocessors, ASICs, FPGAs, GPUs, CPUs, processing cores, and/or the like), one or more sensors 1914, one or more wireless communications interfaces 1908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interfaces), one or more programming (e.g., I/O) interfaces 1910 or ports 1906, one or more wireless charging units 1912, one or more sensors 1914, a memory 1920, a battery (not pictured) and one or more communication buses 1904 for interconnecting these and various other components.

In some implementations, the one or more programming (e.g., I/O) interfaces 1906 are configured to debug, transfer data, and make connections to other devices in a "daisy-chain" fashion.

In some implementations, the one or more wireless communication interfaces 1908 and the one or more processing units 1902 are configured to collect, analyze, and send data to edge-node gateways. In some implementations, the one or more wireless communication interfaces 1908 are low-powered.

In some implementations, the one or more processors 1902 are configured to control the sensors 1914 and their connections for timely collection of data to make decisions and transmit data to other devices for further application-level usage. In some implementations, the one or more processors 1902 are configured to obtain a constant stream of data from the sensors 1914. In some implementations, the one or more processors 1902 are configured to detect if a user is touching or interacting with an item from the shelving unit, including determining how much weight was added or removed from the device 1901. In some implementations, the one or more processors 1902 are configured to convert the data-stream into an event-based stream to be sent to the edge-nodes.

In some implementations, the one or more communication buses 1904 include circuitry that interconnects and controls communications between system components.

In some implementations, the one or more wireless charging units 1912 are configured to wireless charge the device 1901. In some implementations, the one or more wireless charging units 1912 correspond to a magnetic charging unit. In some implementations, the one or more wireless charging units 1912 are configured to charge the device 1901 using near-field wireless charging technology.

In some implementations, the one or more sensors 1914 are configured to obtain sensor data. In some implementations, the one or more sensors 1914 correspond to at least load-cells, RFID readers, temperature sensors, humidity sensors, gas sensors, motion detectors, proximity sensors, IR light curtains, vibration sensors, or the like.

The memory 1920 includes high-speed random-access memory, such as DRAM, SRAM, DDR RAM, or other random-access solid-state memory devices. In some implementations, the memory 1920 includes non-volatile memory, such as one or more magnetic disk storage devices, optical disk storage devices, flash memory devices, or other non-volatile solid-state storage devices. The memory 1920 optionally includes one or more storage devices remotely located from the one or more processing units 1902. The memory 1920 comprises a non-transitory computer readable storage medium. In some implementations, the memory 1920 or the non-transitory computer readable storage medium of the memory 1920 stores the following programs, modules and data structures, or a subset thereof including an optional operating system 1930, a computation unit 1940, a vision unit 1950, a shelf unit 1960, a sensor unit 1970, an IR curtain unit 1980, and a learning processor 1990. In some implementations, the sensor unit 1970, The optional operating system 1930 includes procedures for handling various basic system services and for performing hardware dependent tasks.

In some implementations, the computation unit 1940 is configured to obtain a data stream such as an output of the data stream from the sensors 1914. In some implementations, the data stream may be raw data, pre-processed data, filtered data, or already analyzed stream of events. In some implementations, the computation unit 1940 will take the data streams and process the data streams with a fusion algorithm to determine and predict events for decision making. In some implementations, the computation unit 1940 may correspond to one or more processors. In some implementations, the computation unit 1940 may correspond to software components configured to be executed by one or more processors. To that end, in various implementations, the computation unit 1940 includes instructions 1940*a* and/or logic therefor, and heuristics and metadata 1840*b* therefor.

In some implementations, the vision unit 1950 is configured to implement and process different computer-vision algorithms to obtain estimations of a user's location in a 3D space, identification of the user, re-identification of the user, recognizing actions of a user, and recognizing items. In some implementations, the vision unit 1950 may correspond to one or more processors. In some implementations the vision unit 1950 may correspond to software components configured to be executed by one or more processors. To that end, in various implementations, the vision unit 1950 it includes instructions 1950*a* and/or logic therefor, and heuristics and metadata 1950*b* therefor.

In some implementations, the shelf unit 1960 is configured to work with weight sensors to identify objects and interactions with objects. In some implementations, the shelf unit 1960 is configured to transmit a data stream from the shelves to edge nodes for further processing. In some implementations, the shelf unit 1960 may correspond to one or more processors. In some implementations, the shelf unit 1960 may correspond to software components configured to be executed by one or more processors. To that end, in various implementations, the shelf unit 1960 includes instructions 1960*a* and/or logic therefor, and heuristics and metadata 1960*b* therefor.

In some implementations, the sensor unit 1970 is configured to trigger cameras or the device 1901 based on detection of movements in order to turn the device 1901 into a low power or sleep mode. In some implementations, the sensor unit 1970 is configured to count items depending on a distance of items from the back of a shelf. In some implementations, the sensor unit 1970 may correspond to one or more processors. In some implementations, the sensor unit 1970 may correspond to software components configured to be executed by one or more processors. To that end, in various implementations, the sensor unit 1970 includes instructions 1970*a* and/or logic therefor, and heuristics and metadata 1970*b* therefor.

In some implementations, the IR curtain unit 1980 is configured to determine when a user has inserted his hand inside the shelves and recognize a location of the hand of the user inside the shelf. In some implementations, the IR curtain unit 1980 may correspond to one or more processors. In some implementations, the IR curtain unit 1980 may correspond to software components configured to be executed by one or more processors. To that end, in various implementations, the IR curtain unit 1980 includes instructions 1980*a* and/or logic therefor, and heuristics and metadata 1980*b* therefor.

In some implementations, the learning processor 1990 is configured to perform clustering, store the pre-trained model (as explained in further detail in FIGS. 17A-D), identify items based on measurement variance, identify a quantity of items based on the measurement variance, and predict events. In some implementations, the learning processor 1990 may correspond to one or more processors. In some implementations, the learning processor 1990 may correspond to software components configured to be executed by one or more processors. To that end, in various implementations, the learning processor 1990 includes instructions 1990*a* and/or logic therefor, and heuristics and metadata 1990*b* therefor.

Although the computation unit 1940, the vision unit 1950, the shelf unit 1960, the sensor unit 1970, the IR curtain unit 1980, and the learning processor 1990 are shown as residing on a single device (e.g., the device 1701), it should be understood that in some implementations, any combination of the computation unit 1940, the vision unit 1950, the shelf unit 1960, the sensor unit 1970, the IR curtain unit 1980, and the learning processor 1990 may be located in separate computing devices.

Moreover, FIG. 19 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 19 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 20:
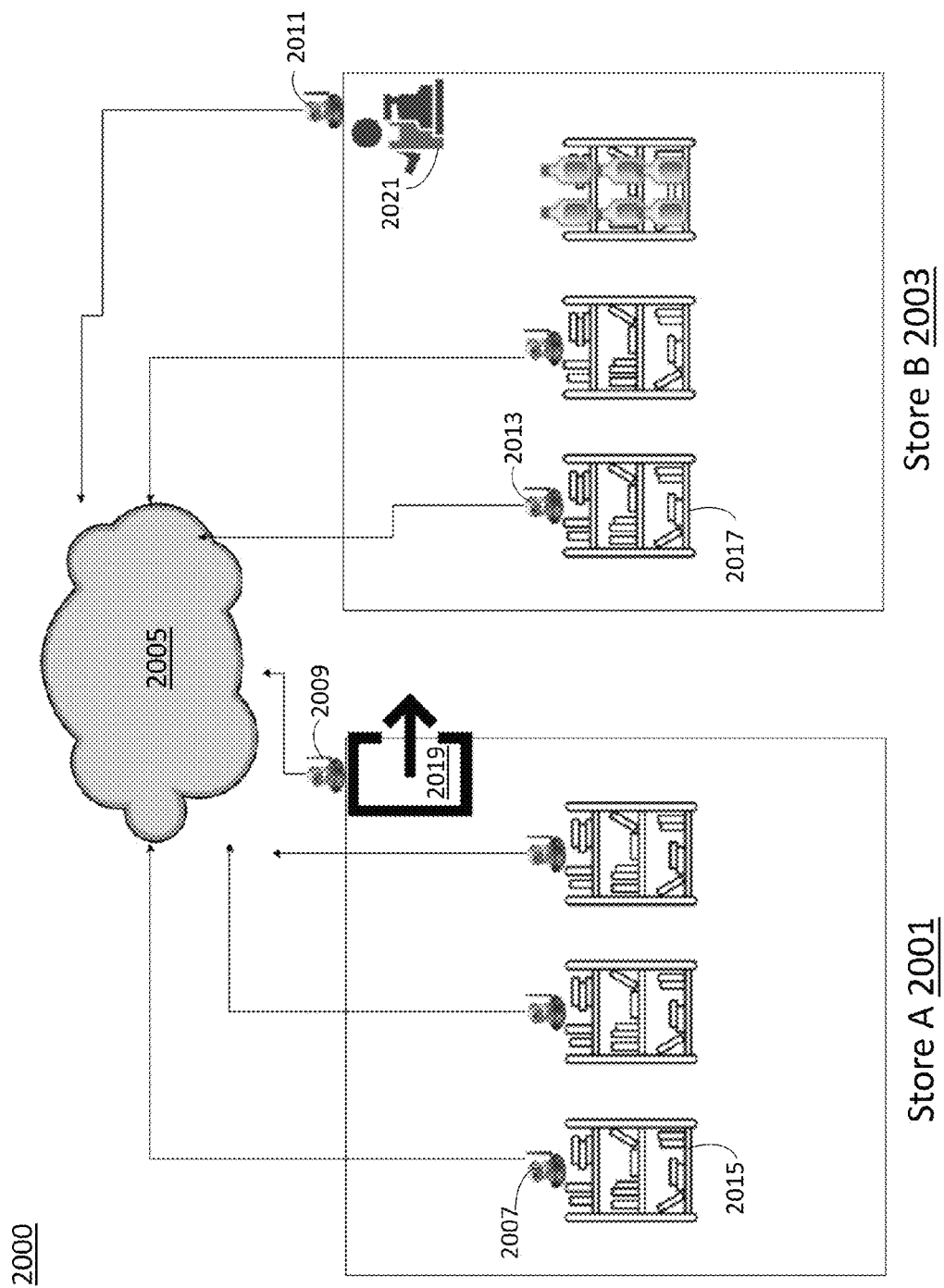
FIG. 20 is a block diagram of an example operating environment for sensor fusion process according to some implementations.

FIG. 20 is a block diagram of an example operating environment for sensor fusion process according to some implementations. In various implementations, the process environment 2000 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 2000 includes at least a cloud 2005, a large number of self-operable edge devices 2007, 2009, 2011, and 2013, and store A 2001, and store B 2003. In some implementations, store A 2001 corresponds to an entire store that is cashier-less, and store B 2003 corresponds a store where part of the store is cashier-less. For example, a grocery store may have an alcohol section that should not be part of a cashier-less experience and have non-alcoholic sections that are part of the cashier-less experience. In some implementations, a store can be completely cashier-less.

An existing problem in other similar embodiments is a long downtime for installation and maintenance because the conversion of an entire retail store requires a large amount of initial capital, time, and human resource investment. In order to convert the retail store, other programs (such as point of sale systems) are required to change the configuration of many parts or the whole retail which creates inflexibility changes, limited scalability, and a high cost of maintenance during the operation time. For example, the other similar embodiments that implement a cashier-less checkout solution require a store-wide installation and deployment, which requires rebuilding an entire store's layout according to the specific technology being deployed. The technology in these other similar embodiments also need to be fully integrated as a system. In such a case, if one of the components such as a camera fails, the maintenance downtown is significantly high. In addition, similar embodiments do not support in-part deployment. Accordingly, the other similar embodiments include long periods of downtime for maintenance and require technicians to calibrate and maintain the system.

As opposed to the similar embodiments, in some implementations, the self-operable edge devices 2007, 2013 can be attached to the existing shelves 2015, 2017 in shelving units in a very easy manner. This minimizes down-time for the installation and mitigates the need to have a complex installation and maintenance by professional technicians. The process environment 2000 also lowers the cost of installation and maintenance, improves deployment time and efficiency, and enables partial deployment of technology due to the self-operable edge devices 2007, 2009, 2011, 2013.

In addition, the process environment 2000 is composed of a small number of self-contained independent self-operable edge devices 2007, 2009, 2011, and 2013 that can be easily attached to the existing shelves 2015, 2017 in retail stores. In addition, the small number of self-contained independent self-operable edge devices 2007, 2009, 2011, and 2013 are self-operable without dependencies on other edge units. This allows the process environment 2000 to provide for unlimited scalability.

In some implementations, since the self-contained independent self-operable edge devices 2007, 2009, 2011, and 2013 (as described in detail in FIGS. 6-7, 9, 13-16, and 18-19) are not dependent on other edge devices, the system architecture can be installed in part in both large store as well as in a numerous number of stores without performance or maintenance degradation.

In some implementations, the system architecture defines self-contained independent self-operable edge devices 2007, 2013 which can be easily attached to any existing shelves 2015, 2017 of the retail stores 2001, 2003. In some implementations, a typical edge device 2007, 2009, 2011, and 2013 consists of its own isolated computer-vision, sensors-fusion, edge compute, and communication module which connects to the cloud network 2005 (which will be described in further detail in FIGS. 21-23). In some implementations, the edge devices 2007, 2009, 2011, and 2013 are self-operable without dependencies on other edge devices.

In some implementations, the edge devices 2007, 2009, 2011, and 2013 register themselves to the cloud network 2005 and send events (such as a customer picking up an item or returning an item) to the cloud network 2005. In some implementations, each edge device 2007, 2009, 2011, and 2013 is independently connected to and identified on the cloud network or servers 2005. An edge device is responsible for detecting each customers' events (or actions) including picking-up an item, dropping an item, and sending the corresponding events to the cloud servers 2005. As such, each store can flexibly configure the store with different sets of edge devices 2007, 2009, 2011, and 2013, which allows for a robust, scalable, and easily maintainable system. In addition, the data observation overlap between the edge devices 2007, 2009, 2011, and 2013 provides the continuity required for adding a new edge device to the system architecture. This system architecture can make converting the existing retail stores into cashier-less stores easier and more economical.

A unit system architecture provides a system architecture for implementing a successful cashier-less/friction-less checkout experience in an existing retail store by installing, self-operable edge devices 2007, 2009, 2011, and 2013. The architecture is designed to scale by adding unit. The individual units in this architecture may refer to the shelves 2015, 2017 in a retail store. The technology can be easily deployed into existing retail stores, can identify the items a customer is buying, integrate with the retail inventory management system and point of sale system for real-time updates. This architecture is light weight in both computation and storage due to a combination of edge compute and cloud infra use. The use of this architecture is not limited to convenience store friction-less checkout applications but may be applied in a smart pantry or a library. The architecture may be used in other retail stores including food retail, fashion retail, etc.

In some implementations, the check in/check out edge devices 2009 can be easily attached to a store entrance 2019. The check in/check out edge devices 2009 act as a payment stand where users can scan their credit card or utilize a cash machine. In some implementations when only part of the retail store is configured with the shelf units, the check in/check out edge devices 2009 can be easily installed near the cashier 2021. Depending on the configuration choice, retail stores have the option of implementing the cashier-less store experience in only certain parts of the store. For example, retail stores can install this technology with the exception of age-restricted items, such as alcohol or tobacco since cashiers 2021 will need to verify the legal age of the users who wish to purchase age-restricted items. As shown in FIG. 20, the system architecture provides a very flexible deployment to the existing store A 2001 and store B 2003.

In some implementations, the self-contained unit architecture provides not only flexible easy installation, but also easy operation and maintenance advantages due to the low cost of making each unit small and easily replaceable. Stores can keep operating even when some devices (e.g., for example edge device 2013) need maintenance because the store cashier 2021 can be notified to process the items in the shelf 2017 by the check in and check out unit 2011.

Moreover, FIG. 20 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 20 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 21:
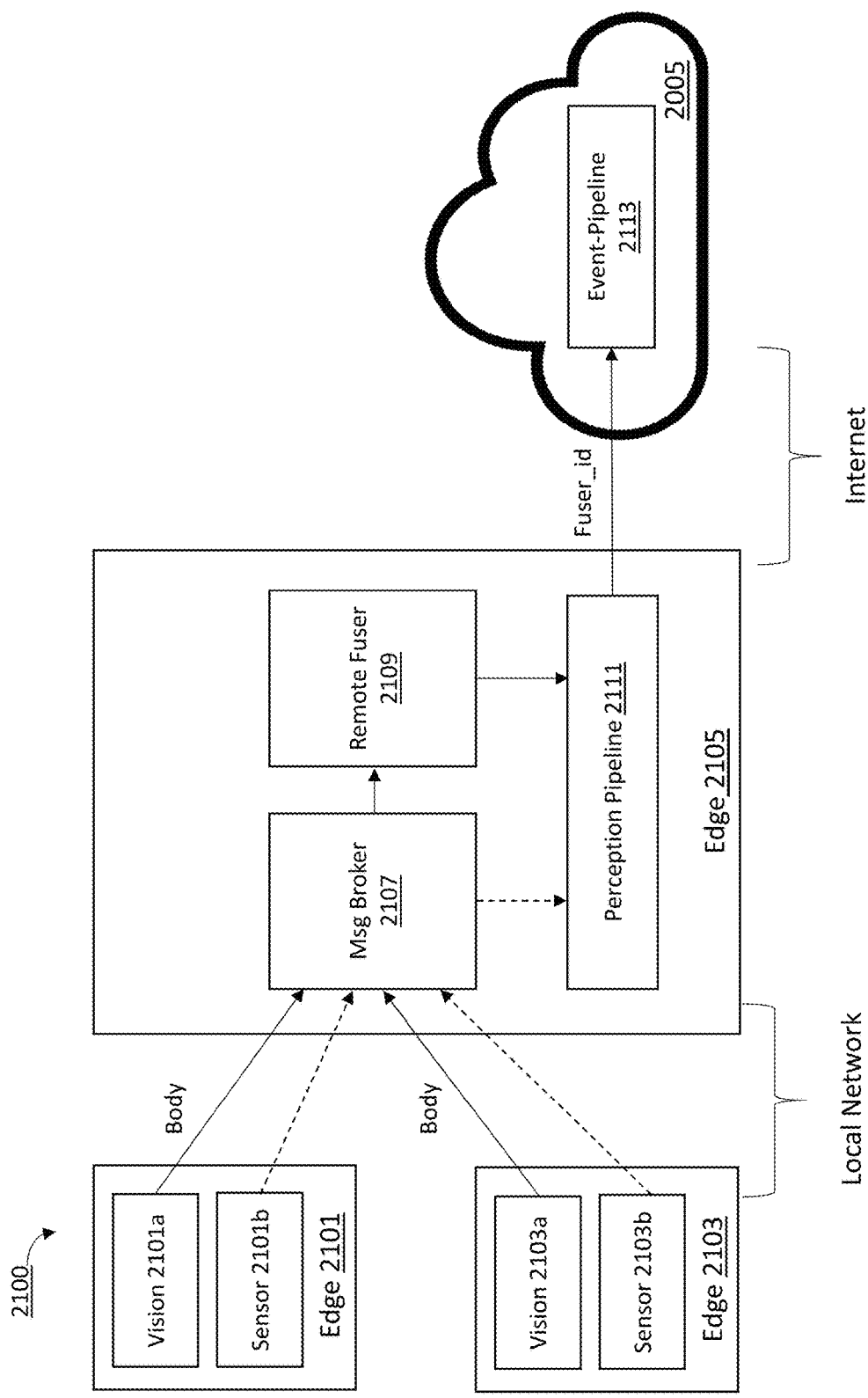
FIG. 21 is a block diagram of a process for performing sensor fusion at edge devices in accordance with some implementations.

FIG. 21 is a block diagram of a process for performing sensor fusion at edge devices in accordance with some implementations. In various implementations, the process environment 2100 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 2100 includes at least an edge device 2101 with a vision node 2101a (or camera) and at least one sensor 2101b.

At a high level, the process environment 2100 shows an overall flow from the vision nodes and sensors on an edge device and processing the data streams and measurements to create events (e.g., ID events, ReID events, and sensor events) to a message broker to increase the accuracy of perception decision. In some implementations, the process environment 2100 reduces message cost because there is no message transferring with a big payload (e.g., body feature) between the vision pipeline and the perception pipeline 2111 in the autonomous machines accelerator technology (AGX). In some implementations, the process environment 2100 enables more accurate decisions because the perception pipeline includes a fuser's body_id. In some implementations, the process environment 2100 may operate even if the internet is down because the perception pipeline 2111 can keep events to send to the cloud network 2005 when the internet is down. In some implementations, the process environment 2100 helps with logging, debugging, and maintaining for PoC.

In some implementations, the process environment 2100 includes a first edge device 2101, a second edge device 2103, a third edge device 2105, and a cloud 2005. However, it should be understood that the first device 2101, the second edge device 2103, and the third edge device 2105 can all occur on any edge device. In some implementations, the edge device 2101 includes a vision node 2101a and at least one sensor 2101b. In some implementations, the edge device 2103 includes a vision node 2103a and at least one sensor 2103b. In some implementations, the edge device 2105 includes a message broker 2107, a remote fuser 2109, and a perception pipeline 2111. Although the message broker 2107, a remote fuser 2109, and a perception pipeline 2111 are shown on a separate edge device, it is understood that any edge device (e.g., edge device 2101 or edge device 2103) will include a message broker 2107, a remote fuser 2109, and a perception pipeline 2111. However, the system architecture only needs one edge device to perform the functions of the message broker 2107, the remote fuser 2109, and the perception pipeline 2111.

In some implementations, the edge device 2101 includes a vision node 2101a that sends body features to a message broker 2107 (more detail is explained in FIGS. 8-12) on a different edge device 2105 and a sensor 2101b that sends measurements to the message broker 2107 (more detail is explained in FIGS. 17a-d) on the different edge device 2105 over a local network. In some implementations, the edge device 2103 also includes a vision node 2103a that sends body features to a message broker 2107 to a different edge device 2105 and a sensor 2103b that sends measurements to the message broker 2107 on the different edge device over the local network.

In some implementations, the message broker 2107 sends ID events to the remote fuser 2109 and sends ID events, ReID events, and sensor events to the perception pipeline 2111 (which will be described in more detail in FIG. 23). In some implementations, the remote fuser 2109 is involved in mapping a shopper's id to an event. In some implementations, the perception pipeline 2111 is the final decision maker which obtains events to predict a shopper's event (e.g., picking up an item from a bin on the shelving unit, returning an item to a bin on the shelving unit, etc.). In some implementations, although each edge device will include a message broker 2107 and remote fuser 2109, only one single message broker 2107, remote fuser 2109, and perception pipeline 2111 from an individual edge device is used to handle all events from all other edge units for an entire retail store.

In some implementations, the perception pipeline 2111 on the edge device 2105 sends a fuser_id (which identifies a user) to an event-pipeline 2113 located on a cloud network 2005. In some implementations, the perception pipeline 2111 on the edge device 2105 sends a fuser_id to an event-pipeline 2113 located on the local network.

Moreover, FIG. 21 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 21 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 22:
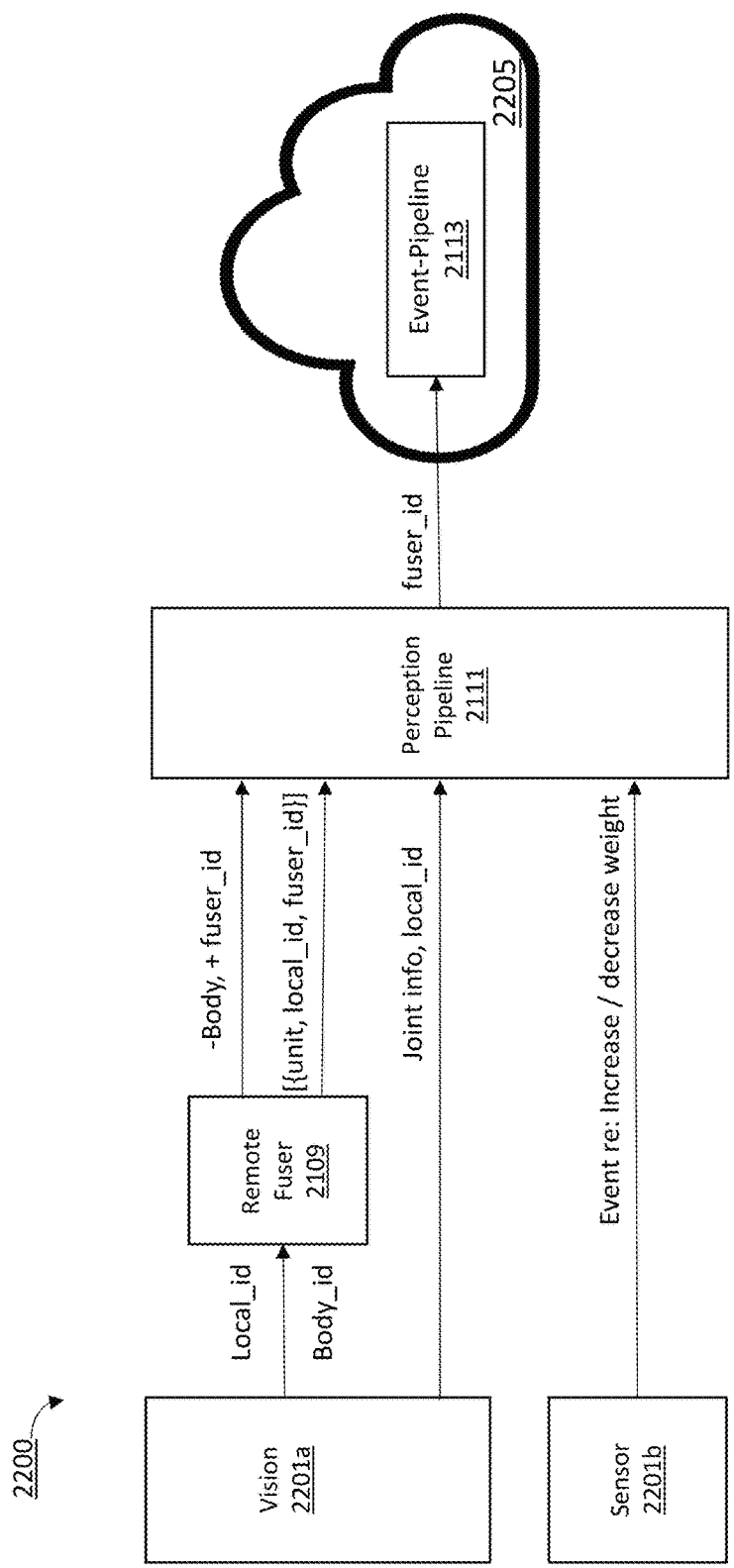
FIG. 22 is a block diagram showing message types involved performing sensor fusion at edge devices in accordance with some implementations.

FIG. 22 is a block diagram showing message types involved performing sensor fusion at edge devices in accordance with some implementations. In various implementations, the process environment 2200 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 2200 includes at least a vision node 2101a, a sensor 2101b, a remote fuser 109, a perception pipeline 2111, and a cloud network 2205 with an event-pipeline 2113.

In some implementations, the vision node 2101a sends a local_id and body_id to a remote fuser 2109 and sends joint information and local_id to the perception pipeline 2111. The local_id metadata allows the process environment 2200 to keep track of which edge device is sending information. In some implementations, the fuser_id corresponds to a shopper's identification.

In some implementations, the remote fuser 2109 sends a body_id and fuser ID and a string [{unit, local_id, fuser_id}] to the perception pipeline 2111.

In some implementations the sensor 2201b sends an event including an increase or decreases of measurement values to the perception pipeline 2111. In some implementations, the perception pipeline 2111 processes all the message types (explained further in FIG. 23) and sends a fuser_id and corresponding shopping event to the event-pipeline 2113 on the cloud network 2205.

Moreover, FIG. 22 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 22 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

In some implementations, the module fusion approach finds correspondence between two or more modules, assigns unique ID to people and objects, and corrects the detections. An advantage of the process environment 2300 is that the module fusion only deals with metadata (events) rather than raw data streams. The required computational resources are very cheap because the module fusion approach only deals with metadata and can be done in place using available computational source already in the module. In some implementations, the module fusion implements computational order $O(n^3)$ using Munkres algorithm, also known as Hungarian algorithm, for merging (e.g., data association). The Munkres algorithm is an efficient algorithm to solve the assignment problem in polynomial-time. In some implementations, the merged modules can be abstracted as a single module, which is more robust against module failure. Not being sync and jitteriness increase the validation gate in detection and increases the region of false assignments squarely.

The advantages of the module fusion approach are that it is more robust against failure, pluggable, and scalable. The disadvantages of the module fusion approach are that it needs more than 400 HD 720 to be streamed, bandwidth, jittery, async, quality, fusion time expands cubically, and is costly over time.

In some implementations, a cloud friendly approach also deals only with metadata (events) and not raw streams such that the required computational resources are very cheap and can be done in place using available computational source already in the module. In some implementations, the cloud friendly approach in the process environment 2300 implements computational order $O(n^3)$ using Munkres algorithm for merging (e.g., data association). Using hierarchy, the cloud friendly approach uses benefit of topological information of shelves, distributes computation, and reduce computational order.

The advantages of the cloud friendly approach are that it is general, expandable solution, distributed process, tolerable against failure, pluggable, scalable, and a cloud friendly approach. The disadvantages of the cloud friendly approach are that it requires edge computing, low bandwidth, and manageable async data.

In some implementations, a collective wisdom approach allows each unit to use its new observation along with other unit's belief of a global state to update the state. The unit then shares it update state with other units and cloud. In some implementations, the cloud receives descriptions of its global state with minor differences from each unit. Accordingly, the collective wisdom approach needs a good message passing structure.

The advantages of the collective wisdom approach are that it is general, an expandable solution, distributed process, robust against failure, pluggable, scalable, and a cloud friendly approach. The disadvantages of the collective wisdom approach are that it requires edge computing and complex message handling.

Figure 23:
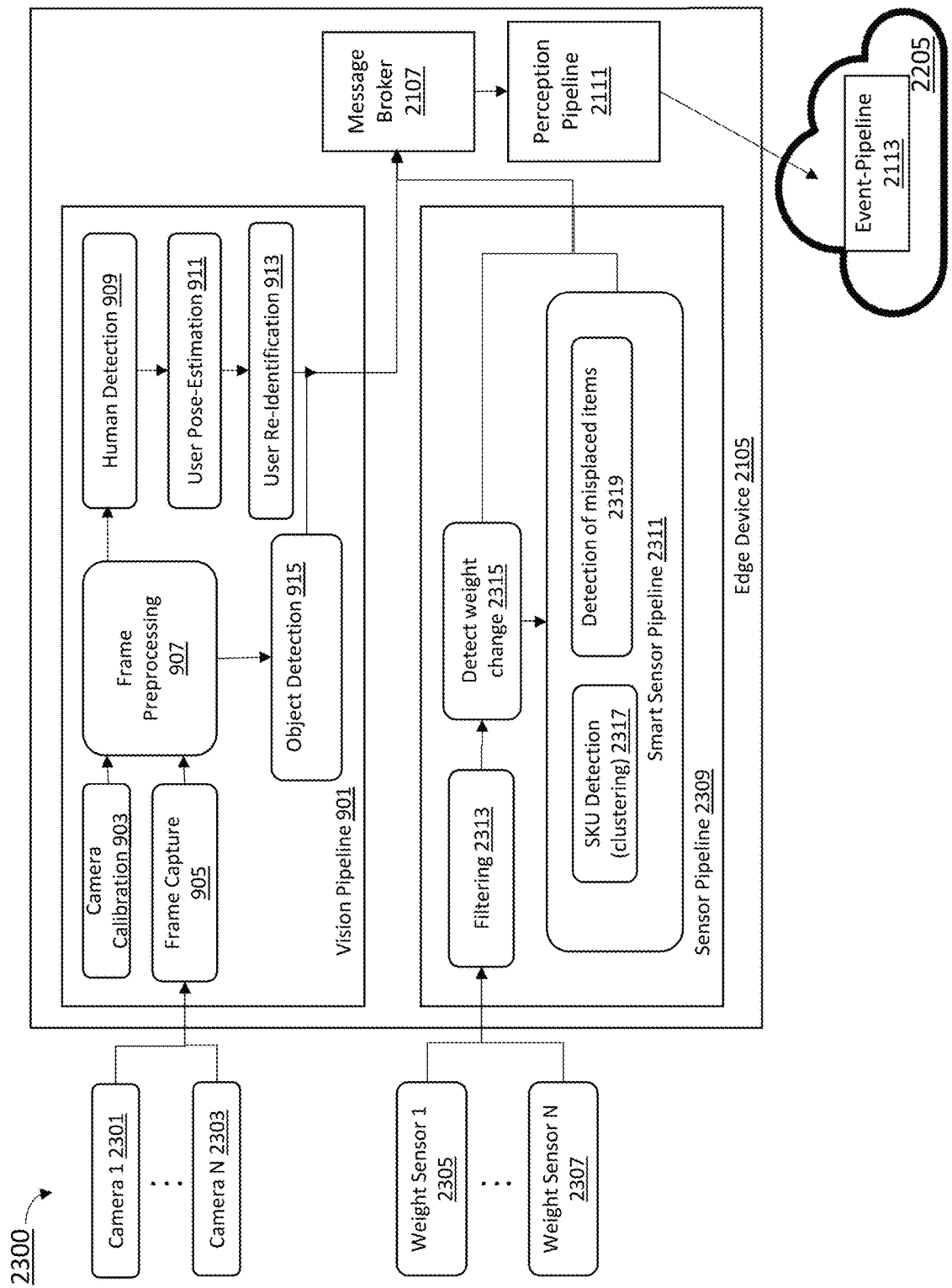
FIG. 23 is a block diagram of a vision, sensor, and perception pipeline on an edge device for detecting shopper activity in accordance with some implementations.

FIG. 23 is a block diagram of a vision, sensor, and perception pipeline on an edge device for detecting shopper activity in accordance with some implementations. In various implementations, the process environment 2300 or portions thereof are included in a device or system such as a controller, a server, a computer, a laptop computer, a tablet device, a mobile phone, or a smartphone. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the process environment 2300 includes at least an edge device 2105 with at least a first camera 2301, additional cameras 2303, a first weight sensor 2305, additional weight sensors 2307, a vision pipeline 901, a sensor pipeline 2309, a message broker 2107, a perception pipeline 2111, and an event-pipeline 2113 on a cloud network 2205.

At a high level, the process environment 2300 identifies and tracks people in front of the shelves including shopping events, users, and items. The vision pipeline 901 has already been described above in FIG. 9. However, at a high level the vision pipeline 901 takes frames from the cameras 2301, 2303 and sends ID events to the message broker 2107.

The sensor pipeline 2309 takes a stream of measurement data from the weight sensors 2305, 2307 on the edge device 2105. Specifically, the sensor pipeline filters the measurements 2313 and detects an event regarding whether there is a weight change 2315. The weight measurements and event detection of an increase or decrease in weight change then enters a smart sensor pipeline 2311 for SKU Detection based on clustering and detection of misplaced item 2319 (see FIG. 17d for more detail). In some implementations, a quick response (QR) scanner (not pictured) is also located in the sensor pipeline 2309 on the edge device 2105 and the QR scanner receives the stream of measurement data and transmits a sensor event to the message broker 2107.

In some implementation, the message broker 2107 consolidates the ID events, ReID events, and sensor events and sends the ID events, ReID events, and sensor events to the perception pipeline for further processing (more detail about the perception pipeline will be described in FIG. 24 below). In some implementations, the message broker 2107 may be located on a cloud network 2205.

Moreover, FIG. 23 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 23 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 24:
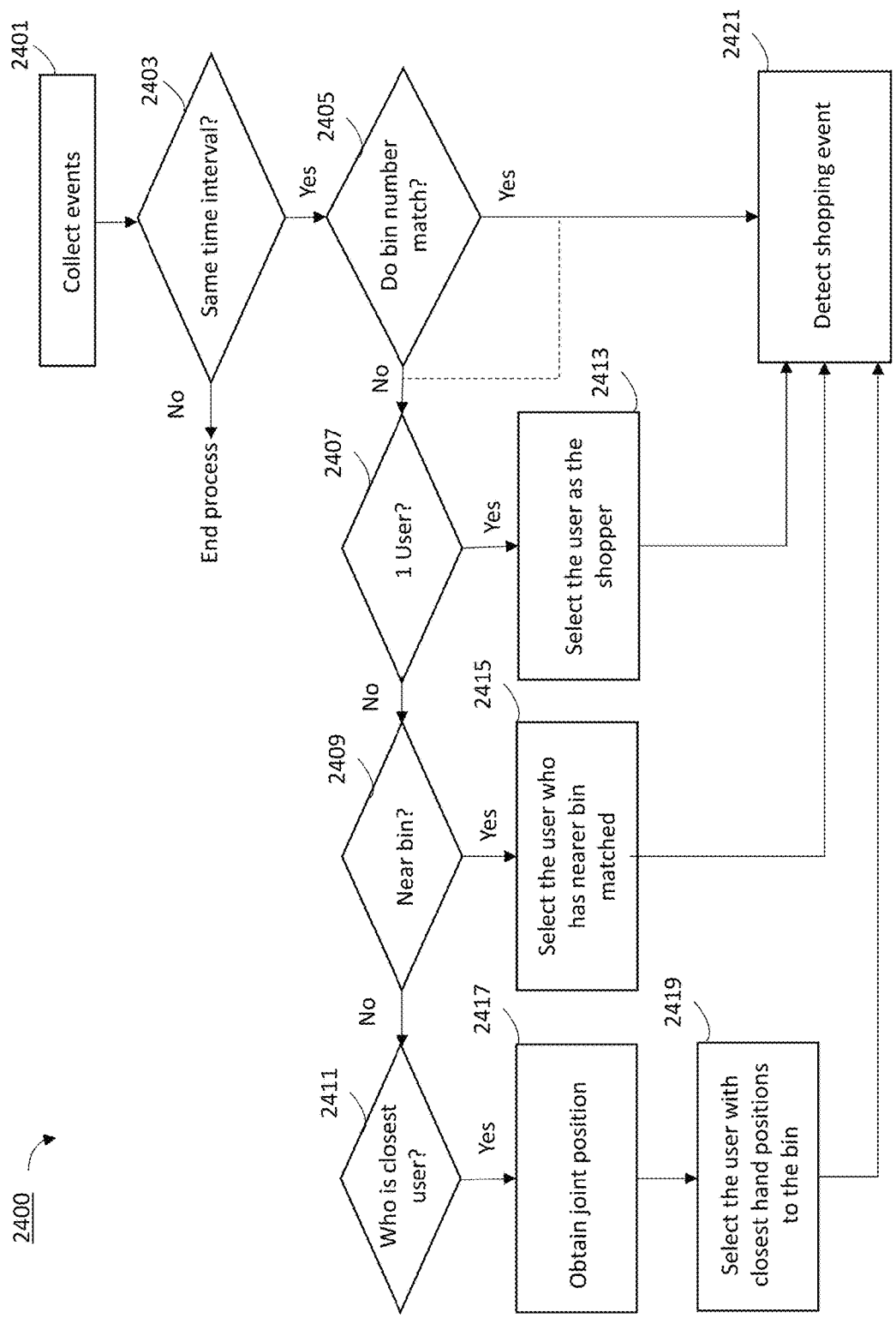
FIG. 24 is a flowchart representation of a decision method for predicting shopping activity inside the perception pipeline in accordance with some implementations.

FIG. 24 is a flowchart representation of a decision method for predicting shopping activity inside the perception pipeline in accordance with some implementations. In various implementations, the decision method 2400 is performed by a device (e.g., the AI device 100 shown in FIG. 1, the edge device 2150 shown in FIGS. 21 and 23, the edge devices 2007, 2013 shown in FIG. 20, the device 1801 shown in FIG. 18, the device 1901 shown in FIG. 19, the device 1501 shown in FIGS. 15-16, the device 603 shown in FIGS. 5-7, and 13) with one or more processors and non-transitory memory that trains the machine learning training system. In some implementations, the decision method 2400 is performed by processing logic, including hardware, firmware, software, or a combination thereof. In some implementations, the decision method 2400 is performed by a processor executing code stored in a non-transitory computer-readable medium (e.g., a memory). At a high level, the decision method 2400 uses AI algorithms and machine to predict a shopping event (e.g., pick up of item, putting down of an item) for a user by identifying, monitoring, and tracking shoppers using an embedded computer vision algorithm to detect items that are being picked up or returned back from the shelves.

At a high level, the perception pipeline collects events (e.g., ID events, ReID events, sensor events) from the weight sensors and vision sensors through a message broker and makes a prediction of a shopping event involving a user. Broadly speaking, the decision method 2400 includes: collecting events, determining whether the collected events are within a same time interval, a first logic of determining whether the bin numbers from the collected events match, a second logic of determining whether there is more than one user detected in the collected events to determine the user associated with the detected shopping event, and a third logic of using collected joint positions if there are more than one user in the collected events and the one or more users are not near a bin to determine the user associated with the detected shopping event. It should be understood that even though the decision method 2400 is implemented with a weight sensor and weight values, the decision method 2400 may be implemented with any sensors and sensor measurement values.

As represented by block 2401, the decision method 2400 includes collecting events (ID events and Sensor Events) from vision sensors and weight sensors. In some implementations, the events from the vision sensors include information such as a bin number, shopper and the events from the weight sensors include a bin number, measurement (e.g., weight), and event (e.g., a measurement increase or measurement decrease).

As represented by block 2403, the decision method 2400 includes determining whether the collected events from the vision sensors and weight sensors are within a same time interval. In some implementations, the time interval may be as a long as two or three seconds. The idea is that if the collected events occur within the same time interval, then the collected events from the vision node and sensors are probably related. If the collected events do not fall within the same time interval, then the decision method 2400 ends. However, if the collected events fall within the same time interval, then the decision method 2400 continues to block 2405.

As represented by block 2405, the decision method 2400 includes determining whether the bin numbers match in the collected events within the same time interval. Recall that each shelving unit has different bins where items are placed. As an example, if the decision method 2400 determines that the collected event from the vision sensor all correspond to Bin 1 and the collected events from the weight sensor also correspond to Bin 1, then that means the same Bin 1 matches the events from the vision sensor and weight sensor. Accordingly, a shopping event at Bin 1 has been detected.

However, in real-world vision sensor applications, vision sensors may not accurately detect an action within a particular bin due to physical constraints or camera limitations. For example, if a user is bending over to pick something up, moving his hand very quickly, or moving very quickly between shelving units, then the vision sensors cannot accurately detect which specific bin the user is interacting with. As another example, the vision sensor may collect an inaccurate bin number due to the user accidently waving his hand around a bin that he did not intend to interact with. As such, the decision method 2400 includes methods to correct for or validate the vision sensor even if a bin is not matched by the vision sensor and weight sensors. In some implementations, even if the bin is matched, the decision method 2400 proceeds to block 2407 for validation.

As represented by block 2407, the decision method 2400 includes determining whether one user is detected near the shelving unit. If it is determined that one user is detected near the shelving unit, then, as represented by block 2413, the decision method 2400 includes determining that the detected user is the shopper involved in the shopping event.

However, if it is determined that there is more than one user detected near the shelving unit, then, as represented by block 2409, the decision method 2400 includes determining which of the one or more users is located near the bin. In some implementations, if one or more users are generating events at multiple bin numbers, then the user that is closest to the particular bin detected by the sensor is the shopper involved in the shopping event, as represented by block 2415.

However, if it is determined that one or more users are not generating events near the bin, then, as represented by block 2411, the decision method 2400 includes determining who is the closest user among the one or more users near the bin by obtaining joint position of the one or more users, as represented by block 2417. As represented by block 2419, the decision method 2400 includes determining that the user with joint positions closest to the bin is the shopper involved in the shopping event (see FIG. 8 for more detail).

As represented by block 2421, the decision method 2400 includes detecting a shopping event including at least which user is associated with the shopping event (e.g., fuser_ID shown in FIG. 22) and the shopping event. In some implementations, the type of shopping event includes at least picking up an item, picking up a number of items, dropping an item, or dropping off a number of items.

Implementations according to the present disclosure described above may be implemented in the form of computer programs that may be executed through various components on a computer, and such computer programs may be recorded in a computer-readable medium. Examples of the computer-readable media include but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher-level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example implementations described above or by the use of such terms unless limited by the appended claims. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned implementations, and it is intended that not only the appended claims, but also all changes equivalent to claims, should be considered to fall within the scope of the present disclosure.

What is claimed is:

1. A method comprising:
   capturing images from a camera mounted on a shelf unit;
   identifying a user from the captured images, wherein the captured images comprise a representation of a body of the user;
   identifying joints of the identified user by performing a deep neural network body joint detection on the captured images;
   detecting and tracking actions of the identified user over a first time period by:
   detecting an affinity of joints for performing a deep learning identification on a first bounding box to identify a particular user and for associating results from the deep neural network body joint detection with the particular user to re-identify joints of the identified user, wherein the first bounding box comprises identified joints of the identified user,
   transforming a 2D position information of the identified joints into a 3D position information of the identified joints by mapping 2D locations of the detected joints in the captured images to a corresponding point cloud, and
   tracking the 3D position information of the detected joints to determine when the detected joints have entered bins within the shelf unit, wherein the detected joints comprise at least a wrist;
   tracking an object from the bins over a second time period by associating the object with one or more joints among the identified joints that have entered the bins within the shelf unit, wherein the object is associated with the one or more joints based at least in part on a determination that the 3D position of the identified joints has entered a particular bin within the shelf unit, wherein the object was predetermined to be located in the particular bin using a virtual map of the location of the bins on the shelf unit and corresponding objects located in the bins, wherein the virtual map is stored on a memory storage on the shelf unit; and
   determining an action inference of the identified user based at least in part on the associated object with the one or more joints and results from the deep learning identification on the first bounding box.

2. The method of claim 1, wherein the identified joints correspond to at least seventeen joints of the identified user, wherein the at least seventeen joints comprise at least one of a left shoulder, right shoulder, left arm, right arm, left wrist, right wrist, left hand, or right hand.

3. The method of claim 1, wherein the identified joints do not correspond to facial recognition.

4. The method of claim 1, wherein the camera corresponds to a depth camera.

5. The method of claim 1, wherein performing the deep learning identification on the first bounding box further comprises:
   creating a feature map of the identified user to generate a unique feature blob associated with the particular user,
   determining the first bounding box for the identified user, and
   inputting the determined first bounding box into a model for generating a unique identifier for the identified user, wherein the generated unique identifier for the identified user is transmitted to other devices for identifying the particular user across the other devices.

6. The method of claim 5, wherein the particular user is uniquely identified based at least in part on a body type, clothing, a body shape, or facial features for identifying the particular user across other shelf units.

7. The method of claim 1, further comprising detecting the object associated with the identified user by:
   generating a second bounding box around a wrist of the identified user for associating the detected object with the wrist of the identified user;
   projecting the generated second bounding box to the captured images;
   masking out pixels with depths further from a depth of a hand of the identified user by a first predefined distance in the generated second bounding box, wherein the generated second bounding box is projected on a wrist of the identified user to identify which object the user is interacting with; and
   identifying the object in pixel blobs.

8. The method of claim 7, wherein the camera corresponds to a first monocular camera and a second monocular camera, wherein the captured images comprises a first captured image corresponding to a left view and a second captured image corresponding to a right view, and the method further comprising:
   determining joints correspondence in the first captured image corresponding to the left view and the second captured image corresponding to the right view, wherein performing deep learning identification on a user bounding box further comprises performing the deep learning identification on the first bounding box for the first captured image corresponding to the left view and the second captured image corresponding to the right view in a batch,
wherein detecting the object associated with the identified user further comprises:
generating a second bounding box around a wrist of the identified user for associating the detected object with the wrist of the identified user;
projecting the generated second bounding box to the first captured image corresponding to the left view and the second captured image corresponding to the right view;
masking out pixels with depths further from a depth of a hand of the identified user by a second predefined distance in the generated second bounding box, wherein the generated second bounding box is projected on a wrist of the identified user to identify which object the user is interacting with; and
identifying the object in pixel blobs.

9. The method of claim 1, wherein the camera is not externally calibrated.

10. A system, comprising:
a camera mounted onto a shelf unit; and
one or more processors configured to:
capture images from the camera;
identify a user from the captured images, wherein the captured images comprises a representation of a body of the user;
identify joints of the identified user by performing a deep neural network body joint detection on the captured images;
detect and track actions of the identified user over a first time period by:
detecting an affinity of joints for performing a deep learning identification on a first bounding box to identify a particular user and for associating results from the deep neural network body joint detection with the particular user to re-identify joints of the identified user, wherein the first bounding box comprises identified joints of the identified user,
transforming a 2D position information of the identified joints into a 3D position information of the identified joints by mapping 2D locations of the detected joints in the captured images to a corresponding point cloud, and
tracking the 3D position information of the detected joints to determine when the detected joints have entered bins within the shelf unit, wherein the detected joints comprise at least a wrist;
track an object from the bins over a second time period by associating the object with one or more joints among the identified joints that have entered the bins within the shelf unit, wherein the object is associated with the one or more joints based at least in part on a determination that the 3D position of the identified joints has entered a particular bin within the shelf unit, wherein the object was predetermined to be located in the particular bin using a virtual map of the location of the bins on the shelf unit and corresponding objects located in the bins, wherein the virtual map is stored on a memory storage on the shelf unit; and
determine an action inference of the identified user based at least in part on the associated object with the one or more joints and results from the deep learning identification on the bounding box.

11. The system of claim 10, wherein the identified joints correspond to at least seventeen joints of the identified user, wherein the at least seventeen joints comprise at least one of a left shoulder, right shoulder, left arm, right arm, left wrist, right wrist, left hand, or right hand.

12. The system of claim 10, wherein the identified joints do not correspond to facial recognition.

13. The system of claim 10, wherein the camera corresponds to a depth camera.

14. The system of claim 10, wherein performing the deep learning identification on the first bounding box further comprises:
creating a feature map of the identified user to generate a unique feature blob associated with the particular user,
determining the first bounding box for the identified user, and
inputting the determined first bounding box into a model for generating a unique identifier for the identified user, wherein the generated unique identifier for the identified user is transmitted to other devices for identifying the particular user across the other devices.

15. The system of claim 10, wherein the one or more processors are further configured to detect the object associated with the identified user by:
generating a second bounding box around a wrist of the identified user for associating the detected object with the wrist of the identified user;
projecting the generated second bounding box to the captured images;
masking out pixels with depths further from a depth of a hand of the identified user by a first predefined distance in the generated second bounding box, wherein the generated second bounding box is projected on a wrist of the identified user to identify which object the user is interacting with; and
identifying the object in pixel blobs.

16. An edge device comprising one or more processors; a non-transitory memory; and one or more programs stored in the non-transitory memory, which, when executed by the one or more processors, cause the edge device to be configured to perform:
capturing images from a camera mounted on a shelf unit;
identifying a user from the captured images, wherein the captured images comprise a representation of a body of the user;
identifying joints of the identified user by performing a deep neural network body joint detection on the captured images;
detecting and tracking actions of the identified user over a first time period by:
detecting an affinity of joints for performing a deep learning identification on a first bounding box to identify a particular user and for associating results from the deep neural network body joint detection with the particular user to re-identify joints of the identified user, wherein the first bounding box comprises identified joints of the identified user,
transforming a 2D position information of the identified joints into a 3D position information of the identified joints by mapping 2D locations of the detected joints in the captured images to a corresponding point cloud, and
tracking the 3D position information of the detected joints to determine when the detected joints have entered bins within the shelf unit, wherein the detected joints comprise at least a wrist;
tracking an object from the bins over a second time period by associating the object with one or more joints among the identified joints that have entered the bins within the shelf unit, wherein the object is associated with the one or more joints based at least in part on a determination that the 3D position of the identified joints has entered a particular bin within the shelf unit, wherein the object was predetermined to be located in the particular bin using a virtual map of the location of the bins on the shelf unit and corresponding objects located in the bins, wherein the virtual map is stored on a memory storage on the shelf unit; and determining an action inference of the identified user based at least in part on the associated object with the one or more joints and results from the deep learning identification on the bounding box.

17. The edge device of claim 16, wherein the identified joints corresponds to at least seventeen joints of the identified user, wherein the at least seventeen joints comprise at least one of a left shoulder, right shoulder, left arm, right arm, left wrist, right wrist, left hand, or right hand.

18. The edge device of claim 16, wherein the identified joints do not correspond to facial recognition.

19. The edge device of claim 16, wherein the camera corresponds to a depth camera.

20. The edge device of claim 16, wherein performing the deep learning identification on the first bounding box further comprises:

creating a feature map of the identified user to generate a unique feature blob associated with the particular user, determining the first bounding box for the identified user, and inputting the determined first bounding box into a model for generating a unique identifier for the identified user, wherein the generated unique identifier for the identified user is transmitted to other devices for identifying the particular user across the other devices.

* * * * *